(12) United States Patent
Bergman

(10) Patent No.: US 10,910,973 B2
(45) Date of Patent: *Feb. 2, 2021

(54) THREE-DIMENSIONAL (3D) FLOW FLOATING POWER GENERATOR

(71) Applicant: Bruno Bergman, New Albany, OH (US)

(72) Inventor: Bruno Bergman, New Albany, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,318

(22) Filed: Apr. 11, 2020

(65) Prior Publication Data

US 2020/0244200 A1  Jul. 30, 2020

Related U.S. Application Data

(63) Continuation of application No. 15/651,110, filed on Jul. 17, 2017, now Pat. No. 10,666,174, which is a continuation-in-part of application No. 14/742,221, filed on Jun. 17, 2015, now Pat. No. 10,560,043, which is a continuation of application No. 14/540,769, filed on Nov. 13, 2014, now Pat. No. 9,712,094.

(51) Int. Cl.
| | |
|---|---|
| *F03B 13/12* | (2006.01) |
| *H02P 9/04* | (2006.01) |
| *F03B 15/16* | (2006.01) |
| *F03B 7/00* | (2006.01) |
| *F03B 17/06* | (2006.01) |
| *F03B 13/00* | (2006.01) |
| *F03B 15/08* | (2006.01) |
| *H02P 9/06* | (2006.01) |

(52) U.S. Cl.
CPC ............... *H02P 9/04* (2013.01); *F03B 7/003* (2013.01); *F03B 13/00* (2013.01); *F03B 15/08* (2013.01); *F03B 15/16* (2013.01); *F03B 17/063* (2013.01); *H02P 9/06* (2013.01); *F05B 2240/932* (2013.01); *F05B 2250/712* (2013.01); *F05B 2260/5032* (2013.01); *F05B 2260/74* (2013.01); *F05B 2260/76* (2013.01); *F05B 2260/79* (2013.01); *F05B 2270/101* (2013.01); *F05B 2270/1016* (2013.01); *F05B 2270/1033* (2013.01); *F05B 2270/20* (2013.01); *F05B 2270/327* (2013.01); *Y02E 10/20* (2013.01)

(58) Field of Classification Search
CPC .................................. F03B 7/00; F03B 7/003
See application file for complete search history.

(56) References Cited

U.S. PATENT DOCUMENTS

| | | |
|---|---|---|
| 525,130 A | 8/1894 | Boyd |
| 583,355 A | 5/1897 | Barton et al. |
| 924,684 A | 6/1909 | Martin |
| 1,113,440 A | 10/1914 | Hughes |
| 1,280,617 A | 10/1918 | Watkins |

(Continued)

FOREIGN PATENT DOCUMENTS

| | | |
|---|---|---|
| CN | 203463218 U | 3/2014 |
| DE | 102009029920 A1 | 12/2010 |
| WO | 2011/109858 A1 | 9/2011 |

*Primary Examiner* — Tulsidas C Patel
*Assistant Examiner* — Thomas K Quigley
(74) *Attorney, Agent, or Firm* — Vorys, Sater, Seymour & Pease LLP; William Klima

(57) ABSTRACT

A floating electrical power generator having a three-dimensional (3D) flow passageway configured for increasing the water flow on the paddle wheel to increase the power output.

22 Claims, 61 Drawing Sheets

(56) References Cited

U.S. PATENT DOCUMENTS

| | | |
|---|---|---|
| 2,161,215 A | 6/1939 | Wise |
| 3,807,890 A | 4/1974 | Wright |
| 4,001,596 A | 1/1977 | Kurtzbein |
| 4,179,886 A | 12/1979 | Tsubota |
| 4,208,875 A | 6/1980 | Tsubota |
| 4,208,876 A | 6/1980 | Tsubota |
| 4,268,757 A | 5/1981 | Rogers |
| 4,352,990 A | 10/1982 | Ancoin, Jr. |
| 4,446,378 A | 5/1984 | Martinez |
| 4,516,033 A | 5/1985 | Olson |
| 4,598,210 A | 7/1986 | Biscomb |
| 4,717,832 A | 1/1988 | Harris |
| 4,725,195 A | 2/1988 | Wiggs |
| 4,746,807 A | 5/1988 | Furo et al. |
| 4,843,249 A | 6/1989 | Bussiere |
| 5,051,059 A | 9/1991 | Rademacher |
| 5,430,332 A | 7/1995 | Dunn, Jr. |
| 5,451,137 A | 9/1995 | Gorlov |
| 5,471,098 A | 11/1995 | Asay |
| 5,882,143 A | 3/1999 | Williams, Jr. |
| 6,551,053 B1 | 4/2003 | Schuetz |
| 6,935,832 B1 | 8/2005 | Platt et al. |
| 7,063,579 B2 | 6/2006 | Voves |
| 7,223,137 B1 | 5/2007 | Sosnowski |
| 7,465,147 B2 | 12/2008 | Platt et al. |
| 7,602,076 B1 | 10/2009 | Sipp |
| 7,607,862 B2 | 10/2009 | Thorsbakken |
| 7,633,178 B1 | 12/2009 | Embree |
| 7,696,633 B2 | 4/2010 | Zajchowski |
| 7,969,034 B2 | 6/2011 | Winius |
| 8,120,196 B1 | 2/2012 | Neese |
| 8,129,855 B1 | 3/2012 | Tong et al. |
| 8,564,151 B1 | 10/2013 | Huebner |
| 8,593,005 B2 | 11/2013 | Drews |
| 8,736,095 B2 | 5/2014 | Gilchrist |
| 8,933,575 B2 | 1/2015 | Lipman |
| 8,957,541 B1 | 2/2015 | Jacobsen |
| 2003/0146628 A1 | 8/2003 | Sanchez |
| 2007/0081861 A1 | 4/2007 | Goble |
| 2007/0222219 A1 | 9/2007 | Peckham |
| 2008/0290663 A1 | 11/2008 | Shifrin |
| 2008/0303284 A1 | 12/2008 | Clemens |
| 2009/0322091 A1 | 12/2009 | Jack |
| 2009/0322093 A1 | 12/2009 | Winius |
| 2010/0084862 A1 | 4/2010 | Unno |
| 2010/0084870 A1 | 4/2010 | Burcik |
| 2011/0042957 A1 | 2/2011 | Drews |
| 2011/0062715 A1 | 3/2011 | Dimaggio |
| 2012/0169056 A1 | 7/2012 | Peed |
| 2012/0244760 A1 | 9/2012 | Ekhoff |
| 2013/0069369 A1 | 3/2013 | Salehpoor |
| 2013/0220940 A1 | 8/2013 | Galletta |
| 2013/0229014 A1 | 9/2013 | Willingham |
| 2013/0241206 A1 | 9/2013 | Tkadlec |
| 2013/0285383 A1 | 10/2013 | Belarbi |
| 2013/0313833 A1 | 11/2013 | Bang |
| 2014/0062091 A1 | 3/2014 | Soong |

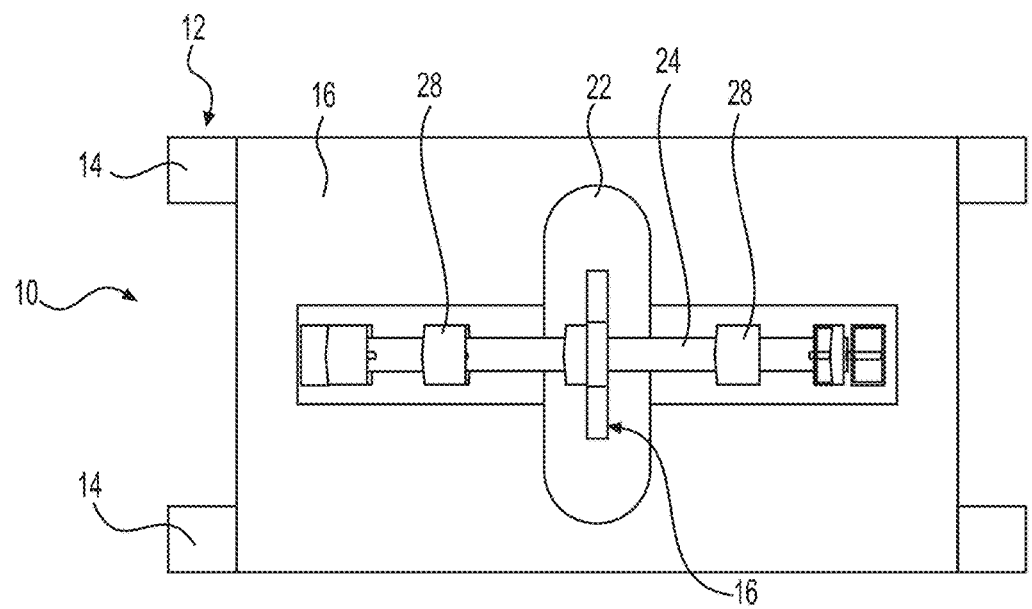
FIG. 5
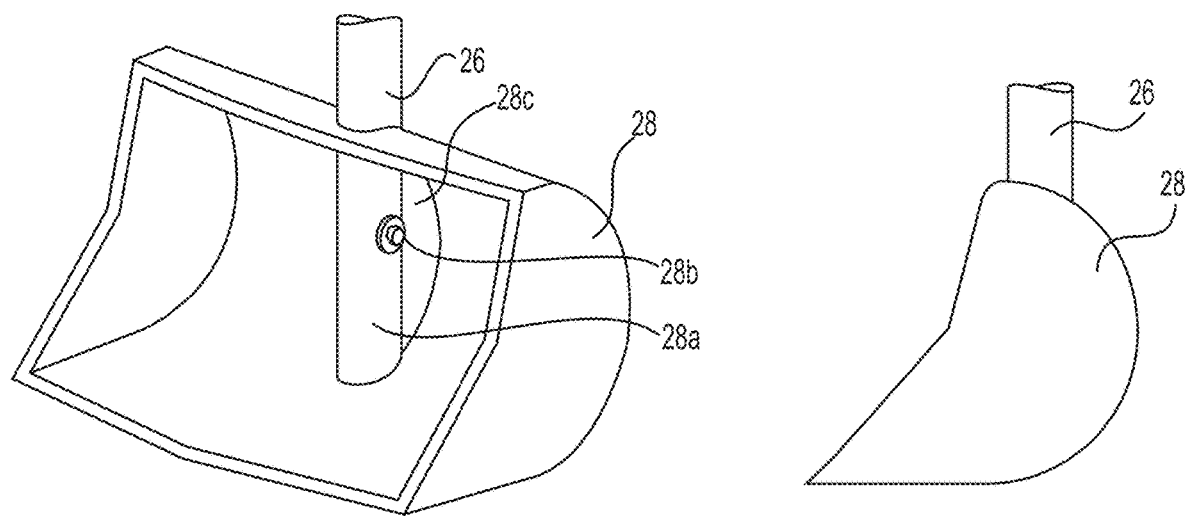
FIG. 6    FIG. 7

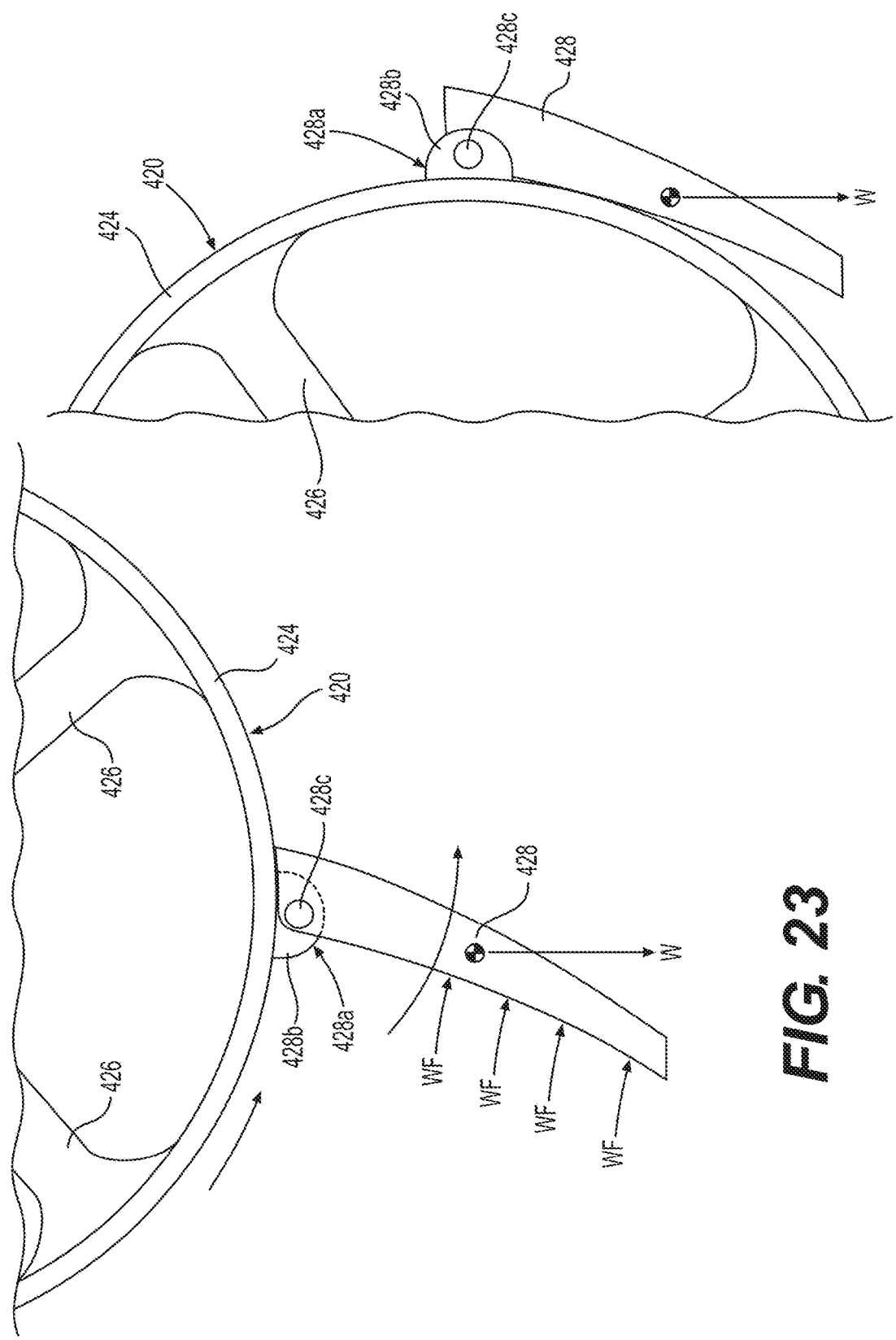

$$z + \frac{p}{\rho_w g} + \frac{v^2}{2g} = h + \frac{v^2}{2g} = H = \text{const.}$$

where:

$z$ .......... water height (m)

$p$ .......... water pressure (Pa)

$\rho_w$ .......... water density (kg/m³)

$g$ .......... gravitational constant (m/s²)

$v$ .......... water velocity (m/s)

$h = z + \frac{p}{\rho_w g}$ ... piezometric energetic height of the water flow, corresponding to geodetic height of the water free surface in an open channel (m)

$\frac{v^2}{2g}$ .......... kinetic energetic height of the water flow (m)

$H$ .......... total energetic height of the water flow (m)

FIG. 29

$$z_1 + \frac{p_1}{\rho_w g} + \frac{v_1^2}{2g} = z_2 + \frac{p_2}{\rho_w g} + \frac{v_2^2}{2g}, \text{ or}$$

$$h_1 + \frac{v_1^2}{2g} = h_2 + \frac{v_2^2}{2g}, \text{ or}$$

$$h_1 - h_2 = \frac{v_2^2}{2g} - \frac{v_1^2}{2g}$$

where: $i = 1,2$ ......... indexes two distant cross sections normal to water flow direction

FIG. 30

$$z_T + \frac{p_T}{\rho_w g} + \alpha \frac{\bar{v}^2}{2g} = h + \alpha \frac{\bar{v}^2}{2g} = H \neq \text{const.}$$

where: $z_T$ ......... height of water flow cross section center (m)

$p_T$ ......... hydrostatic pressure at water flow cross section center (Pa)

$$\alpha = \frac{\int_A v^3 dA}{\bar{v}^3 A}$$ ......... Coriolis number, coefficient of kinetic energy distribution within water flow cross section $$\bar{v} = \frac{\int_A v dA}{A}$$ ......... mean velocity of water flow at cross section (m/s)

FIG. 31

$$h_1 + \alpha_1 \frac{\overline{v}_1^2}{2g} = h_2 + \alpha_2 \frac{\overline{v}_2^2}{2g} + \Delta H, \text{ or}$$

$$h_1 - h_2 = \alpha_2 \frac{\overline{v}_2^2}{2g} - \alpha_1 \frac{\overline{v}_1^2}{2g} + \Delta H$$

where: $\Delta H$ ............ height of energetic losses due to hydrodynamic resistances to water flow (m)

$i = 1,2$ ............ indexes two distant fluid flow cross sections normal to water flow direction

FIG. 33

$$P = \frac{\delta E}{\delta t} = \dot{E} = {}_w g Q \left( z + \frac{p}{{}_w g} + \alpha \frac{\bar{v}^2}{2g} \right) = {}_w g Q \left( h + \alpha \frac{\bar{v}^2}{2g} \right) = {}_w g Q H$$

where:
- $P$ .................... hydropower of the water flow (W)
- $E$ .................... mechanical energy of the water flow (J)
- $\dot{E}$ .................... mechanical energy flux (W)
- $w$ .................... water density (kg/m$^3$)
- $g$ .................... gravitational constant (m/s$^2$)
- $Q = \int_A v dA$ ............ volumetric flow rate of the water (m$^3$/s)
- $v$ .................... water velocity (m/s)
- $A$ .................... cross section area of the water flow normal to direction of the flow, bounded by riverbed and free surface closed contour (m$^2$)
- $H = z + \dfrac{p}{{}_w g} + \alpha \dfrac{\bar{v}^2}{2g}$ ..head, energetic height (m)
- $z + \dfrac{p}{{}_w g} = h$ ........static head component, geodetic height of the free surface (m)
- $\alpha \dfrac{\bar{v}^2}{2g}$ ................dynamic head component (m)
- $\bar{v}$ ............. mean velocity of the water flow at cross section (m/s)

*FIG. 34*

$$v_{out} = R_w \omega$$

where: $R_w = R - \dfrac{h_p}{2}$ ......... working radius of the waterwheel (m)

$R$ ......... overall radius of the waterwheel (m)

$h_p$ ......... height of the paddle (m)

$\omega$ ......... constant angular speed of the waterwheel (rad/s)

FIG. 37

$$\dot{m}_w = \rho_w A_p (v_{in} - v_{out})$$

where: $\dot{m}_w$ ......... mass flow rate of the water (kg/s)

$A_w = b_p h_p$ ......... area of the wheel paddle (m$^2$)

FIG. 38

$$F_w = \frac{d}{dt}[m_w(v_{in} - v_{out})] = \dot{m}_w(v_{in} - v_{out}) = \rho_w A_p (v_{in} - v_{out})^2$$

where: $F_w$ ........ force of the water against wheel paddles (N)

where: $Q_w$ ........ torque load at waterwheel axis (Nm)

FIG. 40

$$Q_w = \rho_w A_p R_w (v_{in} - v_{out})^2$$

FIG. 41

$$H = \frac{v_{in}^2}{2g}$$

FIG. 42

$$P_{in} = \rho_w Q g H = \rho_w Q g \frac{v_{in}^2}{2g} = \frac{1}{2} \rho_w Q v_{in}^2$$

where: $P_{in}$ ......... input power delivered by the water flow (W)

$$P_{in} = \frac{1}{2} \rho_w A_p v_{in}^3$$

FIG. 45

$$P_h = F_w V_{out}$$

where: $P_h$ ......... hydraulic power of the waterwheel (W)

FIG. 46

$$P_h = \rho_w A_p (V_{in} - V_{out})^2 V_{out} = \rho_w A_p (V_{in} - V_{out})^2 V_{out}$$

FIG. 47

$$V_{out} = xV_{in}$$

where: $x$ ......... ratio between outlet and inlet water velocity, $0 \leq x \leq 1$

FIG. 48

$$F_w = \rho_w A_p (v_{in} - v_{out})^2 = \rho_w A_p v_{in}^2 (1-x)^2$$

FIG. 49

$$Q_w = \rho_w A_p R_w (v_{in} - v_{out})^2 = \rho_w A_p R_w v_{in}^2 (1-x)^2$$

FIG. 50

$$P_h = \rho_w A_p (v_{in} - v_{out})^2 v_{out} = \rho_w A_p v_{in}^3 x(1-x)^2$$

FIG. 51

$$\eta_h = \frac{P_h}{P_{in}}$$

where: $\eta_h$ ......... waterwheel hydraulic efficiency, $0 \leq \eta_h \leq 1$

FIG. 52

$$\eta_h = \frac{P_h}{P_{in}} = \frac{\rho_w A_p v_{in}^3 x(1-x)^2}{\frac{1}{2}\rho_w A_p v_{in}^3} = 2x(1-x)^2$$

FIG. 53

$$\frac{d\eta_h}{dx} = \frac{d}{dx}\left(2x^3 - 4x^2 + 2x\right) = 6x^2 - 8x + 2$$

FIG. 54

$$x = \frac{1}{3} \text{ and } x = 1$$

FIG. 55

$$v_{out,\eta_{out,max}} = \frac{1}{3}v_{in}$$

FIG. 56

$$\eta_{h,max} = 2 \times (1-x)^2 = \frac{2}{3}\left(\frac{2}{3}\right)^2 = \frac{8}{27} \approx 0.296$$

FIG. 57

$$F_{w,n_{h,max}} = \frac{4}{9} \rho_w A_p V_{in}^2$$

FIG. 58

$$Q_{w,n_{h,max}} = \frac{4}{9} \rho_w R_w A_p V_{in}^2$$

FIG. 59

$$P_{h,max} = \frac{4}{27} \rho_w A_p V_{in}^3$$

FIG. 60

$$P_m = \eta_f P_h = \eta_f \eta_{out} P_{in} = \eta_m P_{in} = \frac{1}{2}\eta_m \rho_w A_p v_{in}^3$$

where:

$P_m$ .......... mechanical power at waterwheel axis (W)

$\eta_f$ .......... frictional efficiency, $0.97 \le \eta_m \le 0.99$ $\eta_m = \eta_f \eta_{out}$ ..... mechanical efficiency

FIG. 61

$$Q_w = I\dot{\omega} + Q_m = I\dot{\omega} + Q_{eff} + Q_f$$

where:

$I$ .............. waterwheel mass moment of inertia (Kgm$^2$)

$\dot{\omega}$ ............ angular acceleration of the waterwheel (rad/s$^2$)

$Q_m$ ......... mechanical torque load at waterwheel axis (Nm)

$Q_{eff}$ ........ effective mechanical torque load at waterwheel axis (Nm)

$Q_f$ ........... torque load due to friction in bearings (Nm)

FIG. 62

$$Q_w = Q_{eff} + Q_f$$

FIG. 63

$$\eta_m = 0.2$$

FIG. 64

$$P_{el} = \eta_{el} P_m = \eta_{el} \eta_m P_{in} = \eta_{tot} P_{in} = \frac{1}{2} \eta_{el} \eta_m \rho_w A_p v_{in}^3$$

where:
$P_{el}$ .......... electrical power generated by the waterwheel (W)
$\eta_{el}$ .......... electrical efficiency, $0.95 \leq \eta_{el} \leq 0.99$
$\eta_{tot} = \eta_{el} \eta_m = \eta_{el} \eta_f \eta_h$ ........ total efficiency

FIG. 65

$$P_{el,max} = \eta_{tot,max} P_{in} = \eta_{h,max} P_{in} = \frac{8}{27} \frac{1}{2} \rho_w A_p v_{in}^3 = \frac{4}{27} \rho_w A_p v_{in}^3$$

where: $E_{el}$ ......... annual production of electrical energy (Wh/year)

$n$ ......... number of hours in operation per year (h/year)

FIG. 67

$$E_{el,max} = nP_{el,max} = 8760 \frac{4}{27} \rho_w A_p v_{in}^3 = \frac{11680}{9} \rho_w A_p v_{in}^3$$ (Eq. 39)

where: $E_{el,max}$ ......... maximum theoretical annual production of electrical energy (Wh/year)

$n = 8760$ ......... maximum number of hours in operation per year (h/year)

FIG. 68

$$Q_w = \dot{I}\omega + Q_m + Q_{el} = \dot{I}\omega + Q_{eff} + Q_f + Q_{el}$$

where:
- $I$ .......... waterwheel mass moment of inertia (kgm²)
- $\dot{\omega}$ .......... angular acceleration of the waterwheel (rad/s²)
- $Q_m$ .......... mechanical torque load at waterwheel axis (Nm)
- $Q_{el}$ .......... electrical torque load at waterwheel axis (Nm)
- $Q_{eff}$ .......... effective mechanical torque load at waterwheel axis (Nm)
- $Q_f$ .......... torque load due to friction in bearings (Nm)

FIG. 69

$$Q_w = Q_{eff} + Q_f + Q_{el}$$

FIG. 70

$$\eta_{tot,max} = \eta_{h,max} = \frac{8}{27}$$

FIG. 71

WATER FLOW INLET VELOCITY, $V_{IN}$ (m/s)

| $A_P$ (m²) | 0.3 | 0.4 | 0.5 | 0.6 | 0.7 | 0.8 |
|---|---|---|---|---|---|---|
| 0.01 | 0.000 | 0.000 | 0.001 | 0.001 | 0.002 | 0.003 |
| 0.02 | 0.000 | 0.001 | 0.001 | 0.002 | 0.003 | 0.005 |
| 0.03 | 0.000 | 0.001 | 0.002 | 0.003 | 0.005 | 0.008 |
| 0.04 | 0.001 | 0.001 | 0.003 | 0.004 | 0.007 | 0.010 |
| 0.05 | 0.001 | 0.002 | 0.003 | 0.005 | 0.009 | 0.013 |
| 0.06 | 0.001 | 0.002 | 0.004 | 0.006 | 0.010 | 0.015 |
| 0.07 | 0.001 | 0.002 | 0.004 | 0.008 | 0.012 | 0.018 |
| 0.08 | 0.001 | 0.003 | 0.005 | 0.009 | 0.014 | 0.020 |
| 0.09 | 0.001 | 0.003 | 0.006 | 0.010 | 0.015 | 0.023 |
| 0.1 | 0.001 | 0.003 | 0.006 | 0.011 | 0.017 | 0.026 |
| 0.2 | 0.003 | 0.006 | 0.013 | 0.022 | 0.034 | 0.051 |
| 0.3 | 0.004 | 0.010 | 0.019 | 0.032 | 0.051 | 0.077 |
| 0.4 | 0.005 | 0.013 | 0.025 | 0.043 | 0.069 | 0.102 |
| 0.5 | 0.007 | 0.016 | 0.031 | 0.054 | 0.086 | 0.128 |
| 0.6 | 0.008 | 0.019 | 0.038 | 0.065 | 0.103 | 0.154 |
| 0.7 | 0.009 | 0.022 | 0.044 | 0.076 | 0.120 | 0.179 |
| 0.8 | 0.011 | 0.026 | 0.050 | 0.086 | 0.137 | 0.205 |
| 0.9 | 0.012 | 0.029 | 0.056 | 0.097 | 0.154 | 0.230 |
| 1 | 0.014 | 0.032 | 0.063 | 0.108 | 0.172 | 0.256 |
| 2 | 0.027 | 0.064 | 0.125 | 0.216 | 0.343 | 0.512 |
| 3 | 0.041 | 0.096 | 0.188 | 0.324 | 0.514 | 0.768 |
| 4 | 0.054 | 0.128 | 0.250 | 0.432 | 0.686 | 1.024 |
| 5 | 0.068 | 0.160 | 0.313 | 0.540 | 0.857 | 1.280 |
| 6 | 0.081 | 0.192 | 0.375 | 0.648 | 1.029 | 1.536 |
| 7 | 0.095 | 0.224 | 0.438 | 0.756 | 1.201 | 1.792 |
| 8 | 0.108 | 0.256 | 0.500 | 0.864 | 1.372 | 2.048 |
| 9 | 0.122 | 0.288 | 0.563 | 0.972 | 1.544 | 2.304 |
| 10 | 0.135 | 0.320 | 0.625 | 1.080 | 1.715 | 2.560 |
| 15 | 0.203 | 0.480 | 0.938 | 1.620 | 2.572 | 3.840 |
| 20 | 0.270 | 0.640 | 1.250 | 2.160 | 3.430 | 5.120 |
| 25 | 0.338 | 0.800 | 1.563 | 2.700 | 4.287 | 6.400 |
| 30 | 0.405 | 0.960 | 1.875 | 3.240 | 5.145 | 7.680 |
| 35 | 0.473 | 1.120 | 2.188 | 3.780 | 6.002 | 8.960 |
| 40 | 0.540 | 1.280 | 2.500 | 4.320 | 6.860 | 10.240 |
| 45 | 0.608 | 1.440 | 2.813 | 4.860 | 7.717 | 11.520 |
| 50 | 0.675 | 1.600 | 3.125 | 5.400 | 8.575 | 12.800 |
| 55 | 0.742 | 1.760 | 3.438 | 5.940 | 9.432 | 14.080 |
| 60 | 0.810 | 1.920 | 3.750 | 6.480 | 10.290 | 15.360 |
| 65 | 0.877 | 2.080 | 4.063 | 7.020 | 11.148 | 16.640 |
| 70 | 0.945 | 2.240 | 4.375 | 7.560 | 12.005 | 17.920 |
| 75 | 1.013 | 2.400 | 4.688 | 8.100 | 12.863 | 19.200 |
| 80 | 1.080 | 2.560 | 5.000 | 8.640 | 13.720 | 20.480 |
| 85 | 1.148 | 2.720 | 5.313 | 9.180 | 14.578 | 21.760 |
| 90 | 1.215 | 2.880 | 5.625 | 9.720 | 15.435 | 23.040 |
| 95 | 1.283 | 3.040 | 5.938 | 10.260 | 16.293 | 24.320 |
| 100 | 1.350 | 3.200 | 6.250 | 10.800 | 17.150 | 25.600 |

WATERWHEEL PADDLE AREA, $A_P$ (m²)

TO FIG. 72 CONT. 1

*FIG. 72* TABLE 5-1: ANALYTICAL CALCULATIONS INPUT POWER $P_{IN}$ (kW) AS FUNCTION OF WATER FLOW VELOCITY $V_{IN}$ AND PADDLE AREA $A_P$ ($P_W$ = 1000 kg/m³)

| WATER FLOW INLET VELOCITY, $V_{IN}$ (m/s) | | | | | |
|---|---|---|---|---|---|
| 0.9 | 1 | 2 | 3 | 4 | 5 |
| 0.004 | 0.005 | 0.040 | 0.135 | 0.320 | 0.625 |
| 0.007 | 0.010 | 0.080 | 0.270 | 0.640 | 1.250 |
| 0.011 | 0.015 | 0.120 | 0.405 | 0.960 | 1.875 |
| 0.015 | 0.020 | 0.160 | 0.540 | 1.280 | 2.500 |
| 0.018 | 0.025 | 0.200 | 0.675 | 1.600 | 3.125 |
| 0.022 | 0.030 | 0.240 | 0.810 | 1.920 | 3.750 |
| 0.026 | 0.035 | 0.280 | 0.945 | 2.240 | 4.375 |
| 0.029 | 0.040 | 0.320 | 1.080 | 2.560 | 5.000 |
| 0.033 | 0.045 | 0.360 | 1.215 | 2.880 | 5.625 |
| 0.036 | 0.050 | 0.400 | 1.350 | 3.200 | 6.250 |
| 0.073 | 0.100 | 0.800 | 2.700 | 6.400 | 12.500 |
| 0.109 | 0.150 | 1.200 | 4.050 | 9.600 | 18.750 |
| 0.146 | 0.200 | 1.600 | 5.400 | 12.800 | 25.000 |
| 0.182 | 0.250 | 2.000 | 6.750 | 16.000 | 31.250 |
| 0.219 | 0.300 | 2.400 | 8.100 | 19.200 | 37.500 |
| 0.255 | 0.350 | 2.800 | 9.450 | 22.400 | 43.750 |
| 0.292 | 0.400 | 3.200 | 10.800 | 25.600 | 50.000 |
| 0.328 | 0.450 | 3.600 | 12.150 | 28.800 | 56.250 |
| 0.365 | 0.500 | 4.000 | 13.500 | 32.000 | 62.500 |
| 0.729 | 1.000 | 8.000 | 27.000 | 64.000 | 125.000 |
| 1.094 | 1.500 | 12.000 | 40.500 | 96.000 | 187.500 |
| 1.458 | 2.000 | 16.000 | 54.000 | 128.000 | 250.000 |
| 1.823 | 2.500 | 20.000 | 67.500 | 160.000 | 312.500 |
| 2.187 | 3.000 | 24.000 | 81.000 | 192.000 | 375.000 |
| 2.552 | 3.500 | 28.000 | 94.500 | 224.000 | 437.500 |
| 2.916 | 4.000 | 32.000 | 108.000 | 256.000 | 500.000 |
| 3.281 | 4.500 | 36.000 | 121.500 | 288.000 | 562.500 |
| 3.645 | 5.000 | 40.000 | 135.000 | 320.000 | 625.000 |
| 5.468 | 7.500 | 60.000 | 202.500 | 480.000 | 937.500 |
| 7.290 | 10.000 | 80.000 | 270.000 | 640.000 | 1250.000 |
| 9.113 | 12.500 | 100.000 | 337.500 | 800.000 | 1562.500 |
| 10.935 | 15.000 | 120.000 | 405.000 | 960.000 | 1875.000 |
| 12.758 | 17.500 | 140.000 | 472.500 | 1120.000 | 2187.500 |
| 14.580 | 20.000 | 160.000 | 540.000 | 1280.000 | 2500.000 |
| 16.403 | 22.500 | 180.000 | 607.500 | 1440.000 | 2812.500 |
| 18.225 | 25.000 | 200.000 | 675.000 | 1600.000 | 3125.000 |
| 20.048 | 27.500 | 220.000 | 742.500 | 1760.000 | 3437.500 |
| 21.870 | 30.000 | 240.000 | 810.000 | 1920.000 | 3750.000 |
| 23.693 | 32.500 | 260.000 | 877.500 | 2080.000 | 4062.500 |
| 25.515 | 35.000 | 280.000 | 945.000 | 2240.000 | 4375.000 |
| 27.338 | 37.500 | 300.000 | 1012.500 | 2400.000 | 4687.500 |
| 29.160 | 40.000 | 320.000 | 1080.000 | 2560.000 | 5000.000 |
| 30.983 | 42.500 | 340.000 | 1147.500 | 2720.000 | 5312.500 |
| 32.805 | 45.000 | 360.000 | 1215.000 | 2880.000 | 5625.000 |
| 34.628 | 47.500 | 380.000 | 1282.500 | 3040.000 | 5937.500 |
| 36.450 | 50.000 | 400.000 | 1350.000 | 3200.000 | 6250.000 |

TABLE 5-1: ANALYTICAL CALCULATIONS INPUT POWER $P_{IN}$ (kW) AS FUNCTION OF WATER FLOW VELOCITY $V_{IN}$ AND PADDLE AREA $A_P$ ($P_W$ = 1000 kg/m³)

*FIG. 72 CONT. 1*

| WATER FLOW INLET VELOCITY, $V_{IN}$ (m/s) | | | | |
|---|---|---|---|---|
| 6 | 7 | 8 | 9 | 10 |
| 1.080 | 1.715 | 2.560 | 3.645 | 5.000 |
| 2.160 | 3.430 | 5.120 | 7.290 | 10.000 |
| 3.240 | 5.145 | 7.680 | 10.935 | 15.000 |
| 4.320 | 6.860 | 10.240 | 14.580 | 20.000 |
| 5.400 | 8.575 | 12.800 | 18.225 | 25.000 |
| 6.480 | 10.290 | 15.360 | 21.870 | 30.000 |
| 7.560 | 12.005 | 17.920 | 25.515 | 35.000 |
| 8.640 | 13.720 | 20.480 | 29.160 | 40.000 |
| 9.720 | 15.435 | 23.040 | 32.805 | 45.000 |
| 10.800 | 17.150 | 25.600 | 36.450 | 50.000 |
| 21.600 | 34.300 | 51.200 | 72.900 | 100.000 |
| 32.400 | 51.450 | 76.800 | 109.350 | 150.000 |
| 43.200 | 68.600 | 102.400 | 145.800 | 200.000 |
| 54.000 | 85.750 | 128.000 | 182.250 | 250.000 |
| 64.800 | 102.900 | 153.600 | 218.700 | 300.000 |
| 75.600 | 120.050 | 179.200 | 255.150 | 350.000 |
| 86.400 | 137.200 | 204.800 | 291.600 | 400.000 |
| 97.200 | 154.350 | 230.400 | 328.050 | 450.000 |
| 108.000 | 171.500 | 256.000 | 364.500 | 500.000 |
| 216.000 | 343.000 | 512.000 | 729.000 | 1000.000 |
| 324.000 | 514.500 | 768.000 | 1093.500 | 1500.000 |
| 432.000 | 686.000 | 1024.000 | 1458.000 | 2000.000 |
| 540.000 | 857.500 | 1280.000 | 1822.500 | 2500.000 |
| 648.000 | 1029.000 | 1536.000 | 2187.000 | 3000.000 |
| 756.000 | 1200.500 | 1792.000 | 2551.500 | 3500.000 |
| 864.000 | 1372.000 | 2048.000 | 2916.000 | 4000.000 |
| 972.000 | 1543.500 | 2304.000 | 3280.500 | 4500.000 |
| 1080.000 | 1715.000 | 2560.000 | 3645.000 | 5000.000 |
| 1620.000 | 2572.500 | 3840.000 | 5467.500 | 7500.000 |
| 2160.000 | 3430.000 | 5120.000 | 7290.000 | 10000.000 |
| 2700.000 | 4287.500 | 6400.000 | 9112.500 | 12500.000 |
| 3240.000 | 5145.000 | 7680.000 | 10935.000 | 15000.000 |
| 3780.000 | 6002.500 | 8960.000 | 12757.500 | 17500.000 |
| 4320.000 | 6860.000 | 10240.000 | 14580.000 | 20000.000 |
| 4860.000 | 7717.500 | 11520.000 | 16402.500 | 22500.000 |
| 5400.000 | 8575.000 | 12800.000 | 18225.000 | 25000.000 |
| 5940.000 | 9432.500 | 14080.000 | 20047.500 | 27500.000 |
| 6480.000 | 10290.000 | 15360.000 | 21870.000 | 30000.000 |
| 7020.000 | 11147.500 | 16640.000 | 23692.500 | 32500.000 |
| 7560.000 | 12005.000 | 17920.000 | 25515.000 | 35000.000 |
| 8100.000 | 12862.500 | 19200.000 | 27337.500 | 37500.000 |
| 8640.000 | 13720.000 | 20480.000 | 29160.000 | 40000.000 |
| 9180.000 | 14577.500 | 21760.000 | 30982.500 | 42500.000 |
| 9720.000 | 15435.000 | 23040.000 | 32805.000 | 45000.000 |
| 10260.000 | 16292.500 | 24320.000 | 34627.500 | 47500.000 |
| 10800.000 | 17150.000 | 25600.000 | 36450.000 | 50000.000 |

FIG. 72 CONT. 2

TABLE 5-1: ANALYTICAL CALCULATIONS INPUT POWER $P_{IN}$ (kW) AS FUNCTION OF WATER FLOW VELOCITY $V_{IN}$ AND PADDLE AREA $A_P$ ($P_W$ = 1000 kg/m$^3$)

| WATERWHEEL PADDLE AREA, $A_p$ (m²) | \multicolumn{6}{c}{WATER FLOW INLET VELOCITY, $V_{IN}$ (m/s)} |
|---|---|---|---|---|---|---|
| | 0.3 | 0.4 | 0.5 | 0.6 | 0.7 | 0.8 |
| 0.01 | 0.000 | 0.001 | 0.001 | 0.002 | 0.002 | 0.003 |
| 0.02 | 0.001 | 0.001 | 0.002 | 0.003 | 0.004 | 0.006 |
| 0.03 | 0.001 | 0.002 | 0.003 | 0.005 | 0.007 | 0.009 |
| 0.04 | 0.002 | 0.003 | 0.004 | 0.006 | 0.009 | 0.011 |
| 0.05 | 0.002 | 0.004 | 0.006 | 0.008 | 0.011 | 0.014 |
| 0.06 | 0.002 | 0.004 | 0.007 | 0.010 | 0.013 | 0.017 |
| 0.07 | 0.003 | 0.005 | 0.008 | 0.011 | 0.015 | 0.020 |
| 0.08 | 0.003 | 0.006 | 0.009 | 0.013 | 0.017 | 0.023 |
| 0.09 | 0.004 | 0.006 | 0.010 | 0.014 | 0.020 | 0.026 |
| 0.1 | 0.004 | 0.007 | 0.011 | 0.016 | 0.022 | 0.028 |
| 0.2 | 0.008 | 0.014 | 0.022 | 0.032 | 0.044 | 0.057 |
| 0.3 | 0.012 | 0.021 | 0.033 | 0.048 | 0.065 | 0.085 |
| 0.4 | 0.016 | 0.028 | 0.044 | 0.064 | 0.087 | 0.114 |
| 0.5 | 0.020 | 0.036 | 0.056 | 0.080 | 0.109 | 0.142 |
| 0.6 | 0.024 | 0.043 | 0.067 | 0.096 | 0.131 | 0.171 |
| 0.7 | 0.028 | 0.050 | 0.078 | 0.112 | 0.152 | 0.199 |
| 0.8 | 0.032 | 0.057 | 0.089 | 0.128 | 0.174 | 0.228 |
| 0.9 | 0.036 | 0.064 | 0.100 | 0.144 | 0.196 | 0.256 |
| 1 | 0.040 | 0.071 | 0.111 | 0.160 | 0.218 | 0.284 |
| 2 | 0.080 | 0.142 | 0.222 | 0.320 | 0.436 | 0.569 |
| 3 | 0.120 | 0.213 | 0.333 | 0.480 | 0.653 | 0.853 |
| 4 | 0.160 | 0.284 | 0.444 | 0.640 | 0.871 | 1.138 |
| 5 | 0.200 | 0.356 | 0.556 | 0.800 | 1.089 | 1.422 |
| 6 | 0.240 | 0.427 | 0.667 | 0.960 | 1.307 | 1.707 |
| 7 | 0.280 | 0.498 | 0.778 | 1.120 | 1.524 | 1.991 |
| 8 | 0.320 | 0.569 | 0.889 | 1.280 | 1.742 | 2.276 |
| 9 | 0.360 | 0.640 | 1.000 | 1.440 | 1.960 | 2.560 |
| 10 | 0.400 | 0.711 | 1.111 | 1.600 | 2.178 | 2.844 |
| 15 | 0.600 | 1.067 | 1.667 | 2.400 | 3.267 | 4.267 |
| 20 | 0.800 | 1.422 | 2.222 | 3.200 | 4.356 | 5.689 |
| 25 | 1.000 | 1.778 | 2.778 | 4.000 | 5.444 | 7.111 |
| 30 | 1.200 | 2.133 | 3.333 | 4.800 | 6.533 | 8.533 |
| 35 | 1.400 | 2.489 | 3.889 | 5.600 | 7.622 | 9.955 |
| 40 | 1.600 | 2.844 | 4.444 | 6.400 | 8.711 | 11.378 |
| 45 | 1.800 | 3.200 | 5.000 | 7.200 | 9.800 | 12.800 |
| 50 | 2.000 | 3.556 | 5.556 | 8.000 | 10.889 | 14.222 |
| 55 | 2.200 | 3.911 | 6.111 | 8.800 | 11.978 | 15.644 |
| 60 | 2.400 | 4.267 | 6.667 | 9.600 | 13.067 | 17.066 |
| 65 | 2.600 | 4.622 | 7.222 | 10.400 | 14.155 | 18.489 |
| 70 | 2.800 | 4.978 | 7.778 | 11.200 | 15.244 | 19.911 |
| 75 | 3.000 | 5.333 | 8.333 | 12.000 | 16.333 | 21.333 |
| 80 | 3.200 | 5.689 | 8.889 | 12.800 | 17.422 | 22.755 |
| 85 | 3.400 | 6.044 | 9.444 | 13.600 | 18.511 | 24.178 |
| 90 | 3.600 | 6.400 | 10.000 | 14.400 | 19.600 | 25.600 |
| 95 | 3.800 | 6.755 | 10.555 | 15.200 | 20.689 | 27.022 |
| 100 | 4.000 | 7.111 | 11.111 | 16.000 | 21.778 | 28.444 |

TO FIG. 74 CONT. 1

FIG. 74 TABLE 5-2: ANALYTICAL CALCULATIONS FORCE LOAD $F_{w,\eta h,max}$ (kN) AS FUNCTION OF WATER FLOW VELOCITY $V_{in}$ AND PADDLE AREA $A_p$ ($\rho_w = 1000$ kg/m³, $\eta_{tot,max} = 8/27 \approx 0.296$)

| WATER FLOW INLET VELOCITY, VIN (m/s) | | | | | |
|---|---|---|---|---|---|
| 0.9 | 1 | 2 | 3 | 4 | 5 |
| 0.004 | 0.004 | 0.018 | 0.040 | 0.071 | 0.111 |
| 0.007 | 0.009 | 0.036 | 0.080 | 0.142 | 0.222 |
| 0.011 | 0.013 | 0.053 | 0.120 | 0.213 | 0.333 |
| 0.014 | 0.018 | 0.071 | 0.160 | 0.284 | 0.444 |
| 0.018 | 0.022 | 0.089 | 0.200 | 0.356 | 0.556 |
| 0.022 | 0.027 | 0.107 | 0.240 | 0.427 | 0.667 |
| 0.025 | 0.031 | 0.124 | 0.280 | 0.498 | 0.778 |
| 0.029 | 0.036 | 0.142 | 0.320 | 0.569 | 0.889 |
| 0.032 | 0.040 | 0.160 | 0.360 | 0.640 | 1.000 |
| 0.036 | 0.044 | 0.178 | 0.400 | 0.711 | 1.111 |
| 0.072 | 0.089 | 0.356 | 0.800 | 1.422 | 2.222 |
| 0.108 | 0.133 | 0.533 | 1.200 | 2.133 | 3.333 |
| 0.144 | 0.178 | 0.711 | 1.600 | 2.844 | 4.444 |
| 0.180 | 0.222 | 0.889 | 2.000 | 3.556 | 5.556 |
| 0.216 | 0.267 | 1.067 | 2.400 | 4.267 | 6.667 |
| 0.252 | 0.311 | 1.244 | 2.800 | 4.978 | 7.778 |
| 0.288 | 0.356 | 1.422 | 3.200 | 5.689 | 8.889 |
| 0.324 | 0.400 | 1.600 | 3.600 | 6.400 | 10.000 |
| 0.360 | 0.444 | 1.778 | 4.000 | 7.111 | 11.111 |
| 0.720 | 0.889 | 3.556 | 8.000 | 14.222 | 22.222 |
| 1.080 | 1.333 | 5.333 | 12.000 | 21.333 | 33.333 |
| 1.440 | 1.778 | 7.111 | 16.000 | 28.444 | 44.444 |
| 1.800 | 2.222 | 8.889 | 20.000 | 35.555 | 55.555 |
| 2.160 | 2.667 | 10.667 | 24.000 | 42.666 | 66.666 |
| 2.520 | 3.111 | 12.444 | 28.000 | 49.777 | 77.777 |
| 2.880 | 3.556 | 14.222 | 32.000 | 56.888 | 88.888 |
| 3.240 | 4.000 | 16.000 | 36.000 | 63.999 | 99.999 |
| 3.600 | 4.444 | 17.778 | 40.000 | 71.110 | 111.110 |
| 5.400 | 6.667 | 26.666 | 59.999 | 106.666 | 166.665 |
| 7.200 | 8.889 | 35.555 | 79.999 | 142.221 | 222.220 |
| 9.000 | 11.111 | 44.444 | 99.999 | 177.776 | 277.775 |
| 10.800 | 13.333 | 53.333 | 119.999 | 213.331 | 333.330 |
| 12.600 | 15.555 | 62.222 | 139.999 | 248.886 | 388.885 |
| 14.400 | 17.778 | 71.110 | 159.998 | 284.442 | 444.440 |
| 16.200 | 20.000 | 79.999 | 179.998 | 319.997 | 499.995 |
| 18.000 | 22.222 | 88.888 | 199.998 | 355.552 | 555.550 |
| 19.800 | 24.444 | 97.777 | 219.998 | 391.107 | 611.105 |
| 21.600 | 26.666 | 106.666 | 239.998 | 426.662 | 666.660 |
| 23.400 | 28.889 | 115.554 | 259.997 | 462.218 | 722.215 |
| 25.200 | 31.111 | 124.443 | 279.997 | 497.773 | 777.770 |
| 27.000 | 33.333 | 133.332 | 299.997 | 533.328 | 833.325 |
| 28.800 | 35.555 | 142.221 | 319.997 | 568.883 | 888.880 |
| 30.600 | 37.777 | 151.110 | 339.997 | 604.438 | 944.435 |
| 32.400 | 40.000 | 159.998 | 359.996 | 639.994 | 999.990 |
| 34.200 | 42.222 | 168.887 | 379.996 | 675.549 | 1055.545 |
| 36.000 | 44.444 | 177.776 | 399.996 | 711.104 | 1111.100 |

FROM FIG. 74

TABLE 5-2: ANALYTICAL CALCULATIONS FORCE LOAD $F_{w,\eta h,max}$ (kN) AS FUNCTION OF WATER FLOW VELOCITY $V_{in}$ AND PADDLE AREA $A_p$ ($\rho_w$ = 1000 kg/m$^3$, $\eta_{tot,max}$ = 8/27 ≈ 0.296)

| WATER FLOW INLET VELOCITY, V$_{IN}$ (m/s) | | | | |
|---|---|---|---|---|
| 6 | 7 | 8 | 9 | 10 |
| 0.160 | 0.218 | 0.284 | 0.360 | 0.444 |
| 0.320 | 0.436 | 0.569 | 0.720 | 0.889 |
| 0.480 | 0.653 | 0.853 | 1.080 | 1.333 |
| 0.640 | 0.871 | 1.138 | 1.440 | 1.778 |
| 0.800 | 1.089 | 1.422 | 1.800 | 2.222 |
| 0.960 | 1.307 | 1.707 | 2.160 | 2.667 |
| 1.120 | 1.524 | 1.991 | 2.520 | 3.111 |
| 1.280 | 1.742 | 2.276 | 2.880 | 3.556 |
| 1.440 | 1.960 | 2.560 | 3.240 | 4.000 |
| 1.600 | 2.178 | 2.844 | 3.600 | 4.444 |
| 3.200 | 4.356 | 5.689 | 7.200 | 8.889 |
| 4.800 | 6.533 | 8.533 | 10.800 | 13.333 |
| 6.400 | 8.711 | 11.378 | 14.400 | 17.778 |
| 8.000 | 10.889 | 14.222 | 18.000 | 22.222 |
| 9.600 | 13.067 | 17.066 | 21.600 | 26.666 |
| 11.200 | 15.244 | 19.911 | 25.200 | 31.111 |
| 12.800 | 17.422 | 22.755 | 28.800 | 35.555 |
| 14.400 | 19.600 | 25.600 | 32.400 | 40.000 |
| 16.000 | 21.778 | 28.444 | 36.000 | 44.444 |
| 32.000 | 43.555 | 56.888 | 71.999 | 88.888 |
| 48.000 | 65.333 | 85.332 | 107.999 | 133.332 |
| 63.999 | 87.110 | 113.777 | 143.999 | 177.776 |
| 79.999 | 108.888 | 142.221 | 179.998 | 222.220 |
| 95.999 | 130.665 | 170.665 | 215.998 | 266.664 |
| 111.999 | 152.443 | 199.109 | 251.997 | 311.108 |
| 127.999 | 174.220 | 227.553 | 287.997 | 355.552 |
| 143.999 | 195.998 | 255.997 | 323.997 | 399.996 |
| 159.998 | 217.776 | 284.442 | 359.996 | 444.440 |
| 239.998 | 326.663 | 426.662 | 539.995 | 666.660 |
| 319.997 | 435.551 | 568.883 | 719.993 | 888.880 |
| 399.996 | 544.439 | 711.104 | 899.991 | 1111.100 |
| 479.995 | 653.327 | 853.325 | 1079.989 | 1333.320 |
| 559.994 | 762.215 | 995.546 | 1295.987 | 1555.540 |
| 639.994 | 871.102 | 1137.766 | 1439.986 | 1777.760 |
| 719.993 | 979.990 | 1279.987 | 1619.984 | 1999.980 |
| 799.992 | 1088.878 | 1422.208 | 1799.982 | 2222.200 |
| 879.991 | 1197.766 | 1564.429 | 1979.980 | 2444.420 |
| 959.990 | 1306.654 | 1706.650 | 2159.978 | 2666.640 |
| 1039.990 | 1415.541 | 1848.870 | 2339.977 | 2888.860 |
| 1119.989 | 1524.429 | 1991.091 | 2519.975 | 3111.080 |
| 1199.988 | 1633.317 | 2133.312 | 2699.973 | 3333.300 |
| 1279.987 | 1742.205 | 2275.533 | 2879.971 | 3555.520 |
| 1359.986 | 1851.093 | 2417.754 | 3059.969 | 3777.740 |
| 1439.986 | 1959.980 | 2559.974 | 3239.968 | 3999.960 |
| 1519.985 | 2068.868 | 2702.195 | 3419.966 | 4222.180 |
| 1599.984 | 2177.756 | 2844.416 | 3599.964 | 4444.400 |

FROM FIG. 74 CONT. 1

FIG. 74 CONT. 2

TABLE 5-2: ANALYTICAL CALCULATIONS FORCE LOAD $F_{w,\eta h,max}$ (kN) AS FUNCTION OF WATER FLOW VELOCITY $V_{in}$ AND PADDLE AREA $A_p$ ($P_w$ = 1000 kg/m$^3$, $\eta_{tot,max}$ = 8/27 ≈ 0.296)

| $A_p$ (m²) \ $V_{in}$ (m/s) | 0.3 | 0.4 | 0.5 | 0.6 | 0.7 | 0.8 | 0.9 |
|---|---|---|---|---|---|---|---|
| 0.01 | 0.000 | 0.000 | 0.000 | 0.000 | 0.001 | 0.001 | 0.001 |
| 0.02 | 0.000 | 0.000 | 0.000 | 0.001 | 0.001 | 0.002 | 0.002 |
| 0.03 | 0.000 | 0.000 | 0.001 | 0.001 | 0.002 | 0.002 | 0.003 |
| 0.04 | 0.000 | 0.000 | 0.001 | 0.001 | 0.002 | 0.003 | 0.004 |
| 0.05 | 0.000 | 0.000 | 0.001 | 0.002 | 0.003 | 0.004 | 0.005 |
| 0.06 | 0.000 | 0.001 | 0.001 | 0.002 | 0.003 | 0.005 | 0.006 |
| 0.07 | 0.000 | 0.001 | 0.001 | 0.002 | 0.004 | 0.005 | 0.008 |
| 0.08 | 0.000 | 0.001 | 0.001 | 0.003 | 0.004 | 0.006 | 0.009 |
| 0.09 | 0.000 | 0.001 | 0.002 | 0.003 | 0.005 | 0.007 | 0.010 |
| 0.1 | 0.000 | 0.001 | 0.002 | 0.003 | 0.005 | 0.008 | 0.011 |
| 0.2 | 0.001 | 0.002 | 0.004 | 0.006 | 0.010 | 0.015 | 0.022 |
| 0.3 | 0.001 | 0.003 | 0.006 | 0.010 | 0.015 | 0.023 | 0.032 |
| 0.4 | 0.002 | 0.004 | 0.007 | 0.013 | 0.020 | 0.030 | 0.043 |
| 0.5 | 0.002 | 0.005 | 0.009 | 0.016 | 0.025 | 0.038 | 0.054 |
| 0.6 | 0.002 | 0.006 | 0.011 | 0.019 | 0.030 | 0.046 | 0.065 |
| 0.7 | 0.003 | 0.007 | 0.013 | 0.022 | 0.036 | 0.053 | 0.076 |
| 0.8 | 0.003 | 0.008 | 0.015 | 0.026 | 0.041 | 0.061 | 0.086 |
| 0.9 | 0.004 | 0.009 | 0.017 | 0.029 | 0.046 | 0.068 | 0.097 |
| 1 | 0.004 | 0.009 | 0.019 | 0.032 | 0.051 | 0.076 | 0.108 |
| 2 | 0.008 | 0.019 | 0.037 | 0.064 | 0.102 | 0.152 | 0.216 |
| 3 | 0.012 | 0.028 | 0.056 | 0.096 | 0.152 | 0.228 | 0.324 |
| 4 | 0.016 | 0.038 | 0.074 | 0.128 | 0.203 | 0.303 | 0.432 |
| 5 | 0.020 | 0.047 | 0.093 | 0.160 | 0.254 | 0.379 | 0.540 |
| 6 | 0.024 | 0.057 | 0.111 | 0.192 | 0.305 | 0.455 | 0.648 |
| 7 | 0.028 | 0.066 | 0.130 | 0.224 | 0.356 | 0.531 | 0.756 |
| 8 | 0.032 | 0.076 | 0.148 | 0.256 | 0.407 | 0.607 | 0.864 |
| 9 | 0.036 | 0.085 | 0.167 | 0.288 | 0.457 | 0.683 | 0.972 |
| 10 | 0.040 | 0.095 | 0.185 | 0.320 | 0.508 | 0.759 | 1.080 |
| 15 | 0.060 | 0.142 | 0.278 | 0.480 | 0.762 | 1.138 | 1.620 |
| 20 | 0.080 | 0.190 | 0.370 | 0.640 | 1.016 | 1.517 | 2.160 |
| 25 | 0.100 | 0.237 | 0.463 | 0.800 | 1.270 | 1.896 | 2.700 |
| 30 | 0.120 | 0.284 | 0.556 | 0.960 | 1.524 | 2.276 | 3.240 |
| 35 | 0.140 | 0.332 | 0.648 | 1.120 | 1.779 | 2.655 | 3.780 |
| 40 | 0.160 | 0.379 | 0.741 | 1.280 | 2.033 | 3.034 | 4.320 |
| 45 | 0.180 | 0.427 | 0.833 | 1.440 | 2.287 | 3.413 | 4.860 |
| 50 | 0.200 | 0.474 | 0.926 | 1.600 | 2.541 | 3.793 | 5.400 |
| 55 | 0.220 | 0.521 | 1.019 | 1.760 | 2.795 | 4.172 | 5.940 |
| 60 | 0.240 | 0.569 | 1.111 | 1.920 | 3.049 | 4.551 | 6.480 |
| 65 | 0.260 | 0.616 | 1.204 | 2.080 | 3.303 | 4.930 | 7.020 |
| 70 | 0.280 | 0.664 | 1.296 | 2.240 | 3.557 | 5.310 | 7.560 |
| 75 | 0.300 | 0.711 | 1.389 | 2.400 | 3.811 | 5.689 | 8.100 |
| 80 | 0.320 | 0.759 | 1.481 | 2.560 | 4.065 | 6.068 | 8.640 |
| 85 | 0.340 | 0.806 | 1.574 | 2.720 | 4.319 | 6.447 | 9.180 |
| 90 | 0.360 | 0.853 | 1.667 | 2.880 | 4.573 | 6.827 | 9.720 |
| 95 | 0.380 | 0.901 | 1.759 | 3.040 | 4.827 | 7.206 | 10.260 |
| 100 | 0.400 | 0.948 | 1.852 | 3.200 | 5.081 | 7.585 | 10.800 |

WATER FLOW INLET VELOCITY, $V_{IN}$ (m/s)

WATERWHEEL PADDLE AREA, $A_p$ (m²)

TO FIG. 76 CONT. 1

FIG. 76  TABLE 5-3: ANALYTICAL CALCULATIONS MAXIMUM THEORETICAL ELECTRICAL POWER $P_{el,max}$ (kW) AS FUNCTION OF WATER FLOW VELOCITY $V_{in}$ AND PADDLE AREA $A_p$ ($\rho_w$ = 1000 kg/m³, $\eta_{tot,max}$ = 8/27 ≈ 0.296)

| WATER FLOW INLET VELOCITY, $V_{IN}$ (m/s) | | | | |
|---|---|---|---|---|
| 1 | 2 | 3 | 4 | 5 |
| 0.001 | 0.012 | 0.040 | 0.095 | 0.185 |
| 0.003 | 0.024 | 0.080 | 0.190 | 0.370 |
| 0.004 | 0.036 | 0.120 | 0.284 | 0.556 |
| 0.006 | 0.047 | 0.160 | 0.379 | 0.741 |
| 0.007 | 0.059 | 0.200 | 0.479 | 0.926 |
| 0.009 | 0.071 | 0.240 | 0.569 | 1.111 |
| 0.010 | 0.083 | 0.280 | 0.664 | 1.296 |
| 0.012 | 0.095 | 0.320 | 0.759 | 1.481 |
| 0.013 | 0.107 | 0.360 | 0.853 | 1.667 |
| 0.015 | 0.119 | 0.400 | 0.948 | 1.852 |
| 0.030 | 0.237 | 0.800 | 1.896 | 3.704 |
| 0.044 | 0.356 | 1.200 | 2.844 | 5.556 |
| 0.059 | 0.474 | 1.600 | 3.793 | 7.407 |
| 0.074 | 0.593 | 2.000 | 4.741 | 9.259 |
| 0.089 | 0.711 | 2.400 | 5.689 | 11.111 |
| 0.104 | 0.830 | 2.800 | 6.637 | 12.963 |
| 0.119 | 0.948 | 3.200 | 7.585 | 14.815 |
| 0.133 | 1.067 | 3.600 | 8.533 | 16.667 |
| 0.148 | 1.185 | 4.000 | 9.481 | 18.519 |
| 0.296 | 2.370 | 8.000 | 18.963 | 37.037 |
| 0.444 | 3.556 | 12.000 | 28.444 | 55.556 |
| 0.593 | 4.741 | 16.000 | 37.926 | 74.074 |
| 0.741 | 5.926 | 20.000 | 47.407 | 92.593 |
| 0.889 | 7.111 | 24.000 | 56.889 | 111.111 |
| 1.037 | 8.296 | 28.000 | 66.370 | 129.630 |
| 1.185 | 9.481 | 32.000 | 75.852 | 148.148 |
| 1.333 | 10.667 | 36.000 | 85.333 | 166.667 |
| 1.481 | 11.852 | 40.000 | 94.815 | 185.185 |
| 2.222 | 17.778 | 60.000 | 142.222 | 277.778 |
| 2.963 | 23.704 | 80.000 | 189.630 | 370.370 |
| 3.704 | 29.630 | 100.000 | 237.037 | 462.963 |
| 4.444 | 35.556 | 120.000 | 284.444 | 555.556 |
| 5.185 | 41.481 | 140.000 | 331.852 | 648.148 |
| 5.926 | 47.407 | 160.000 | 379.259 | 740.741 |
| 6.667 | 53.333 | 180.000 | 426.667 | 833.333 |
| 7.407 | 59.259 | 200.000 | 474.074 | 925.926 |
| 8.148 | 65.185 | 220.000 | 521.481 | 1018.519 |
| 8.889 | 71.111 | 240.000 | 568.889 | 1111.111 |
| 9.630 | 77.037 | 260.000 | 616.296 | 1203.704 |
| 10.370 | 82.963 | 280.000 | 663.704 | 1296.296 |
| 11.111 | 88.889 | 300.000 | 711.111 | 1388.889 |
| 11.852 | 94.815 | 320.000 | 758.519 | 1481.481 |
| 12.593 | 100.741 | 340.000 | 805.926 | 1574.074 |
| 13.333 | 106.667 | 360.000 | 853.333 | 1666.667 |
| 14.074 | 112.593 | 380.000 | 900.741 | 1759.259 |
| 14.815 | 118.519 | 400.000 | 948.148 | 1851.852 |

FIG. 76 CONT. 1

TABLE 5-3: ANALYTICAL CALCULATIONS MAXIMUM THEORETICAL ELECTRICAL POWER $P_{el,max}$ (kW) AS FUNCTION OF WATER FLOW VELOCITY $V_{in}$ AND PADDLE AREA $A_p$ ($P_w$ = 1000 kg/m$^3$, $\eta_{tot,max}$ = 8/27 ≈0.296)

| WATER FLOW INLET VELOCITY, VIN (m/s) | | | | |
|---|---|---|---|---|
| 6 | 7 | 8 | 9 | 10 |
| 0.320 | 0.508 | 0.759 | 1.080 | 1.481 |
| 0.640 | 1.016 | 1.517 | 2.160 | 2.963 |
| 0.960 | 1.524 | 2.276 | 3.240 | 4.444 |
| 1.280 | 2.033 | 3.034 | 4.320 | 5.926 |
| 1.600 | 2.541 | 3.793 | 5.400 | 7.407 |
| 1.920 | 3.049 | 4.551 | 6.480 | 8.889 |
| 2.240 | 3.557 | 5.310 | 7.560 | 10.370 |
| 2.560 | 4.065 | 6.068 | 8.640 | 11.852 |
| 2.880 | 4.573 | 6.827 | 9.720 | 13.333 |
| 3.200 | 5.081 | 7.585 | 10.800 | 14.815 |
| 6.400 | 10.163 | 15.170 | 21.600 | 29.630 |
| 9.600 | 15.244 | 22.756 | 32.400 | 44.444 |
| 12.800 | 20.326 | 30.341 | 43.200 | 59.259 |
| 16.000 | 25.407 | 37.926 | 54.000 | 74.074 |
| 19.200 | 30.489 | 45.511 | 64.800 | 88.889 |
| 22.400 | 35.570 | 53.096 | 75.600 | 103.704 |
| 25.600 | 40.652 | 60.681 | 86.400 | 118.519 |
| 28.800 | 45.733 | 68.267 | 97.200 | 133.333 |
| 32.000 | 50.815 | 75.852 | 108.000 | 148.148 |
| 64.000 | 101.630 | 151.704 | 216.000 | 296.296 |
| 96.000 | 152.444 | 227.556 | 324.000 | 444.444 |
| 128.000 | 203.259 | 303.407 | 432.000 | 592.593 |
| 160.000 | 254.074 | 379.259 | 540.000 | 740.741 |
| 192.000 | 304.889 | 455.111 | 648.000 | 888.889 |
| 224.000 | 355.704 | 530.963 | 756.000 | 1037.037 |
| 256.000 | 406.519 | 606.815 | 864.000 | 1185.185 |
| 288.000 | 457.333 | 682.667 | 972.000 | 1333.333 |
| 320.000 | 508.148 | 758.519 | 1080.000 | 1481.481 |
| 480.000 | 762.222 | 1137.778 | 1620.000 | 2222.222 |
| 640.000 | 1016.296 | 1517.037 | 2160.000 | 2962.963 |
| 800.000 | 1270.370 | 1896.296 | 2700.000 | 3703.704 |
| 960.000 | 1524.444 | 2275.556 | 3240.000 | 4444.444 |
| 1120.000 | 1778.519 | 2654.815 | 3780.000 | 5185.185 |
| 1280.000 | 2032.593 | 3034.074 | 4320.000 | 5925.926 |
| 1440.000 | 2286.667 | 3413.333 | 4860.000 | 6666.667 |
| 1600.000 | 2540.741 | 3792.593 | 5400.000 | 7407.407 |
| 1760.000 | 2794.815 | 4171.852 | 5940.000 | 8148.148 |
| 1920.000 | 3048.889 | 4551.111 | 6480.000 | 8888.889 |
| 2080.000 | 3302.963 | 4930.370 | 7020.000 | 9629.630 |
| 2240.000 | 3557.037 | 5309.630 | 7560.000 | 10370.370 |
| 2400.000 | 3811.111 | 5688.889 | 8100.000 | 11111.111 |
| 2560.000 | 4065.185 | 6068.148 | 8640.000 | 11851.852 |
| 2720.000 | 4319.259 | 6447.407 | 9180.000 | 12592.593 |
| 2880.000 | 4573.333 | 6826.667 | 9720.000 | 13333.333 |
| 3040.000 | 4827.407 | 7205.926 | 10260.000 | 14074.074 |
| 3200.000 | 5081.481 | 7585.185 | 10800.000 | 14814.815 |

FIG. 76 CONT. 2  TABLE 5-3: ANALYTICAL CALCULATIONS MAXIMUM THEORETICAL ELECTRICAL POWER $P_{el,max}$ (kW) AS FUNCTION OF WATER FLOW VELOCITY $V_{in}$ AND PADDLE AREA $A_p$ ($P_w$ = 1000 kg/m$^3$, $\eta_{tot,max}$ = 8/27 ≈ 0.296)

| $A_p$ (m²) \ $V_{IN}$ (m/s) | 0.3 | 0.4 | 0.5 | 0.6 | 0.7 | 0.8 |
|---|---|---|---|---|---|---|
| 0.01 | 0.000 | 0.001 | 0.002 | 0.003 | 0.004 | 0.007 |
| 0.02 | 0.001 | 0.002 | 0.003 | 0.006 | 0.009 | 0.013 |
| 0.03 | 0.001 | 0.002 | 0.005 | 0.008 | 0.013 | 0.020 |
| 0.04 | 0.001 | 0.003 | 0.006 | 0.011 | 0.018 | 0.027 |
| 0.05 | 0.002 | 0.004 | 0.008 | 0.014 | 0.022 | 0.033 |
| 0.06 | 0.002 | 0.005 | 0.010 | 0.017 | 0.027 | 0.040 |
| 0.07 | 0.002 | 0.006 | 0.011 | 0.020 | 0.031 | 0.047 |
| 0.08 | 0.003 | 0.007 | 0.013 | 0.022 | 0.036 | 0.053 |
| 0.09 | 0.003 | 0.007 | 0.015 | 0.025 | 0.040 | 0.060 |
| 0.1 | 0.004 | 0.008 | 0.016 | 0.028 | 0.045 | 0.066 |
| 0.2 | 0.007 | 0.017 | 0.032 | 0.056 | 0.089 | 0.133 |
| 0.3 | 0.011 | 0.025 | 0.049 | 0.084 | 0.134 | 0.199 |
| 0.4 | 0.014 | 0.033 | 0.065 | 0.112 | 0.178 | 0.266 |
| 0.5 | 0.018 | 0.042 | 0.081 | 0.140 | 0.223 | 0.332 |
| 0.6 | 0.021 | 0.050 | 0.097 | 0.168 | 0.267 | 0.399 |
| 0.7 | 0.025 | 0.058 | 0.114 | 0.196 | 0.312 | 0.465 |
| 0.8 | 0.028 | 0.066 | 0.130 | 0.224 | 0.356 | 0.532 |
| 0.9 | 0.032 | 0.075 | 0.146 | 0.252 | 0.401 | 0.598 |
| 1 | 0.035 | 0.083 | 0.162 | 0.280 | 0.445 | 0.664 |
| 2 | 0.070 | 0.166 | 0.324 | 0.561 | 0.890 | 1.329 |
| 3 | 0.105 | 0.249 | 0.487 | 0.841 | 1.335 | 1.993 |
| 4 | 0.140 | 0.332 | 0.649 | 1.121 | 1.781 | 2.658 |
| 5 | 0.175 | 0.415 | 0.811 | 1.402 | 2.226 | 3.322 |
| 6 | 0.210 | 0.498 | 0.973 | 1.682 | 2.671 | 3.987 |
| 7 | 0.245 | 0.581 | 1.136 | 1.962 | 3.116 | 4.651 |
| 8 | 0.280 | 0.664 | 1.298 | 2.243 | 3.561 | 5.316 |
| 9 | 0.315 | 0.748 | 1.460 | 2.523 | 4.006 | 5.980 |
| 10 | 0.350 | 0.831 | 1.622 | 2.803 | 4.451 | 6.645 |
| 15 | 0.526 | 1.246 | 2.433 | 4.205 | 6.677 | 9.967 |
| 20 | 0.701 | 1.661 | 3.244 | 5.606 | 8.903 | 13.289 |
| 25 | 0.876 | 2.076 | 4.056 | 7.008 | 11.128 | 16.612 |
| 30 | 1.051 | 2.492 | 4.867 | 8.410 | 13.354 | 19.934 |
| 35 | 1.226 | 2.907 | 5.678 | 9.811 | 15.580 | 23.256 |
| 40 | 1.402 | 3.322 | 6.489 | 11.213 | 17.806 | 26.578 |
| 45 | 1.577 | 3.738 | 7.300 | 12.614 | 20.031 | 29.901 |
| 50 | 1.752 | 4.153 | 8.111 | 14.016 | 22.257 | 33.223 |
| 55 | 1.927 | 4.568 | 8.922 | 15.418 | 24.483 | 36.545 |
| 60 | 2.102 | 4.983 | 9.733 | 16.819 | 26.708 | 39.868 |
| 65 | 2.278 | 5.399 | 10.544 | 18.221 | 28.934 | 43.190 |
| 70 | 2.453 | 5.814 | 11.356 | 19.622 | 31.160 | 46.512 |
| 75 | 2.628 | 6.229 | 12.167 | 21.024 | 33.385 | 49.835 |
| 80 | 2.803 | 6.645 | 12.978 | 22.426 | 35.611 | 53.157 |
| 85 | 2.978 | 7.060 | 13.789 | 23.827 | 37.837 | 56.479 |
| 90 | 3.154 | 7.475 | 14.600 | 25.229 | 40.062 | 59.802 |
| 95 | 3.329 | 7.890 | 15.411 | 26.630 | 42.288 | 63.124 |
| 100 | 3.504 | 8.306 | 16.222 | 28.032 | 44.514 | 66.446 |

TO FIG. 78 CONT. 1

FIG. 78 TABLE 5-4: ANALYTICAL CALCULATIONS MAXIMUM THEORETICAL ANNUAL PRODUCTION OF el, ENERGY $E_{el,max}$ (MWh/YEAR) AS FUNCTION OF WATER FLOW VELOCITY $V_{in}$ AND PADDLE AREA $A_p$ ($\rho_w$ = 1000 kg/m³, $\eta_{tot,max}$ = 8/27 ≈ 0.296, FULL TIME OPERATION)

WATER FLOW INLET VELOCITY, $V_{IN}$ (m/s)

| 0.09 | 1 | 2 | 3 | 4 | 5 |
|---|---|---|---|---|---|
| 0.009 | 0.013 | 0.104 | 0.350 | 0.831 | 1.622 |
| 0.019 | 0.026 | 0.208 | 0.701 | 1.661 | 3.244 |
| 0.028 | 0.039 | 0.311 | 1.051 | 2.492 | 4.867 |
| 0.038 | 0.052 | 0.415 | 1.402 | 3.322 | 6.489 |
| 0.047 | 0.065 | 0.519 | 1.752 | 4.153 | 8.111 |
| 0.057 | 0.078 | 0.623 | 2.102 | 4.983 | 9.733 |
| 0.066 | 0.091 | 0.727 | 2.453 | 5.814 | 11.356 |
| 0.076 | 0.104 | 0.831 | 2.803 | 6.645 | 12.978 |
| 0.085 | 0.117 | 0.934 | 3.154 | 7.475 | 14.600 |
| 0.095 | 0.130 | 1.038 | 3.504 | 8.306 | 16.222 |
| 0.189 | 0.260 | 2.076 | 7.008 | 16.612 | 32.444 |
| 0.284 | 0.389 | 3.115 | 10.512 | 24.917 | 48.667 |
| 0.378 | 0.519 | 4.153 | 14.016 | 33.223 | 64.889 |
| 0.473 | 0.649 | 5.191 | 17.520 | 41.529 | 81.111 |
| 0.568 | 0.779 | 6.229 | 21.024 | 49.835 | 97.333 |
| 0.662 | 0.908 | 7.268 | 24.528 | 58.140 | 113.556 |
| 0.757 | 1.038 | 8.306 | 28.032 | 66.446 | 129.778 |
| 0.851 | 1.168 | 9.344 | 31.536 | 74.752 | 146.000 |
| 0.946 | 1.298 | 10.382 | 35.040 | 83.058 | 162.222 |
| 1.892 | 2.596 | 20.764 | 70.080 | 166.116 | 324.444 |
| 2.838 | 3.893 | 31.147 | 105.120 | 249.173 | 486.667 |
| 3.784 | 5.191 | 41.529 | 140.160 | 332.231 | 648.889 |
| 4.730 | 6.489 | 51.911 | 175.200 | 415.289 | 811.111 |
| 5.676 | 7.787 | 62.293 | 210.240 | 498.347 | 973.333 |
| 6.623 | 9.084 | 72.676 | 245.280 | 581.404 | 1135.556 |
| 7.569 | 10.382 | 83.058 | 280.320 | 664.462 | 1297.778 |
| 8.515 | 11.680 | 93.440 | 315.360 | 747.520 | 1460.000 |
| 9.461 | 12.978 | 103.822 | 350.400 | 830.578 | 1622.222 |
| 14.191 | 19.467 | 155.733 | 525.600 | 1245.867 | 2433.333 |
| 18.922 | 25.956 | 207.644 | 700.800 | 1661.156 | 3244.444 |
| 23.652 | 32.444 | 259.556 | 876.000 | 2076.444 | 4055.556 |
| 28.382 | 38.933 | 311.467 | 1051.200 | 2491.733 | 4866.667 |
| 33.113 | 45.422 | 363.378 | 1226.400 | 2907.022 | 5677.778 |
| 37.843 | 51.911 | 415.289 | 1401.600 | 3322.311 | 6488.889 |
| 42.574 | 58.400 | 467.200 | 1576.800 | 3737.600 | 7300.000 |
| 47.304 | 64.889 | 519.111 | 1752.000 | 4152.889 | 8111.111 |
| 52.034 | 71.378 | 571.022 | 1927.200 | 4568.178 | 8922.222 |
| 56.765 | 77.867 | 622.933 | 2102.400 | 4983.467 | 9733.333 |
| 61.495 | 84.356 | 674.844 | 2277.600 | 5398.756 | 10544.444 |
| 66.226 | 90.844 | 726.756 | 2452.800 | 5814.044 | 11355.556 |
| 70.956 | 97.333 | 778.667 | 2628.000 | 6229.333 | 12166.667 |
| 75.686 | 130.822 | 830.578 | 2803.200 | 6644.622 | 12977.778 |
| 80.417 | 110.311 | 882.489 | 2978.400 | 7059.911 | 13788.889 |
| 85.147 | 116.800 | 934.400 | 3153.600 | 7475.200 | 14600.000 |
| 89.878 | 123.289 | 986.311 | 3328.800 | 7890.489 | 15411.111 |
| 94.608 | 129.778 | 1038.222 | 3504.000 | 8305.778 | 16222.222 |

FIG. 78 CONT. 1

TABLE 5-4: ANALYTICAL CALCULATIONS MAXIMUM THEORETICAL ANNUAL PRODUCTION OF el. ENERGY $E_{el,max}$ (MWh/YEAR) AS FUNCTION OF WATER FLOW VELOCITY $V_{in}$ AND PADDLE AREA $A_p$ ($P_w$ = 1000 kg/m$^3$, $\eta_{tot,max}$ = 8/27 ≈ 0.296, FULL TIME OPERATION)

| WATER FLOW INLET VELOCITY, VIN (m/s) | | | | |
|---|---|---|---|---|
| 6 | 7 | 8 | 9 | 10 |
| 2.803 | 4.451 | 6.645 | 9.461 | 12.978 |
| 5.606 | 8.903 | 13.289 | 18.922 | 25.956 |
| 8.410 | 13.354 | 19.934 | 28.382 | 38.933 |
| 11.213 | 17.806 | 26.578 | 37.843 | 51.911 |
| 14.016 | 22.257 | 33.223 | 47.304 | 64.889 |
| 16.819 | 26.708 | 39.868 | 56.765 | 77.867 |
| 19.622 | 31.160 | 46.512 | 66.226 | 90.844 |
| 22.426 | 35.611 | 53.157 | 75.686 | 103.822 |
| 25.229 | 40.062 | 59.802 | 85.147 | 116.800 |
| 28.032 | 44.514 | 66.446 | 94.608 | 129.778 |
| 56.064 | 89.028 | 132.892 | 189.216 | 259.556 |
| 84.096 | 133.541 | 199.339 | 283.824 | 389.333 |
| 112.128 | 178.055 | 265.785 | 378.432 | 519.111 |
| 140.160 | 222.569 | 332.231 | 473.040 | 648.889 |
| 168.192 | 267.083 | 398.677 | 567.648 | 778.667 |
| 196.224 | 311.596 | 465.124 | 662.256 | 908.444 |
| 224.256 | 356.110 | 531.570 | 756.864 | 1038.222 |
| 252.288 | 400.624 | 598.016 | 851.472 | 1168.000 |
| 280.320 | 445.138 | 664.462 | 946.080 | 1297.778 |
| 560.640 | 890.276 | 1328.924 | 1892.160 | 2595.556 |
| 840.960 | 1335.413 | 1993.387 | 2838.240 | 3893.333 |
| 1121.280 | 1780.551 | 2657.849 | 3784.320 | 5191.111 |
| 1401.600 | 2225.689 | 3322.311 | 4730.400 | 6488.889 |
| 1681.920 | 2670.827 | 3986.773 | 5676.480 | 7786.667 |
| 1962.240 | 3115.964 | 4651.236 | 6622.560 | 9084.444 |
| 2242.560 | 3561.102 | 5315.689 | 7568.640 | 10382.222 |
| 2522.880 | 4006.240 | 5980.160 | 8514.720 | 11680.000 |
| 2803.200 | 4451.378 | 6644.622 | 9460.800 | 12977.778 |
| 4204.800 | 6677.067 | 9966.933 | 14191.200 | 19466.667 |
| 5606.400 | 8902.756 | 13289.244 | 18921.600 | 25955.556 |
| 7008.000 | 11128.444 | 16611.556 | 23652.000 | 32444.444 |
| 8409.600 | 13354.133 | 19933.867 | 28382.400 | 38933.333 |
| 9811.200 | 15579.822 | 23256.178 | 33112.800 | 45422.222 |
| 11212.800 | 17805.511 | 26578.489 | 37843.200 | 51911.111 |
| 12614.400 | 20031.200 | 29900.800 | 42573.600 | 58400.000 |
| 14016.000 | 22256.889 | 33223.111 | 47304.000 | 64888.889 |
| 15417.600 | 24482.578 | 36545.422 | 52034.400 | 71377.778 |
| 16819.200 | 26708.267 | 39867.733 | 56764.800 | 77866.667 |
| 18220.800 | 28933.956 | 43190.044 | 61495.200 | 84355.556 |
| 19622.400 | 31159.644 | 46512.356 | 66225.600 | 90844.444 |
| 21024.000 | 33385.333 | 49834.667 | 70956.000 | 97333.333 |
| 22425.600 | 35611.022 | 53156.978 | 75686.400 | 103822.220 |
| 23827.200 | 37836.711 | 56479.289 | 80416.800 | 110311.110 |
| 25228.800 | 40062.400 | 59801.600 | 85147.200 | 116800.000 |
| 26630.400 | 42288.089 | 63123.911 | 89877.600 | 123288.890 |
| 28032.000 | 44513.778 | 66446.222 | 94608.000 | 129777.780 |

FIG. 78 CONT. 2

TABLE 5-4: ANALYTICAL CALCULATIONS MAXIMUM THEORETICAL ANNUAL PRODUCTION OF el, ENERGY $E_{el,max}$ (MWh/YEAR) AS FUNCTION OF WATER FLOW VELOCITY $V_{in}$ AND PADDLE AREA $A_p$ ($P_w$ = 1000 kg/m³, $\eta_{tot,max}$ = 8/27 ≈ 0.296, FULL TIME OPERATION)

$$P_{in} = \frac{1}{2} \rho_w A_{d,HAT} V_{in}^3$$

FIG. 81

$$D_{HAT} = \sqrt{\frac{4 A_{d,HAT}}{\pi}}$$

where:

$A_{d,HAT}$ .....HAT disk area (m²)

$D_{HAT}$ ........HAT diameter (m)

FIG. 82

LIST OF SYMBOLS

PHYSICAL CONSTANTS

| SYMBOL | TITLE | | UNIT |
|---|---|---|---|
| $g$ | Gravitational acceleration | $g = 9.81$ | m/s² |
| $v_w$ | Kinematic viscosity of the water | $v = 1.13902 \times 10^{-6}$ | m²/s |
| $w$ | Water density | $= 1000.0$ | kg/m³ |

FLUID MECHANICS

| SYMBOL | TITLE | UNIT |
|---|---|---|
| $A$ | Cross section area of the water flow normal to direction of the flow, bounded by river bed and free surface closed contour (m²) | m² |
| $A_{d,HAT}$ | Disk area of the horizontal axial turbine | m² |
| $A_p$ | Area of the waterwheel paddle | m² |
| $b_p$ | Width of the waterwheel paddle | m |
| $D$ | Overall diameter of the waterwheel | m |
| $D_{HAT}$ | Diameter of the horizontal axial turbine | m |
| $D_w$ | Working diameter of the waterwheel | m |
| $E$ | Mechanical energy of the water flow, head | J |
| $\dot{E}$ | Mechanical energy flux | W |
| $E_{el}$ | Annual production of electical energy | Wh/year |
| $E_{el,max}$ | Maximum theoretical annual production of electrical energy | Wh/year |
| $F_w$ | Force load | N |
| $F_{w,max}$ | Maximum force load | N |
| $F_{w,n_{h,max}}$ | Force load for maximum theoretical hydraulic efficiency | N |
| $H$ | Total energetic height of the water flow, head | m |
| $h$ | Piezometric energetic height of the water flow, corresponding to geodetic height of the water free surface in an open channel | m |
| $h_p$ | Height of the waterwheel paddle | m |
| $I$ | Mass moment of inertia | kgm² |
| $L$ | Characteristic linear dimension associated with the flow | m |

*FIG. 83*

| SYMBOL | TITLE | UNIT |
|---|---|---|
| $m_w$ | Mass of the water | kg |
| $\dot{m}_w$ | Mass flow rate of the water | m/s |
| $n$ | Number of hours in operation per year | h/year |
| $p$ | Water pressure | Pa |
| $P$ | Hydropower | W |
| $P_{el}$ | Electrical power | W |
| $P_{el,max}$ | Maximum theoretical electrical power | W |
| $P_{in}$ | Input power delivered by the water flow | W |
| $P_m$ | Mechanical power | W |
| $P_h$ | Hydraulic power | W |
| $P_{h,max}$ | Maximum theoretical hydraulic power | W |
| $R$ | Overall radius of the waterwheel | m |
| $Re$ | Reynolds number ................................ $Re = \dfrac{vL}{vW}$ | - |
| $R_w$ | Working radius of the waterwheel | m |
| $x$ | Ratio between outlet and inlet water velocity............... $x = \dfrac{V_{out}}{V_{in}}$ | |
| $Q$ | Volumentric flow rate of the water ............... $Q = \int_A v dA$ | m³/s |
| $Q_{el}$ | Electrical torque load | Nm |
| $Q_f$ | Frictional torque load | Nm |
| $Q_{eff}$ | Effective mechanical torque load | Nm |
| $Q_m$ | Mechanical torque load | Nm |
| $Q_w$ | Torque load | Nm |
| $Q_{w,max}$ | Maximum torque load | Nm |
| $Q_{w, n_{h,max}}$ | Torque load for maximum theoretical hydraulic efficiency | Nm |
| $v$ | Water velocity | m/s |
| $v_{in}$ | Water velocity at inlet section | m/s |
| $v_{out}$ | Water velocity at outlet section | m/s |

*FIG. 83*
*CONT. 1*

| SYMBOL | TITLE | | UNIT |
|---|---|---|---|
| $\bar{v}$ | Mean velocity of the water flow | $\bar{v} = \dfrac{\int_A v\,dA}{A}$ | m/s |
| $z$ | Water height | | m |
| $\alpha$ | Coriolis coefficient, coefficient of kinetic energy distribution within water flow cross section | $\alpha = \dfrac{\int_A v^3\,dA}{\bar{v}^3 A}$ | - |
| $\Delta H$ | Height of energetic losses due to hydrodynamic resistances to water flow | | m |
| $\eta_{el}$ | Electrical efficiency | | - |
| $\eta_f$ | Frictional efficiency | | - |
| $\eta_h$ | Hydrolic efficiency | | - |
| $\eta_{h,max}$ | Maximum hydraulic efficiency | | - |
| $\eta_m$ | Mechanical efficiency | | - |
| $\eta_{tot}$ | Total efficiency | | - |
| $\eta_{tot,max}$ | Maximum total efficiency | | |
| | Fluid density | | kg/m³ |
| $\omega$ | Rate of turn | | rad/s |
| $\dot{\omega}$ | Angular acceleration | | rad/s² |

*FIG. 83*
*CONT. 2*

| FLOATING POWER GENERATOR CALCULATOR | | | | |
|---|---|---|---|---|
| Waterwheel concept | | | | |
| Enter water density $\beta_w$: | | 1000 | kg/m³ | |
| Enter water flow velocity start value ($v_{in1}$) | | 1.0 | m/s | |
| Enter el. power target value ($P_{el}$): | | 300 | kW | |
| Enter electrical efficiency ($\beta_e$): | | 1.000 | - | |
| Enter frictional efficiency ($\beta_f$): | | 1.000 | - | |
| Enter output efficiency ($\beta_{out}$): | | 0.296 | - | |
| INPUT | | | | |
| Mean water flow velocity $v_{in}$ (m/s) | Electrical power $P_{el}$ (kW) | Electrical efficiency $\beta_{el}$ (-) | Frictional efficiency $\beta_f$ (-) | Hydraulic efficiency $\beta_h$ (-) |
| 1.0 | 300.000 | 1.000 | 1.000 | 0.296 |
| 1.1 | 300.000 | 1.000 | 1.000 | 0.296 |
| 1.2 | 300.000 | 1.000 | 1.000 | 0.296 |
| 1.3 | 300.000 | 1.000 | 1.000 | 0.296 |
| 1.4 | 300.000 | 1.000 | 1.000 | 0.296 |
| 1.5 | 300.000 | 1.000 | 1.000 | 0.296 |
| 1.6 | 300.000 | 1.000 | 1.000 | 0.296 |
| 1.7 | 300.000 | 1.000 | 1.000 | 0.296 |
| 1.8 | 300.000 | 1.000 | 1.000 | 0.296 |
| 1.9 | 300.000 | 1.000 | 1.000 | 0.296 |
| 2.0 | 300.000 | 1.000 | 1.000 | 0.296 |
| 2.1 | 300.000 | 1.000 | 1.000 | 0.296 |
| 2.2 | 300.000 | 1.000 | 1.000 | 0.296 |
| 2.3 | 300.000 | 1.000 | 1.000 | 0.296 |
| 2.4 | 300.000 | 1.000 | 1.000 | 0.296 |
| 2.5 | 300.000 | 1.000 | 1.000 | 0.296 |
| 2.6 | 300.000 | 1.000 | 1.000 | 0.296 |
| 2.7 | 300.000 | 1.000 | 1.000 | 0.296 |
| 2.8 | 300.000 | 1.000 | 1.000 | 0.296 |
| 2.9 | 300.000 | 1.000 | 1.000 | 0.296 |
| 3.0 | 300.000 | 1.000 | 1.000 | 0.296 |

FLOATING POWER GENERATOR CALCULATOR
Waterwheel concept

| | | OUTPUT | | | |
|---|---|---|---|---|---|
| Mechanical efficiency $\beta_m$ (-) Eq. 31 | Total efficiency $\beta_{tot}$ (-) Eq. 36 | Mechanical power $P_m$ (kW) Eq. 35 | Hydraulic power $P_{out}$ (kW) Eq. 30 | Input power $P_{in}$ (kW) Eq. 21 | Paddle area $A_p$ (m²) Eq. 14 |
| 0.296 | 0.296 | 300.000 | 300.000 | 1012.500 | 2025.000 |
| 0.296 | 0.296 | 300.000 | 300.000 | 1012.500 | 1521.412 |
| 0.296 | 0.296 | 300.000 | 300.000 | 1012.500 | 1171.875 |
| 0.296 | 0.296 | 300.000 | 300.000 | 1012.500 | 921.711 |
| 0.296 | 0.296 | 300.000 | 300.000 | 1012.500 | 737.974 |
| 0.296 | 0.296 | 300.000 | 300.000 | 1012.500 | 600.000 |
| 0.296 | 0.296 | 300.000 | 300.000 | 1012.500 | 494.385 |
| 0.296 | 0.296 | 300.000 | 300.000 | 1012.500 | 412.172 |
| 0.296 | 0.296 | 300.000 | 300.000 | 1012.500 | 347.222 |
| 0.296 | 0.296 | 300.000 | 300.000 | 1012.500 | 295.233 |
| 0.296 | 0.296 | 300.000 | 300.000 | 1012.500 | 253.125 |
| 0.296 | 0.296 | 300.000 | 300.000 | 1012.500 | 218.659 |
| 0.296 | 0.296 | 300.000 | 300.000 | 1012.500 | 190.177 |
| 0.296 | 0.296 | 300.000 | 300.000 | 1012.500 | 166.434 |
| 0.296 | 0.296 | 300.000 | 300.000 | 1012.500 | 146.484 |
| 0.296 | 0.296 | 300.000 | 300.000 | 1012.500 | 129.600 |
| 0.296 | 0.296 | 300.000 | 300.000 | 1012.500 | 115.214 |
| 0.296 | 0.296 | 300.000 | 300.000 | 1012.500 | 102.881 |
| 0.296 | 0.296 | 300.000 | 300.000 | 1012.500 | 92.247 |
| 0.296 | 0.296 | 300.000 | 300.000 | 1012.500 | 83.029 |
| 0.296 | 0.296 | 300.000 | 300.000 | 1012.500 | 75.000 |

FROM FIG. 83

*FIG. 84 CONT.*

| FLOATING POWER GENERATOR CALCULATOR | | | | | |
|---|---|---|---|---|---|
| HAT concept | | | | | |
| Enter water density $H_w$: | | 1000 | kg/m³ | | |
| Enter water flow velocity start value ($v_{in1}$) | | 1.0 | m/s | | |
| Enter el. power target value ($P_{el}$): | | 300 | kW | | |
| Enter electrical efficiency ($H_e$): | | 1.000 | - | | |
| Enter frictional efficiency ($H_f$): | | 1.000 | - | | |
| Enter output efficiency ($H_{out}$): | | 0.593 | - | | |
| INPUT | | | | | |
| Mean water flow velocity | Electrical power | Electrical efficiency | Frictional efficiency | Hydraulic efficiency | Mechanical efficiency |
| $v_{in}$ | $P_{el}$ | $H_{el}$ | $H_f$ | $H_h$ | $H_m$ |
| (m/s) | (kW) | (-) | (-) | (-) | (-) |
| | | | | | Eq. 31 |
| 1.0 | 300.000 | 1.000 | 1.000 | 0.593 | 0.593 |
| 1.1 | 300.000 | 1.000 | 1.000 | 0.593 | 0.593 |
| 1.2 | 300.000 | 1.000 | 1.000 | 0.593 | 0.593 |
| 1.3 | 300.000 | 1.000 | 1.000 | 0.593 | 0.593 |
| 1.4 | 300.000 | 1.000 | 1.000 | 0.593 | 0.593 |
| 1.5 | 300.000 | 1.000 | 1.000 | 0.593 | 0.593 |
| 1.6 | 300.000 | 1.000 | 1.000 | 0.593 | 0.593 |
| 1.7 | 300.000 | 1.000 | 1.000 | 0.593 | 0.593 |
| 1.8 | 300.000 | 1.000 | 1.000 | 0.593 | 0.593 |
| 1.9 | 300.000 | 1.000 | 1.000 | 0.593 | 0.593 |
| 2.0 | 300.000 | 1.000 | 1.000 | 0.593 | 0.593 |
| 2.1 | 300.000 | 1.000 | 1.000 | 0.593 | 0.593 |
| 2.2 | 300.000 | 1.000 | 1.000 | 0.593 | 0.593 |
| 2.3 | 300.000 | 1.000 | 1.000 | 0.593 | 0.593 |
| 2.4 | 300.000 | 1.000 | 1.000 | 0.593 | 0.593 |
| 2.5 | 300.000 | 1.000 | 1.000 | 0.593 | 0.593 |
| 2.6 | 300.000 | 1.000 | 1.000 | 0.593 | 0.593 |
| 2.7 | 300.000 | 1.000 | 1.000 | 0.593 | 0.593 |
| 2.8 | 300.000 | 1.000 | 1.000 | 0.593 | 0.593 |
| 2.9 | 300.000 | 1.000 | 1.000 | 0.593 | 0.593 |
| 3.0 | 300.000 | 1.000 | 1.000 | 0.593 | 0.593 |

FLOATING POWER GENERATOR CALCULATOR
HAT concept

FROM FIG. 84

| | OUTPUT | | | | |
|---|---|---|---|---|---|
| Total efficiency $H_{tot}$ (-) Eq. 36 | Mechanical power $P_m$ (kW) Eq. 35 | Hydraulic power $P_{out}$ (kW) Eq. 30 | Input power $P_{in}$ (kW) Eq. 21 | Turbine disk area $A_{d,HAT}$ (m²) Eq. | Turbine diameter $D_{HAT}$ (m) Eq. |
| 0.593 | 300.000 | 300.000 | 506.250 | 1012.500 | 35.905 |
| 0.593 | 300.000 | 300.000 | 506.250 | 760.706 | 31.122 |
| 0.593 | 300.000 | 300.000 | 506.250 | 585.938 | 27.314 |
| 0.593 | 300.000 | 300.000 | 506.250 | 460.856 | 24.224 |
| 0.593 | 300.000 | 300.000 | 506.250 | 368.987 | 21.675 |
| 0.593 | 300.000 | 300.000 | 506.250 | 300.000 | 19.544 |
| 0.593 | 300.000 | 300.000 | 506.250 | 247.192 | 17.741 |
| 0.593 | 300.000 | 300.000 | 506.250 | 206.086 | 16.199 |
| 0.593 | 300.000 | 300.000 | 506.250 | 173.611 | 14.868 |
| 0.593 | 300.000 | 300.000 | 506.250 | 147.616 | 13.710 |
| 0.593 | 300.000 | 300.000 | 506.250 | 126.563 | 12.694 |
| 0.593 | 300.000 | 300.000 | 506.250 | 109.329 | 11.798 |
| 0.593 | 300.000 | 300.000 | 506.250 | 95.088 | 11.003 |
| 0.593 | 300.000 | 300.000 | 506.250 | 83.217 | 10.293 |
| 0.593 | 300.000 | 300.000 | 506.250 | 73.242 | 9.657 |
| 0.593 | 300.000 | 300.000 | 506.250 | 64.800 | 9.083 |
| 0.593 | 300.000 | 300.000 | 506.250 | 57.607 | 8.564 |
| 0.593 | 300.000 | 300.000 | 506.250 | 51.440 | 8.093 |
| 0.593 | 300.000 | 300.000 | 506.250 | 46.123 | 7.663 |
| 0.593 | 300.000 | 300.000 | 506.250 | 41.515 | 7.270 |
| 0.593 | 300.000 | 300.000 | 506.250 | 37.500 | 6.910 |

FIG. 85
*CONT.*

THREE-DIMENSIONAL (3D) FLOW FLOATING POWER GENERATOR

RELATED APPLICATION

This application is a Continuation of U.S. patent application Ser. No. 15/651,110, filed on Jul. 17, 2017, which is a Continuation-In-Part (CIP) of U.S. patent application Ser. No. 14/742,221, filed on Jun. 17, 2015, now U.S. Pat. No. 10,560,043, which issued on Feb. 11, 2020, which is a Continuation of U.S. patent application Ser. No. 14/540,769, filed on Nov. 13, 2014, now U.S. Pat. No. 9,712,094, which issued on Jul. 18, 2017, which are incorporated herein by reference. This application claims the benefit of the earlier filing dates of these U.S. Patent Applications.

FIELD

A floating power generator for generating electrical power having three-dimensional (3D) flow passageway. The floating power generator can be installed on a body of flowing water such as a river, channel, or stream to produce electrical power.

BACKGROUND

There continues to be an existing need for generating electrical power inexpensively without creating pollution. The flow of water in rivers, channels, and streams provides a very large source of green energy that can be converted into electrical power.

The first records of water wheels as a valuable source of power date from the early ages of the new era. They have been considered as a primary source of power until the end of 18$^{th}$ century until the introduction of high pressure steam engines. Water wheels evolved through history from simple stream wheels to more complex wheels of different types. Much effort went into the scientific investigation of water wheel efficiency, increasing it by a factor of three in the 18$^{th}$ century.

Due to their simplicity and justifiable application at low head sites, water wheels remained an important source of power until today. Indeed, for the past two decades, worldwide trends of increased environmental awareness favor and encourage continuation of extensive development and utilization of new water wheel types, attributing all the benefits of water wheel systems.

Despite the variety of water wheel types known today, they are commonly classified as A) an undershot type water wheel (FIG. 1A); B) a breastshot type water wheel (FIG. 1B); and C) an overshot type water wheel (FIG. 1C). These water wheels are typically installed land (i.e. not floating water wheels) and are supplied flowing water by an open water channel constructed on land to carry and direct the flowing water from a river or stream to the water wheels.

The water channel of the undershot water wheel (FIG. 1A) has a fixed depth before and after the water wheel at the fixed height reference points shown. The water channel of the undershoot water wheel (FIG. 1B) has a fixed depth before and after the water wheel at the reference points, however, the height of the second reference point is lower than the height of the first reference point. Further, the flow channel curved downwardly (i.e. partial circle) underneath the water wheel to combine forces due to both water flow and water weight to turn the water wheel. The water channel of the overshot water wheel (FIG. 1C) has a fixed depth before and after the water wheel at the reference points, however, the height of the second reference point is lower than the height of the first reference point. Further, the flow channel is discontinuous so that the water flow exits the water channel and directed to an upper portion of the water wheel to combine forces due to both water flow and water weight to turn the water wheel. Typically, the water channels have a fixed cross-sectional profile (e.g. fixed rectangular shape) along the length of the water channel.

Each of the above water wheel types has its own advantages and disadvantages. Traditional undershot water wheel (FIG. 1), also known as the oldest water wheel type, makes use of only water flow kinetic hydro potential and having the lowest efficiency, which means that it generates less power and can only be used where the flow rate is sufficient to provide torque. The breastshot and overshot water wheels, and some subtypes of undershot water wheels (e.g. Poncelet wheel, Zuppinger wheel) make use of both, gravitational and kinetic hydro potential of the water flow, consequently increasing the efficiency and amount of generated power. However, traditional undershot wheels are cheaper and simpler to build, and have less of an environmental impact due to simpler construction of the water channel. They are suitable for shallow streams in flat country.

SUMMARY

The presently described subject matter is directed to a floating power generator.

The presently described subject matter is directed to a three-dimensional (3D) flow floating power generator.

The presently described subject matter is directed to a floating power generator comprising a paddle wheel operating in a three-dimensional flow passageway.

The presently described subject matter is directed to a floating power generator having three-dimensional flow passageway driving a water wheel.

The presently described subject matter is directed to an improved power generator.

The presently described subject matter is directed to an improved power generator comprising or consisting of a paddle wheel.

The presently described subject matter is directed to an improved power generator comprising or consisting of a paddle wheel connected to one or more electrical generators.

The presently described subject matter is directed to an improved power generator comprising or consisting of a paddle wheel, an electrical generator, and a variable speed drive connecting the paddle wheel and the electrical generator.

The presently described subject matter is directed to an improved power generator comprising or consisting of a paddle wheel, an electrical generator, and an electrical variable speed drive connecting the paddle wheel and the electrical generator.

The presently described subject matter is directed to an improved power generator comprising or consisting of a paddle wheel, an electrical generator, and a mechanical variable speed drive connecting the paddle wheel and the electrical generator.

The presently described subject matter is directed to an improved power generator comprising or consisting of a variable configuration paddle wheel, and one or more electrical generators.

The presently described subject matter is directed to an improved power generator comprising or consisting of a variable configuration paddle wheel having variable pitch paddles, and one or more electrical generators.

The presently described subject matter is directed to an improved power generator comprising or consisting of a paddle wheel, one or more electrical generators, and a lifting device for raising and lowering the paddle wheel.

The presently described subject matter is directed to an improved power generator comprising or consisting of a variable configuration paddle wheel, one or more electrical generators, and a lifting device for raising and lowering the paddle wheel.

The presently described subject matter is directed to an improved power generator comprising or consisting of a variable configuration paddle wheel having variable pitch paddles, one or more electrical generators, and a lifting device for raising and lowering the paddle wheel.

The presently described subject matter is directed to an improved power generator comprising or consisting of a variable configuration paddle wheel, one or more electrical generators, a variable speed drive connecting the paddle wheel and one or more electrical generators, and a lifting device for raising and lowering the paddle wheel.

The presently described subject matter is directed to a floating power generator for generating electrical power.

The floating power generator can be floated on a body of water (e.g. river, channel stream), and towed or powered to a particular location and orientation. Then, the floating power generator can be secured in place using a chain or cable. For example, the floating power generator is secured using one or more anchors, moorings, and/or ground posts. Alternatively, the floating power generator can be secured to a dock.

The floating power generator, for example, can comprise a catamaran having a pair of spaced apart hulls. For example, a plurality of cross beams connect the hulls together. In addition, a platform can be provided on top of the cross beams. A frame is connected to the cross beams and platform, and a paddle wheel is supported by the frame.

The floating power generator can include transverse oriented spoon shaped paddles rotating through a center line of the catamaran and generating electricity. The boat or vessel can be firmly anchored in the river, for example, with steel cables and concrete anchor. The power that is generated by the floating power generator is transferred through electrical cables attached to steel anchor cables extending to a transformer unit on the shore that is connected to an electric grid.

The floating power generator uses the raw power of the river flow or tide water movement. A 7 knot water flow contains the same energy as 150 miles/hr wind. Further, water flow is typically constant capitalizing on the never ending natural cycle of sun activity, water evaporation, and precipitation. The floating power generator can be easily removed, or moved along with the anchoring system, and an on-shore transformer system can also be mobile (e.g. wheel based).

The floating power generator can include a variable speed drive (e.g. transmission or gearbox having a gearshift mechanism) to maximize the generator rotations based on the speed of the flow of the river and the amount of force generated. If the flow slows down, the unit can down shift to maintain a targeted or selected electrical generator rotational speed.

The floating power generator is environmentally friendly, completely non-invasive process of capturing energy from water flow, and without the need to dam the river or artificially control the shape or flow of the river. By being based on a floating unit, it fluctuates with the river level, or naturally self-rotates and aligns with incoming or outgoing tides.

Depending on the river depth, speed and available power, the floating power generator is easily scalable. For example, the unit can be a giant unit mounted on two (2) barges, that can feature several paddle wheels in one unit, or can be a small, almost camping size unit, that can be assembled on the spot and used as temporary source of power.

The average unit, for example, can be 40-50 feet long, which will require depth of the river for smooth rotation of around 3-4 feet. Smaller units can operate in as little as one foot of water, while the large barge based unit can operate and harvest energy from the world's deepest and largest rivers with paddles that require 5-6 feet minimum depth.

Since the rivers are never ending source of the flow of the water, the energy production is not interrupted unlike wind mills or wind farms that do not operate when there is no wind. Also, these units can be daisy chained to each other, for example, hundreds of feet apart, and floated along an entire river system. Since the power of the river flow is generated by gravity pulling water down the water flow, the downstream daisy chained units can all be operated at the same power output. By using the anchoring system along the way, the daisy chain can be curved to stay in the main water flow and follow the river shape and generating electrical power without disturbing the environment.

Since the units can be fitted and lit with navigational lights, on larger rivers the units can provide better lighting for navigation at night. In areas where there is significant tidal activity, the units can be provided with 360 degree circular space around to rotate relative to incoming or outgoing tide.

In the climates where rivers freeze in the winter, the units can be pulled out, like a boat, to dry dock same to pass through the winter.

The maintenance can be relatively simple and inexpensive. From maintaining the power generator to removing the growth on the underside of the boats or vessels. The units should be pulled out periodically, for example, every two (2) years to get a coat of anti-fouling paint applied.

The basic idea reverses the traditional power plant situated on a dam. The purpose of the dam is to provide a steady flow of the water and a head to a turbine generator that is fixed. The units avoid the need for billion dollar dam construction projects that are not environmentally friendly.

The manufacturing cost of the units is comparatively low compared to almost any other electricity generating unit, which makes it an ideal low cost power plant for developing nations, where over 70% of the population lives close to a river.

With these units, most of the developing world can be electrified, and with it comes enormously increased living standards, air conditioning, internet, and water purification systems.

The paddles of the paddle wheel are turned by the relative flow of water impinging on the paddles. This arrangement produces torque by transferring the kinetic energy of the flowing water to the paddle cups of the paddles to rotate the paddle wheel.

If the paddles move the same speed as the water, the paddle cups are not fully capturing the kinetic energy of the water flow.

If the paddle wheel is slowed down, through employing resistance of the paddles and paddle cups in the flowing water then more kinetic energy of the water flow can be captures. For example, using a variable speed drive (e.g. gear box) to make rotating the generator more difficult to rotate, then more of the kinetic energy can be captured. If too much resistance is applied, then the paddle wheel will stall and produce no power.

Therefore, a computer receiving input from an accurate rotation speed sensor applied to the paddle wheel can generate an output to control the operation of the paddle wheel. For example, the computer can calculate the speed of the paddle cups verses speed of the flowing water using the diameter and shaft rotations of the paddle wheel. The speed of the flowing water can be accurately measured. It is speed of the flowing water relative to the stationary that is measured.

Once these measurements are made, the computer needs to apply, for example, a gearbox reduction ratio to make the paddle cups of the paddles move about 20-30% slower than water. In this manner, then most of the kinetic energy of the flowing water is captured compared with capturing the energy of the natural flow.

The kinetic energy converted by the paddle wheel and transferred through electronically controlled gear box can be maximized by continuously adjusting for the speed of the water to maximize power generation by the electrical generator(s).

For example, a 3 knot water flow, with the gearshift applying reverse generator torque against the rotation of the paddle wheel will capture 20-30% more energy, resulting in energy equivalent to a water flow of 3.5 knots. This would be equivalent to the energy of wind speed of 75 miles an hour applied to windmill. Most wind mills shut down at 25 mph. A single unit operating like this would create electric power equivalent to many windmill plants.

The floating power generator can optionally be provided with foldable paddles, so the paddles can be folded to assist in moving the unit to a particular position. In addition, the floating power generator can be provide with a brake to stop the unit, for example, in case of emergency.

Again, slowing the movement of the paddle cups of the paddles relative to the speed of the water (e.g. 20-30% slower) can increase the amount of kinetic energy transferred from the water flow to the paddle wheel. The particular number of paddles and paddle designs can be optimized to obtain maximum efficiency. The operation of the water is controlled by computer to maintain maximum transfer of kinetic energy (i.e. operational sweet spot) from the flowing water to the paddle wheel by controlling the variable speed drive (e.g. electric variable speed drive, electronic speed controlled gear box or transmission). For example, if the water flow speeds up, then gears are changed in real time to create more resistance to the water flow. The variable speed drive can be operated in a linear manner or exponentially depending on the programming of the computer.

The floating power generator can include a failsafe in case the water flow speed measuring device fails. For example, the speed of the axle of the paddle wheel can be measured. The computer can be pre-program to keep the gears from slowing down too much. In other words, the computer operates the electronically controlled gear box or transmission to change the gears to almost a stall level, and then works backwardly to the sweet spot based purely on the speed of the axle of the paddle wheel. Further, the computer can be program to notify the operator of any needed repair or maintenance.

The rotational speed ratio of the electrical generator verses the axle of the paddle wheel can have a variable ratio. For example, this ratio can be 80:1 to 180:1. Further, it is estimated that an average unit can generate up to 5 mWh, and a super-sized one can generate up to 12 mWh.

The particular arrangement of the floating power generator can be based on Betz's law of efficiency. The paddle wheel is capable of low RPM while providing high torque. The hulls or barges of the vessel (e.g. catamaran) can measure 60-100 feet length at waterline. The paddle wheel can be 40-60 ft in diameter, drafting 3 1/2 feet at barges and 5 feet at the paddle.

The average river speed can be around 2 miles per hour. There are a number of rivers that move much faster, but this is the average large river. For example, the Mississippi river at New Orleans can speed up to 3 mph. This speed can rotate the paddle wheel at 2-3 rpm.

The transmission or gearbox can be around a 90:1 rotational speed ratio for medium to low speed electrical generators. The transmission or gearbox can be designed for each particular river speed. The river speed typically varies very little throughout the year and each transmission or gearbox conversion can be custom sized for the maximum speed and torque. The river speed varies more between rivers than between seasons on the same river.

The electrical generators can weigh between 4- and 12 tons, and can generate between 5 kW and 12 kW.

The shape of the paddles can be more square to capture the corners. The paddles can be 15-18 feet in width, 5-6 feet high and would capture 6-8 cubic meters of water. In addition, the frame can be an A frame or an upside down T frame. The second dimensions I noted are for the larger vessel of 100 feet.

The paddle wheel can comprise an inner hub and an outer ring. A plurality of spokes connect the inner hub and outer ring together. A plurality of paddles are each connected to an outer end of each spoke. For example, the outer ring is made of circular sections of square cross-sectional tubing welded or connected together. The inner hub is circular and fabricated from a section of tubing.

The outer ring and inner hub are provided with through holes fitted with sleeves to accommodate the outer and inner ends of the spokes for rotation. When the spokes are rotated, the pitch of the paddles is adjusted or changed. For example, the paddles are oriented transversely relative to the outer ring (i.e. parallel to rotary axis of paddle wheel). The spokes can be rotated clockwise or counter clockwise to change the pitch angle of the paddles. The amount of force applied to the paddles of the body of moving water decreases at the pitch angle is increase in magnitude in the positive or negative angle direction.

The hub comprises an outer hub and an inner hub. The inner hub accommodates an axle of the paddle wheel. An adjustable pitch unit is accommodated between the outer hub and inner hub for selectively rotating the spokes. For example, the adjustable pitch unit comprises a bevel gear cooperating with pinion gears connected to the inner ends of the spokes. As the bevel gear is rotated relative to the hub, the spokes are rotated to change or adjust the pitch angle of the paddles. In addition, the adjustable pitch unit comprises a worm gear connected to the bevel gear via the inner hub. A worm driven by a motor cooperates with the worm gear to simultaneously rotate the worm gear along with the bevel gear. The motor is configured to rotate with the adjustable pitch unit. For example, the motor is mounted to the bevel gear and/or inner hub. The motor is an electrical, hydraulic, or pneumatic motor. A connector is provided to operate the motor, and allow the motor to rotate relative to frame and platform of the floating power generator. For example, the connector is a slip ring connector. The motor is configured to be selectively operated and controlled by a computer and/or manual control unit.

The frame supporting the paddle wheel, for example, can be made of sections of box beams (e.g. square, rectangle, round cross-sectional tubing) fitted with connector plates. The sections of box beams can be assembled together, for example, by bolting and/or welding. For example, the frame can comprise a pair of posts connected together by one or more cross-members. The frame can include a pair of inwardly extending outriggers configured to accommodate the axle of the paddle wheel connected to a pair of electrical generators. For example, the axle of the paddle wheel is support on opposite ends by a pair of axle mounts connected to platforms provided on top of each inwardly extending outriggers. A pair of couplings can connect the axle of the paddle wheel to the electrical generators. The frame can include a pair of outwardly extending outriggers configured to accommodate one or more equipment boxes elevated above the platform of the floating power generator.

The frame can be mounted to the platform so as to be fixed, or can be configured to be adjustable in height. For example, a pair of hydraulic jacks can connect the frame to the platform of the floating power generator. The hydraulic jacks can each comprise a hydraulic jack and a sleeve housing for accommodating a lower end of each post of the frame. The hydraulic jacks can each include a solenoid locking device to cooperate with locking pawls provided on the lower end of each post of the frame configured to selectively lock and unlock the frame in position relative to the platform. The hydraulic jacks are configured to raise or lower the height of the paddle wheel relative to the water level of the body of flowing water. Increasing the depth of the paddles increases the amount of force applied to each paddle by the body of flowing water.

The floating electrical generator comprises an electrical system to operate same. For example, the electrical system can comprise a computer connected to a variety of sensor for receiving input signals and connected to a variety of controls/devices for operating the floating electrical generator.

For example, the floating electrical generator can comprise a flow sensor for detecting the flow speed of the body of flow water relative to the floating electrical generator. Further, the paddle wheel can be fitted with a sensor for detecting the rotational speed of the paddle wheel. In addition, one or more of the spokes (e.g. all spokes) can be fitted with a pitch sensor to detect the angle of the paddle or paddles relative to the axle of the paddle wheel. Also, the platform can be fitted with a sensor for detecting the height of the paddle wheel relative to the platform, or otherwise the depth of the paddles relative to the water level of the flowing body of water.

Based on the input from these sensors, the computer can generate output signals for controlling a brake unit for braking the paddle wheel. For example, the adjustable pitch unit can be provided with a disk brake arrangement for braking the paddle wheel. Alternatively, the brake unit can be applied between the outer ring of the paddle wheel and platform (e.g. rubber vehicle type tire/wheel riding on a side surface of the outer ring).

The floating electrical generator can comprise a variable speed drive connected between the axle of the paddle wheel and the one or more electrical generators. The variable speed drive can be an electrical variable speed drive configured to control the voltage and current through the windings of the stator and rotor of the one or more electrical generators. Alternatively, the variable speed drive can be a mechanical transmission connected between the axle of the paddle wheel and the one or more generators. As a further alternative, both an electrical variable speed drive and a mechanical variable speed drive can be used in combination.

A generator controller can connect the computer to the one or more electrical generators to control the operation of the floating power generator in real time, for example, to constantly maximize power output of the one or more electrical generators. The computer is programmed to receive the inputs from the sensor, and constantly adjust the outputs to control the one or more generator via the generator controller. The power output of the one or more electrical generators can be monitor with one or more power meters configured to provide a feedback signal to the computer.

As another example, the floating power generator can comprise a floating platform comprising a flow passageway. For example, the flow passageway can be a three-dimensional (3D) flow passageway configured to increase the flow rate directed to the paddle wheel. For example, the flow passageway can be configured to taper inwardly effectively reducing the cross-sectional flow area while increasing the flow speed. For example, the sides of the flow passageway can taper inwardly and the bottom of the flow passageway can taper upwardly to increase flow speed in the flow passageway being directed to the paddle wheel to increase power output.

BRIEF DESCRIPTION OF THE DRAWINGS

FIG. 5 is a top planar view of the floating power generator shown in FIG. 1.

FIG. 6 is a perspective view of a paddle of the paddle-wheel of the floating power generator shown in FIG. 1.

FIG. 7 is a side elevational view of the paddle shown in FIG. 6.

FIG. 23 is a partial side elevational view of the paddle of the paddle wheel of the floating power generator shown in FIG. 21.

FIG. 24 is a partial side elevational view of the paddle of the paddle wheel of the floating power generator shown in FIG. 21.

FIGS. 29-31 shows various equations.

FIG. 33 shows an equation.

FIG. 34 shows an equation.

FIGS. 37-71 show various equations.

FIG. 72 is a table of analytical calculations.

FIG. 74 is a table of analytical calculations.

FIG. 76 is a table of analytical calculations.

FIG. 78 is a table of analytical calculations.

FIGS. 81 and 82 show various equations.

FIG. 83 is a list of various equation symbols.

FIGS. 84 and 85 are floating power generator calculators.

DETAILED DESCRIPTION

Figure 1C:
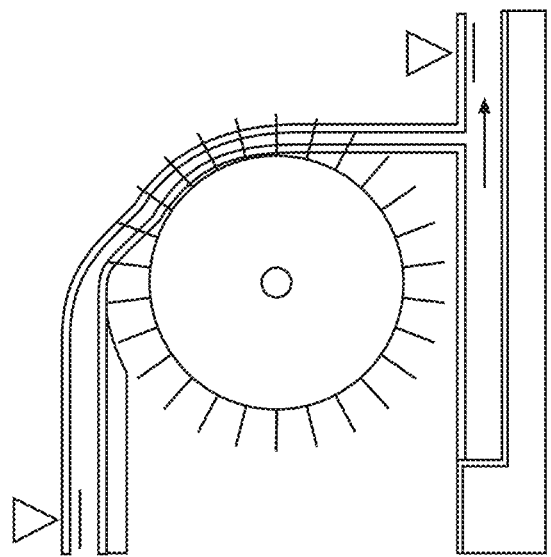
FIG. 1C is a diagrammatic view of an overshot type water wheel.

The floating electrical power generator 10 is shown in FIGS. 2-5. The floating electrical power generator 10 comprises a catamaran 12 having a pair of spaced apart hulls 14 provided with a plurality of cross-beams 15 supporting a platform 16, and a frame 18 supporting a paddle wheel 20.

The paddle wheel 20 comprises a center hub 22 and an outer ring 24 positioned concentric relative to the hub 22. The hub 22 and outer ring 24 are connected together by spokes 26 each having a paddle 28.

As shown in FIGS. 6 and 7, each paddle 28 is provided with a sleeve 28a, a fastener 28b (e.g. nut and bolt), and a sleeve reinforcement 28c (e.g. weld steel). An end of each spoke 26 fits into each sleeve 28a of each paddle 28 to removably connect each paddle 28 to each spoke 26.

Figure 8:
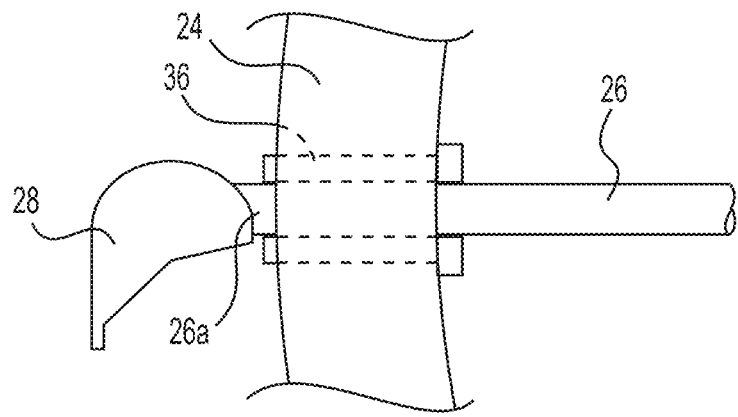
FIG. 8 is a broken away side elevational view of one (1) paddle and a portion of the paddle wheel of the floating power generator shown in FIG. 1.

As shown in FIG. 8, each spoke 26 extends through a sleeve 36 in the outer ring 24 of the paddle wheel 20 to allow rotation of the spoke 26 to be described below.

Figure 9:
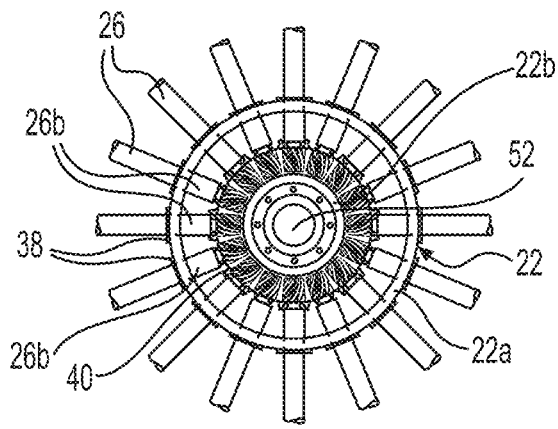
FIG. 9 is a broken away side elevational view of an interior of one side of a hub of the paddle wheel of the floating power generator shown in FIG. 1.
Figure 10:
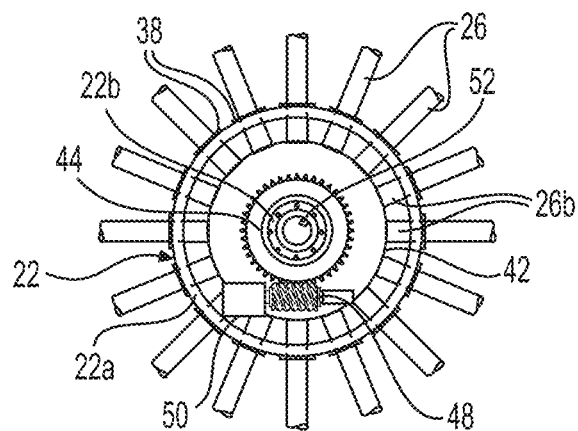
FIG. 10 is a broken away side elevational view of the interior of an opposite side of the hub shown in FIG. 9.

As shown in FIGS. 9 and 10, the hub 22 comprises an outer hub 22a, an inner hub 22b, and a pair of hub covers 30 (FIG. 4) provided on opposite sides of the outer hub 22a.

The floating electrical power generator 10 can be installed in a moving body of water (e.g. river, stream, run). For example, an anchor 32 (e.g. cement block, metal anchor) can be connected via an anchor line 34 to the floating electrical power generator 10 to maintain same at a fixed position on the moving body of water. Alternatively, a plurality of anchors and/or posts on land can be used to secure the floating electrical power generator 10 from movement on the moving body of water.

Variable Pitch

The paddles 28 can be fixed from rotation relative to the outer ring 28. For example, the paddles 28 can be fixed and orient perpendicular relative to the direction of water flow F (e.g. centerline of the catamaran 12 can be aligned with direction of water flow F). Alternatively, the paddles can be mounted to have a variable pitch relative to a centerline of each spoke 26 so that the angle of the paddles relative to the direction of water flow F can be varied from perpendicular to a selected off angle (e.g. positive or negative add).

The variable pitch configuration of the paddles 28 can change the amount of bite of the paddles 28 in the water flow F. For example, the paddles 28 can be configured so that maximum bite with the water occurs when the paddles 28 are orient perpendicular relative to the direction of water flow F. When, the pitch of the paddles 28 are changed positive or negative, the paddles 28 have less bite with the water, and the rotational speed of the paddle wheel 20 can be increased. It is noted that a positive and negative pitch of the paddles 28 can also produce a side thrust and/or torque applied to the catamaran 12, which can be used to maneuver the catamaran (e.g. catamaran maneuvered off angle relative to the direction of water flow F).

A variable pitch arrangement of the paddles 28 is shown in FIGS. 9-13. Specifically, as shown in FIG. 8, each paddle 28 is mounted onto an outer end 26a of each spoke 26. The outer end 26a of each spoke 26 fits within a through hole in the outer ring 24, and is supported by the outer ring 24. The through holes in the outer ring 24 are each fitted with a sleeve 36 configured to allow the respective spoke 26 to rotate therein. For example, each spoke 26 and sleeve 36 have a cooperating round configuration (i.e. round cross-sectional shape). The round spoke 26 fits through the round sleeve 36 to provide a configuration to allow the round spoke 26 to be rotated within the round sleeve 36 when rotating each paddle 28. In this manner, the angle of the paddles 28 (e.g. leading edge of each paddle) can be adjusted or varied relative to the outer ring 24 and relative to the direction of water flow F.

As shown in FIG. 9, an inner end 26b of each spoke 26 fits within a through hole in the outer hub 22a, and is supported by the outer hub 22a. The through holes in the outer hub 22a are each fitted with a sleeve 38 configured to allow the respective spoke 26 to rotate therein. For example, each spoke 26 and sleeve 36 have a cooperating round configuration (i.e. round cross-sectional shape). The round spoke 26 fits through the round sleeve 36 to provide a configuration to allow the round spoke 26 to be rotated within the round sleeve 36.

Figure 11:
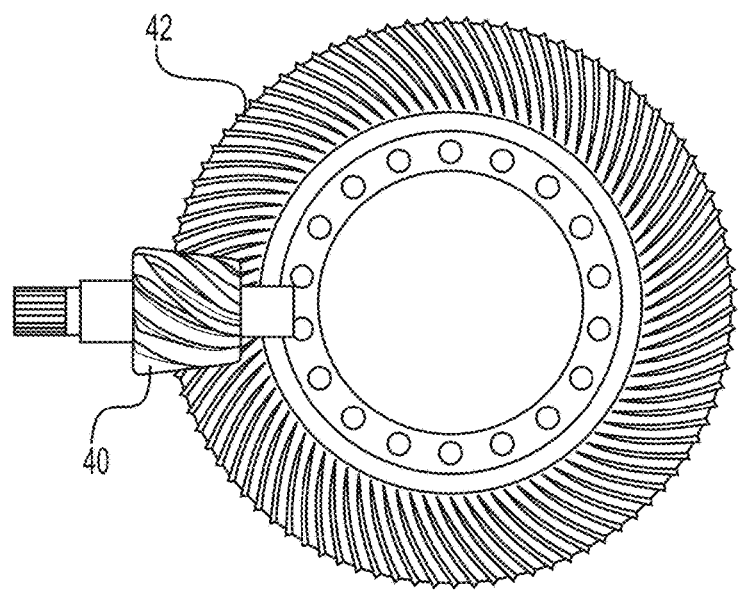
FIG. 11 is an enlarged side elevational view of a gear set provided on the one side of the hub shown in FIG. 9.

The inner end 26b of each spoke 26 is provided with a pinion gear 40 (FIG. 9) cooperating with a bevel gear 42. For illustration purposes, a single pinion gear 40 cooperating with the bevel gear 42 is shown in FIG. 11; however, the pinion gears 40 of all the spokes 26 cooperate with the bevel gear 42, as shown in FIG. 9. As the bevel gear 42 is rotated, the pinion gears 40 are simultaneously rotated to change the pitch of the spokes 26 and corresponding paddles 28.

Figure 13:
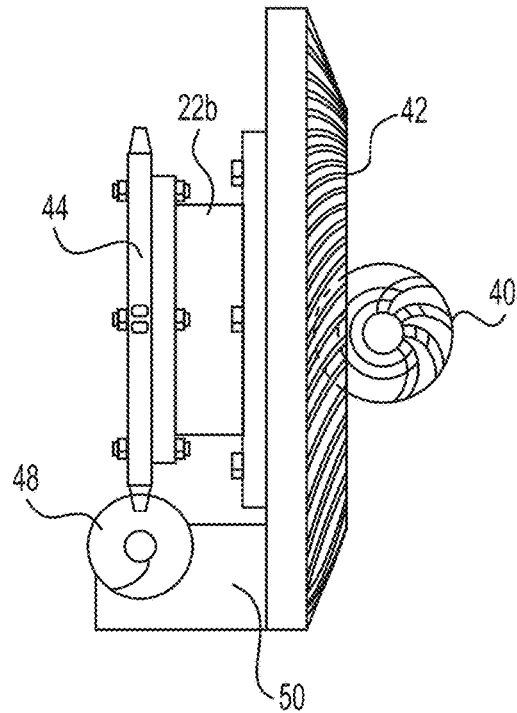
FIG. 13 is a side elevational view of the combined gear set assembly shown in FIGS. 11 and 12.

The bevel gear 42 is connected to a worm gear 44 via an inner hub 22b, as shown in FIG. 13. A worm 46 cooperates with the worm gear 44 to simultaneously rotate the worm gear 44 and bevel gear 42 to rotate the pinion gears 40 and spokes 26 to change the pitch of the paddles 28.

As shown in FIG. 10, a motor 50 (e.g. electric, hydraulic) is connected to the worm 48 to selectively and simultaneously drive the worm gear 44, inner hub 22b, bevel gear 42, and pinion gears 40 to rotate the spokes 26 and change the pitch of the paddles 28 when activated.

Figure 12:
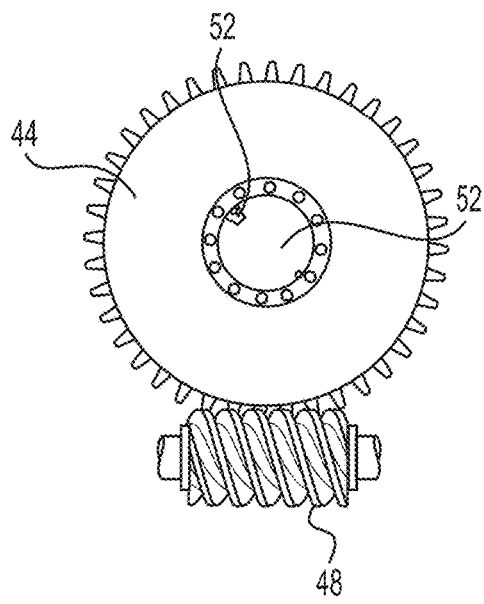
FIG. 12 is an enlarged side elevational view of another gear set provided on the opposite side of the hub shown in FIG. 10.

The inner hub 22b is mounted on an axle 52 of the paddle wheel 20. For example, a through hole in the inner hub 22b and the axle 52 are keyed together with a key 52, as shown in FIG. 12, so that the axle 52 and inner hub 22b rotate together with the paddle wheel 20. Further, the motor 50 is mounted to rotate along with the inner hub 22b. For example, as shown in FIG. 13, the motor 50 is mounted to a backside of the bevel gear 42 to spin or rotate together as a unit with the inner hub 22b, outer hub 22a, and outer ring 24 of the paddle wheel 20 as an assembled unit.

The motor 48 can be an electric, hydraulic, or pneumatic motor configured to be remotely controlled via wire or wirelessly. The motor 48 is configured to be supplied with electrical power, hydraulic fluid, or air pressure while rotating around with the paddle wheel 20. Thus, an electric, hydraulic, or pneumatic connection configured to allow rotation between motor 48 and a stationary input or supply of electric, pressurized hydraulic fluid, or pressurized air will be required as a component of the motor 48, or a separate unit mounted in proximity relative to the motor 48. For example, a slip ring electrical conductor can provide electric power to the motor 48.

Frame

Figure 14:
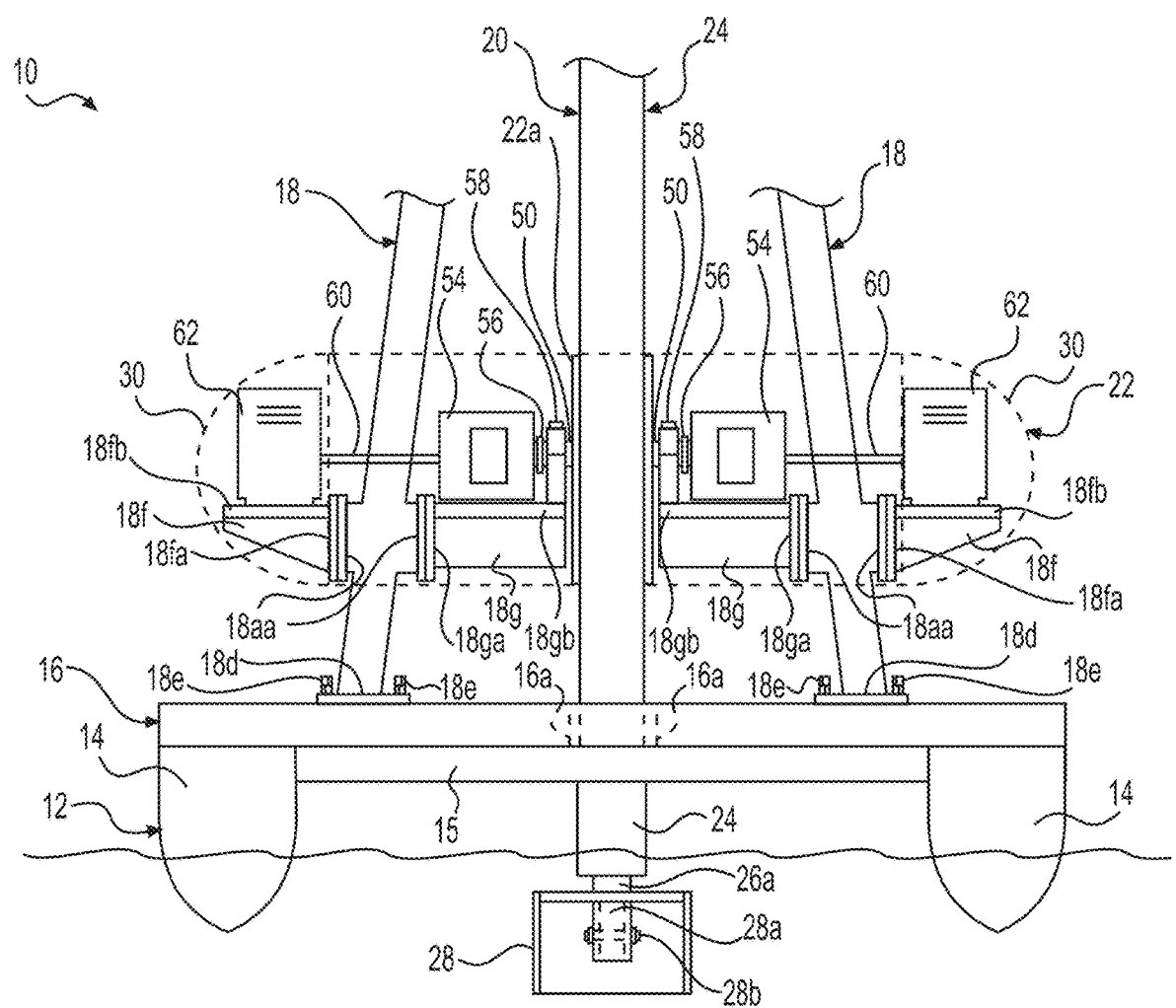
FIG. 14 is a partial end elevational view of the floating power generator shown in FIG. 1.

The frame 18 comprises a pair of spaced apart inclined posts 18a connected together at the top thereof by crossmembers 18b and 18c and connected together at the bottom thereof by a plurality of cross-members 15 of the catamaran 12 and the platform 16, as shown in FIG. 14. For example, the frame 18 can be a metal frame made of rectangular cross-sectional tubular members welded and/or fastened together.

The posts 18a can be provided with anchoring plates 18d and bolt fasteners 18e for removably and securely connecting the frame 18 to the cross-members 15 of the catamaran 12 and platform 16.

The posts 18a can be fitted with outwardly extending outriggers 18f and inwardly extending outriggers 18g. For example, sections of metal box beams are fitted with anchoring plates 18fa, 18ga and mounting plates 18fb, 18gb, respectively. The anchoring plates 18fa, 18ga connected to mounting plates 18aa of the posts 18. The respective anchoring plates can be connected together (e.g. using nuts and bolts).

The platform 16 can be constructed, for example, with a flat slip proof upper surface, and a slot 16a (FIG. 14) for accommodating the paddle wheel 20 extending through a center portion of the platform 16.

Further, for example, the frame 18 can be made of a type of steel that is corrosion resistant (e.g. stainless steel, aluminum) and/or creates a protective outer layer when weathered. Alternatively, the frame 18 can be made of metal and coated inside and outside (e.g. electroplated, galvanized, primed, painted, tarred) to prevent corrosion thereof.

Electrical Generators

The floating power generator 10 comprises one or more electrical generators 54 (e.g. pair of generators 54) installed on the inwardly extending outriggers 18g. The electrical generators 54 are coupled to the axle 50 of the paddle wheel 20 by couplings 56. A pair of mounts 58 installed on the mounting plates 18gb of the inwardly extending outriggers 18g support opposite ends of the axle 50 of the paddle wheel 20 to allow rotation thereof.

the electrical generators 54 are connected via electrical cables 60 to the equipment boxes 62 installed on the mounting plates 18fb of the outwardly extending outriggers 18f. The equipment boxes 62 can contain electrical equipment to operate and control the floating power generator 10.

The electrical generators 54 can be configured to generate direct current (DC), or can be alternators configured to generate alternating current (AC).

Variable Speed Drive

As shown in FIG. 14, the electrical generator 54 can be directly connected to the paddle wheel 20 (e.g. via axle 50 of the paddle wheel 20 and coupling 56).

Figure 16:
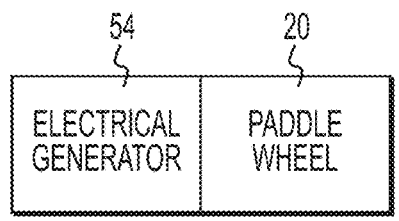
FIG. 16 is a diagrammatic view of the combined electrical generator and paddle wheel.

As shown in FIG. 16, the electrical generator 54 can be connected to the paddle wheel 20 via a variable speed drive 64. The variable speed drive 64 can be a mechanical variable speed drive (e.g. transmission), and/or can be an electrical variable speed drive controlling the operation of the electrical generator 54 based on the operation of the paddle wheel 20.

Variable Depth Paddles

Figure 15:
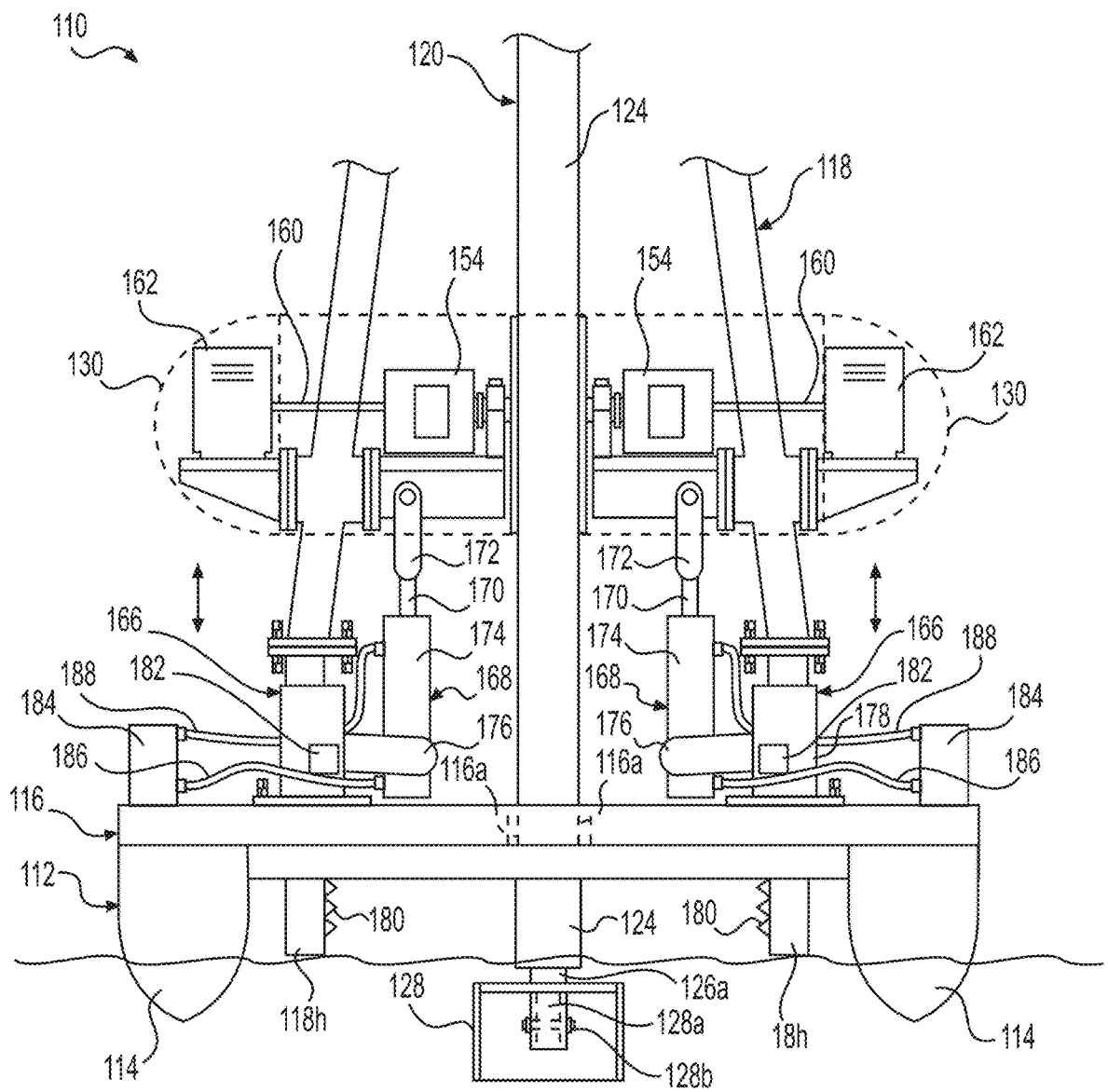
FIG. 15 is a partial end elevational view of another floating power generator.

The depth of the paddles relative to the water level WL can be configured to be variable or adjustable. For example, as shown in FIG. 15, the frame 118 can be raised and lowered by hydraulic jacks 166 each fitted with a hydraulic cylinder 168 for raising and lowering the paddle wheel 120 to correspondingly raise and lower the paddles 128 relative to the water level WL.

The hydraulic cylinders 168 each comprise a piston 170 provided with a yoke connector 172 and a cylinder 174 connected by a bracket 176 to a sleeve housing 178 of each hydraulic jack 166. The sleeve housings 178 each comprise an internal passageway extending top to bottom for slidingly accommodating a lower frame section 118h fitted with a locking pawl 180. The sleeve housings 178 are each fitted with a solenoid locking device 182 cooperating with the locking pawl 180 for selectively electronically locking and unlocking the frame 120 within the hydraulic jack 166 at a selected height. Specifically, the solenoid locking devices 182 are electronically unlocked (e.g. remotely by electronic control) to allow the frame 120 to be raises or lowered via the hydraulic cylinders 168. After the height of the frame 120 is adjusted to adjust the depth of the paddles 128 relative to the water level WL, the solenoid locking devices 182 are then actuated to locked the frame 120 at the adjusted height within the hydraulic jacks 166.

Hydraulic pump units 184 (FIG. 15) are connected to the hydraulic cylinders 184 via hydraulic pressure lines 186 and hydraulic return lines 188. The hydraulic pump 184 is configured to be controlled remotely via wire or wirelessly.

Electrical System

Figure 18:
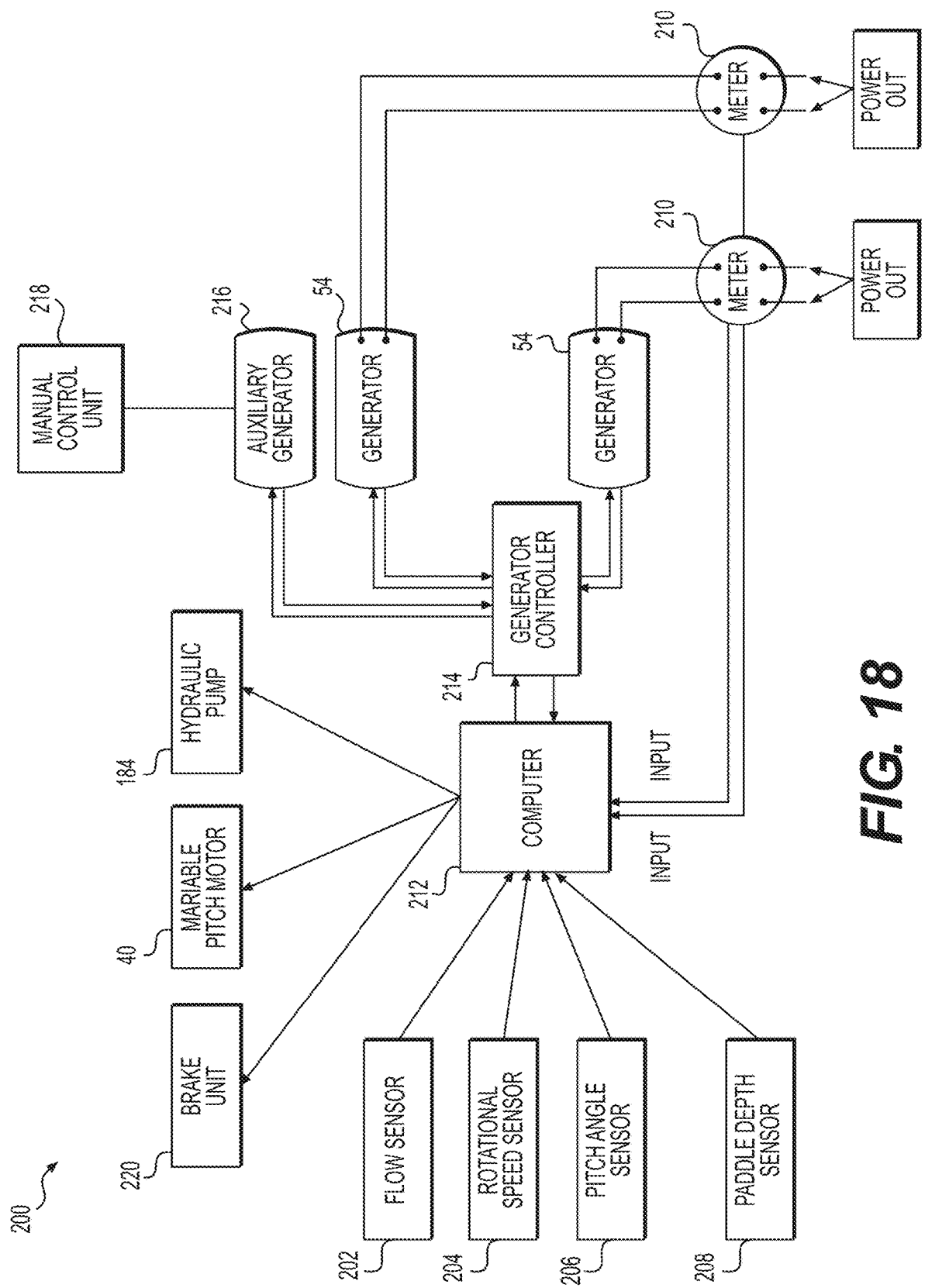
FIG. 18 is a diagrammatic view of the electrical system of the floating power generator shown in FIG. 15.

The electrical system 200 of the of the floating electrical power generator 10 is shown in FIG. 18.

The electrical system 200 comprises a variety of sensors, including a flow sensor 202 for detecting the water speed of the water flow F relative to the floating power generator 10 (110); a rotational speed sensor 204 for detecting the rotational speed of the paddle wheel 220; a pitch angle sensor 206 for detecting the pitch angle of the paddles 28 (128); and a paddle depth sensor 208 for detecting the depth of the paddles 28 (128) relative to the water level WL. The electrical system 200 further comprises power meters 210 configured for detecting the power output of the electrical generators 54 in real time.

The electrical system 200 comprises a computer 212 for receiving input signals from the flow sensor 202, rotational speed sensor 204, pitch angle sensor 206, paddle depth sensor 208, and power meters 210, and generating output signals for controlling the operation of the floating power generator 10. Specifically, the computer 212 generates output signals for controlling the operation of the generator controller 214 (e.g. variable speed controller). The generator controller 214 is configured to control the operation of the electrical generators 54, for example, configured to control the rotational speed, and voltage applied and current through the windings of the rotor and stator of each generator 54.

The computer 212 generates output signals for controlling the motor 48 for adjusting or changing the pitch of the paddles 28. Further, the computer 212 generates output signals for controlling the hydraulic pump unit 185 for raising or lowering the paddle wheel 20 for adjusting or changing the depth of the paddles 28 relative to the water level WL Optionally, the electrical system 200 can comprise an auxiliary electrical power generator 214 (e.g. fuel, gasoline, gas, propane, battery powered electrical power generator) configured to operate one or both of the electrical generators 54 for driving the paddle wheel 20, for example, when propelling or maneuvering the floating power generator 10. Further, the electrical system 200 can include an optional manual or remote control unit 216 configured to operate and control the operation of the paddle wheel 20 when propelling or maneuvering the floating power generator 10. In this manner, the floating power generator 20 can be self-propelled to transport and maneuvered to a particular position and orientation on the flowing body of water without the need of being towed and/or manipulated by another boat (e.g. tow boat).

In addition, the electrical system 200 can include a remotely operated brake device 218 to brake the paddle wheel 20, or lock the paddle wheel 20 from rotating. For example, the brake device 218 is configured to quickly brake the paddle wheel 20 in the event of an emergency, or can be used to lock the paddle wheel 20 from rotating when not operating or when being transported on the flow body of water. Also, the braking device 218 can be used in combination with the computer 212 to limit the maximum speed of rotation of the paddle wheel 20 via a computer program.

The brake device 118, for example, can be a disc brake unit having a caliper applied to the worm gear 44 (FIG. 13) being used as a disc brake rotor.

Compact Floating Power Generator

Figure 20:
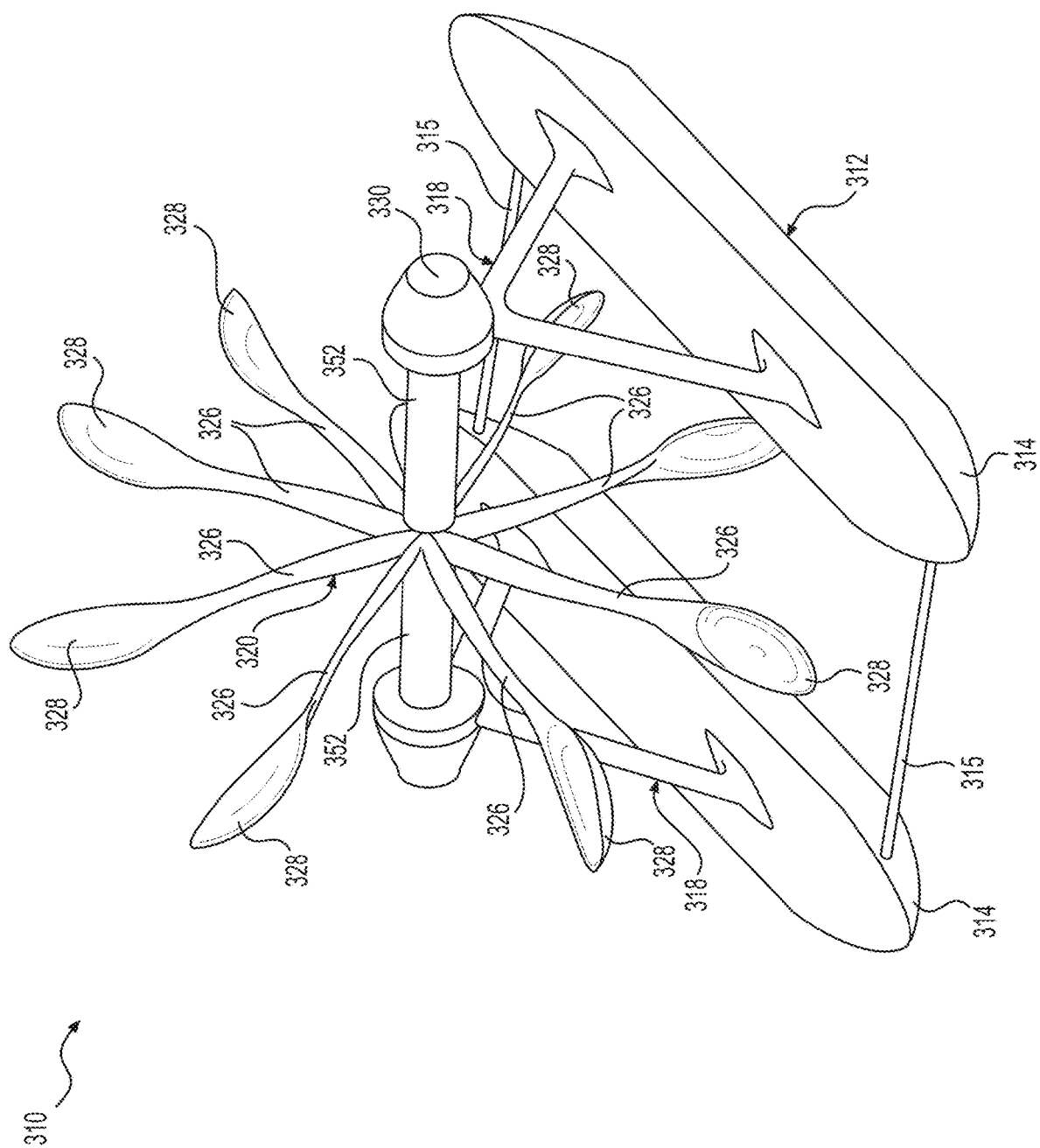
FIG. 20 is a perspective view of a further floating power generator.

Another floating electrical power generator 310 is shown in FIG. 20. The floating electrical power generator 310 comprises a catamaran 312 having two (2) hulls 314 connected together by cross members 315

A set of frames 316 are mounted on respective hulls 314 supporting a paddle wheel 320. The paddle wheel 320 comprises eight (8) spoon-shaped paddles 326 having spoon portions 328. The spoon portions 328 are angled transversely as shown. The spoon portions 328 can be set at a slight angle (e.g. + or −10 degrees) from transverse.

The paddles 326 can be made of metal (e.g. fabricated, welded, forged), or can be made of plastic (e.g. molded fiberglass, carbon graphite, Kevlar).

The paddle wheel 320 is mounted on an axle 352 supported by the frames 318. A hub cover 330 is provided on one or both sides of the axle 352. One or more electrical generators can be connected to either or both sides of the axle 352, and located under the hub cover 330.

Figure 19:
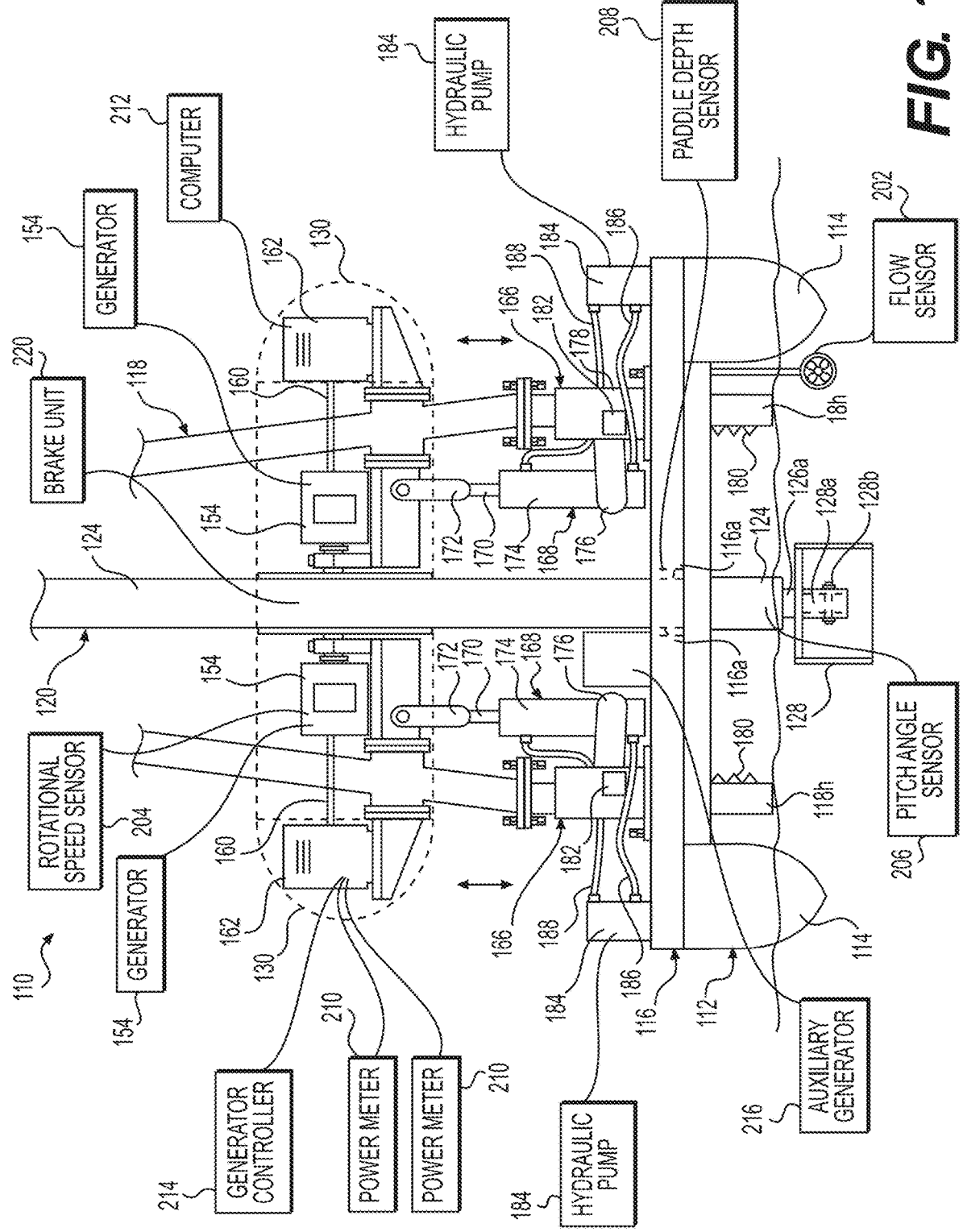
FIG. 19 is a partial end elevational view of the floating power generator shown in FIG. 15 along with components of the electrical system shown in FIG. 18.

The floating power generator 310 can include all the features, components, and/or arrangement like the floating power generator 110, as shown in FIGS. 18 and 19.

Operation

The floating electrical power generator 10 is positioned in the flowing body of water, and then anchored to become operational. The brake device 118 is operated to release the brake and allow the paddle wheel 20 to rotate via the flowing water body operating on the paddles 28.

The electrical generators 54 can optionally include a switch to turn on or off the electrical circuits of the rotor and stator of the electrical generators 54. For example, the electrical generators 54 can be switched in a first mode to freely rotate without generating power. In this manner, the paddle wheel 20 can drive the electrical generator without generating power. Then, the electrical generators 54 can be switched to a second mode to generate electrical power. In addition, the electrical circuits in the rotor and stator of the electrical generators 54 can be configured to be controlled by the electrical controller 112 to control the operation thereof. Additional electrical equipment can be provided to provide this type of control of the electrical generators 54 by the electrical controller 112. For example, an electrical type of variable speed drive 65 (FIG. 16) can be installed to provide computer controlled operation of the electrical generators 54 to maximize electrical power output from the electrical generators 54.

Alternatively, a mechanical type of variable speed drive 65 can be installed and configured to provide computer controlled operation of the mechanical load (e.g. power) applied from the paddle wheel 20 to the electrical generators 54 to maximize electrical power output from the electrical generators 54.

The electrical controller 112 can also computer control the operation of the motor 50 to adjust or change the pitch of the paddles 28 along with the operation of the motor 48 in real time operation, for example, to maximize the electrical power output of the electrical generators.

The electrical controller 112 can be a computer programmed electrical controller programmed, for example, to control the operation of the floating electrical power generator 10 in real time, and maximize the electrical output of the electrical generators 54. For example, the input from the power output meter 110 is sampled and recorded along with the inputs from the pitch angle detector 106 and paddle depth sensor 108. The computer programmed electrical control is provided with a computer program or algorithm to continuously adjust and test the power output to continuously update and maximize power output of the electrical generators 54 while operating to generate power.

Three-Dimensional (3D) Flow Type Floating Power Generator

Figure 21:
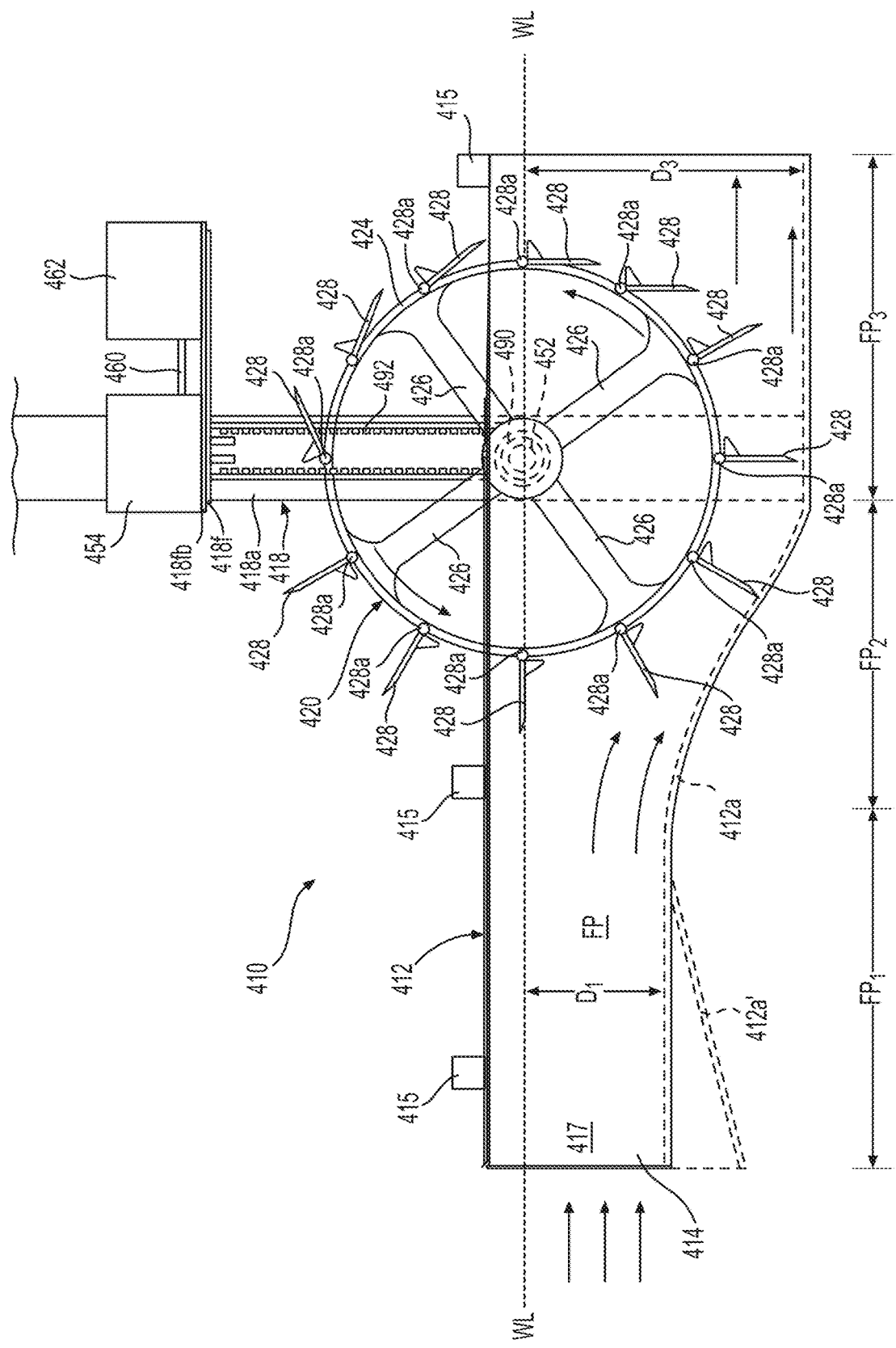
FIG. 21 is a side elevational view of a three-dimensional flow floating power generator.
Figure 22:
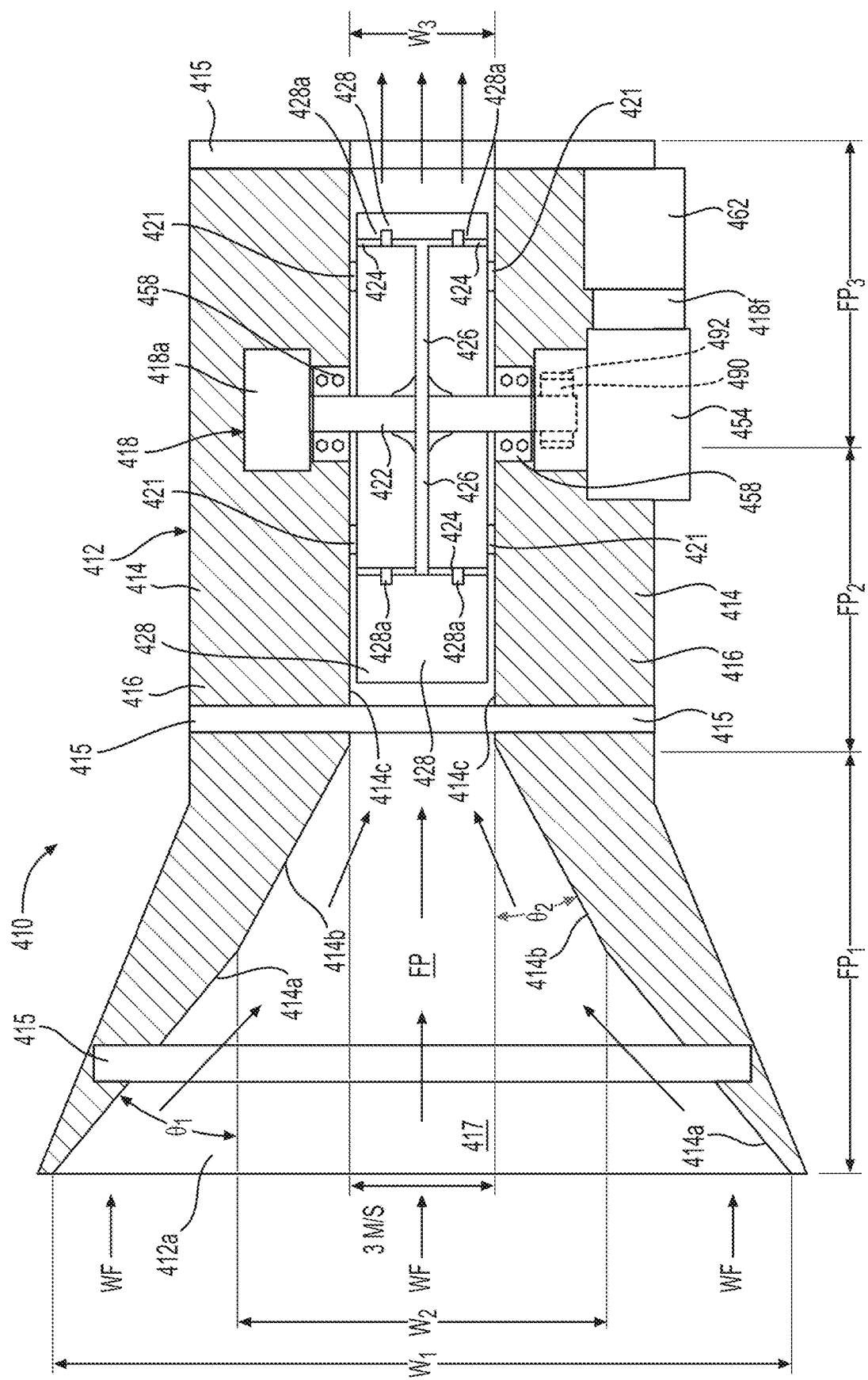
FIG. 22 is a top planar view of the floating power generator shown in FIG. 21.

A floating electrical power generator 410 is shown in FIGS. 21 and 22. The floating electrical power generator 410 comprises a floating platform 412 having a pair of spaced apart pontoons 414 connected to a lower portion 412a (e.g. lower plate) defining a flow passageway FP through the floating platform 412. A pair of upper cross members 415 can be installed to further connect the pontoons together. The top surfaces of the pontoons define a platform 416. Alternatively, or in addition, a platform can be added on top of the pontoons 414 to create a more substantial platform.

The floating electrical power generator 410 further comprises a paddle wheel 420 mounted on a frame 418 extending upwardly from the floating platform 412. A lower portion of the paddle wheel 420 is disposed with the flow passageway FP, as shown in FIG. 21. The rotation axis of the paddle wheel 420 is located at the water level WL.

The flow passageway FP comprises a first flow passageway section $FP_1$, a Second flow passageway $FP_2$, and a third flow passageway $FP_3$. The first flow passageway $FP_1$ has a fixed depth $D_1$, the second flow passageway $FP_2$ has an increasing depth flow passageway having an inlet depth $D_1$ and an exit depth $D_3$, and the third flow passageway $FP_3$ has a fixed depth $D_3$. The depth $D_2$, as shown in FIG. 21, is greater than the depth $D_1$.

The flow passageway FP is a three-dimensional (3D) flow passageway FP, as shown in FIGS. 20 and 21. Specifically, the flow passageway FP is configured to change in cross-section flow area along the length of the flow passageway FP.

The first flow passageway $FP_1$ is configured to have a fixed depth $D_1$ (FIG. 21) and an inwardly tapering width (FIG. 22). Specifically, the width tapers inwardly from $W_1$ to $W_2$ at an angle $\Theta_1$ and then from $W_2$ to $W_3$ at an angle $\Theta_2$. Thus, the cross-sectional flow area in the first flow passageway $FP_1$ decreases along the length of the first flow passageway $FP_1$ resulting in the flow speed continuously increasing along the length of the first flow passageway $FP_1$. Alternatively, the bottom wall 412' (FIG. 21) tapers upwardly decreasing the depth of the first flow passageway $FP_1$ in the flow direction, which further reduces the cross-sectional flow in the height dimension of the first flow passageway $FP_1$ further increasing the flow speed along the length of the first flow passageway $FP_1$. It is noted the first flow passageway $FP_1$ is configured to be an open passageway (i.e. upper surface is open to the atmosphere). The inlet to the flow passageway can be configured to have different configurations. Further, the inlet to the flow passageway can be configured to have a variable configuration.

The second flow passageway $FP_2$ is configured to increase in flow depth (FIG. 21) in the flow direction and a fixed width (FIG. 22). Due to the existence of the paddle wheel 420 operating within the second flow passageway $FP_2$, the effective height dimension of the second flow passageway $FP_2$ decreases from a leading edge of the paddle wheel 420 to a center line of the paddle wheel 420 (FIG. 21). This arrangement results in the flow speed significantly increasing in the second flow passageway $FP_2$ at the location of the paddle wheel 420 (i.e. compressed flow). The outer ring 424 of the paddle wheel 420 is configured to seal or isolate the second flow passageway $FP_2$ from the interior of the paddle wheel 420. For example, the outer ring 424 of the paddle wheel 420 is constructed to have a continuous wall (e.g. continuous metal plate) serving as a wall separating or isolating the second flow passageway $FP_2$ from the interior of the paddle wheel 420 and atmosphere. In this arrangement, a first portion of the second flow passageway $FP_2$ located before the paddle wheel 420 is an open passageway (i.e. upper surface is open to the atmosphere) and a second portion of the second flow passageway $FP_2$ at the paddle wheel is a closed passageway (i.e. upper surface is closed to the atmosphere by the continuous outer ring 424 of the paddle wheel 420) essentially defining an upper wall of the second portion of the second flow passageway $FP_2$. Again, it is noted that the second flow passageway $FP_2$ is open to the atmosphere at the first portion of the second flow passageway $FP_2$ and then closed to the atmosphere at the second portion of the second flow passageway $FP_2$. Further, the width of the paddle wheel 420 is the same as the width of the paddle wheel 420 less a slight distance to provide a tight clearance with the side wall of the second flow passageway $FP_2$ while allowing rotation of the paddle wheel 420 within the second flow passageway $FP_2$. The side seals 421 (e.g. elastic annular ring seal made of rubber or polymer, e.g. polyurethane) are installed on the sides of the paddle wheel 420 and located in the clearance between the outer sides of the paddle wheel 420 and the inner sides of the second flow passageway $FP_2$ to seal and prevent leakage of water flow in the second flow passageway $FP_2$ around the outer sides of the paddle wheel 420 and the inner sides of the second flow passageway $FP_2$ and into the interior of the paddle wheel 420. In this manner, the second portion of the second flow passageway $FP_2$ is a closed and sealed flow passageway.

The third flow passageway $FP_3$ is configured with a fixed depth $D_2$ (FIG. 21) and a fixed width $W_3$ (FIG. 22). Due to the existence of the paddle wheel 420 operating within the third flow passageway $FP_3$, the effective height dimension of the third flow passageway $FP_3$ increases from a centerline of the paddle wheel 420 to a trailing edge of the paddle wheel 420 (FIG. 21). This arrangement results in the flow speed significantly decreasing in the third flow passageway $FP_3$ at the location of the paddle wheel 420. For example, the outer ring 424 of the paddle wheel 420 is constructed to have a continuous wall (e.g. continuous metal plate) serving as a wall separating or isolating the third flow passageway $FP_3$ from the interior of the paddle wheel 420 and atmosphere. In this arrangement, a first portion of the third flow passageway $FP_3$ located at the paddle wheel 420 is an closed passageway (i.e. upper surface is closed to the atmosphere by the continuous outer ring 424 of the paddle wheel 420) essentially defining an upper wall of the first portion of the third flow passageway $FP_3$. The second portion of the third flow passageway $FP_3$ after the paddle wheel 420 is open to the atmosphere. It is note that the first portion of the third flow passageway $FP_3$ is closed to the atmosphere at the second portion of the third flow passageway $FP_3$ is open to the atmosphere. Further, the width of the paddle wheel 420 is the same as the width of the paddle wheel 420 less a slight distance to provide a tight clearance with the side wall of the third flow passageway $FP_3$ while allowing rotation of the paddle wheel 420 within the third flow passageway $FP_3$. The side seals 421 (e.g. elastic annular ring seal made of rubber or polymer, e.g. polyurethane) are installed on the sides of the paddle wheel 420 and located in the clearance between the outer sides of the paddle wheel 420 and the inner sides of the third flow passageway $FP_3$ to seal and prevent leakage of water flow from the third flow passageway $FP_3$ around the outer sides of the paddle wheel 420 and the inner sides of the third flow passageway $FP_3$ and into the interior of the paddle wheel 420.

The first portion of the third flow passageway $FP_3$ located at the paddle wheel 420 tapers outwardly resulting in the cross-sectional flow area increasing in size and de-accelerating the flow speed (i.e. expanded flow). In this manner, the first portion of the third flow passageway $FP_3$ is a closed and sealed flow passageway.

Thus, the flow passageway FP changes from an open passageway located before the paddle wheel 420 to a closed passageway at the paddle wheel 420, and then back to an open flow passageway after the paddle wheel 420. Due to the floating nature of the floating electrical power generator 410, the water level of the inlet end of the flow passageway FP is the same as the water level at the outlet end of the flow passageway FP. Further, the depth $D_1$ of the inlet end of the flow passageway FP is less than the depth $D_2$ at the outlet end of the flow passageway FP.

The lower portion 412a is configured so that the first flow passageway $FP_1$ is parallel to the water flow WF at the inlet 417 (FIG. 21) of the flow passageway FP and having a depth $D_1$, and then curves or transitions downwardly to a greater depth $D_2$. In addition, the inner side walls 414a and 414b of each pontoon 414 is set at different angles $\Theta_1$ and $\Theta_2$ relative to the water flow WF to define a converging flow passageway in the horizontal plane (FIG. 21). For example, the inner wall 414a is set at a greater angle $\Theta_1$ relative to the water flow WF compared to the inner wall 414b set an an angle $\Theta_2$ relative to the water flow WF to funnel the water into the second flow passageway $FP_2$.

Again, the water flow WF through the first passageway section $FP_1$ speeds up due to the convergent tapering configuration of the first flow passageway $FP_1$ (FIG. 22) just prior to reaching the paddle wheel 420 having folding paddles 428 operating in the second flow passageway $FP_2$ and third flow passageway $FP_3$. The water flow WF through the second portion of the second flow passageway $FP_2$ continues to speed up due the closed outer ring 424 of the paddle wheel 420 decreasing the cross-section flow area of water flow between the closed outer ring 424 of the paddle wheel 420 and the bottom portion 412a of the flow passageway FP of the floating platform 412. The water flow WF through the first portion of the third flow passageway FP expands and slows down due the cross-sectional flow area significantly increasing after flow past the paddle wheel 420. Thus, the size of the cross-sectional flow area of the flow passageway FP converges (i.e. compresses water flow WF) prior to the paddle wheel 420 and then diverges (i.e. expands water flow WF) after the paddle wheel 420.

In the embodiment shown in FIGS. 21 and 22, the first flow passageway $FP_1$ is an "open" flow passageway open to the atmosphere along its upper flow side or surface. Alternatively, an upper plate can be provided between the pontoons 414 ahead of the paddle wheel 420 to provide a "closed" first flow passageway $FP_1$ (e.g. an upper flat plate installed between the pontoons 414, oriented parallel to the water level WL, and located at or below the water level WL).

The paddle wheel 420 comprises a hub 422 and outer ring 424 connected together by spokes 426, as shown in FIG. 21. The paddle wheel 420 is mounted on an axle 450 supported by the frame 418 of the floating platform 412 for "free" rotation of the paddle wheel 420. The outer ring 424 is a "closed" continuous ring, as shown in FIG. 23, preventing water flowing to the interior of the outer ring 424. Specifically, the outer ring 424 has a width dimension equal to a width of the second flow passageway $FP_2$ (FIG. 21) less a clearance dimension on each side of the outer ring 424 so that the outer ring does not contact with the inner sides 414c of the pontoons 414, as shown in FIG. 21. The flexible or resilient ring seals 421 are provided on the sides of the paddle wheel 420 to seal the clearance between the outer sides of the paddle wheel 420 and the inner sides of the flow passageway FP.

Figure 25:
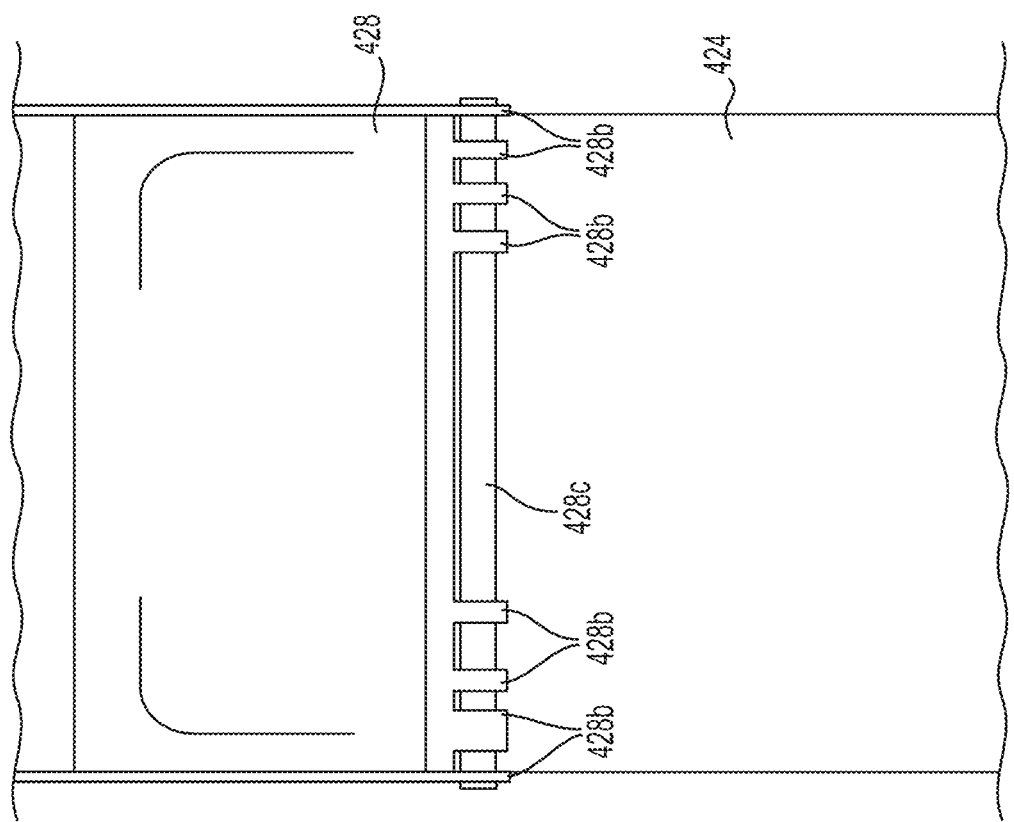
FIG. 25 is an end elevational view of a paddle of the paddle wheel of the floating power generator shown in FIG. 21.

The paddle wheel 420 is fitted with folding paddles 426 equally spaced around an outer perimeter of the outer ring 420. Specifically, the folding paddles 426 are connected by hinges 428a located on the outer ring 424 of the paddle wheel 420. More specifically, each hinge 428a comprises multiple hinge plates 428b (FIG. 25) connected (e.g. formed, welded, mechanically fastened) to an outer surface 424a of the outer ring 424 of the paddle wheel 420, as shown in FIGS. 23 and 24, and multiple hinge plates 428e located on the inner edge 428d of each paddle 428, as shown in FIG. 25. The pin 428c pivotably connects each paddle 428 to the hinge plates 428b, 428e. Specifically, the pin 428c is installed through the through holes 428ca in the hinge plates 428b (FIG. 23) and through holes in hinge plates 428e.

The paddles 426 are connected to the outer ring 424 of the paddle wheel 420 in a manner to "freely" fold back-and-forth between an extended position (e.g. paddles descending on left side of paddle wheel in FIG. 20) and a retracted position (e.g. paddle ascending on right side of paddle wheel in FIG. 20). The weight of the paddles 426 actuate the paddles 426 back-and forth between the extended position and retracted position. Specifically, as the paddles 426 on the upstream side of the paddle wheel 420 descend due to the counter-clockwise rotation of the paddle wheel 420, the paddles 426 fold outwardly under their weight until an inner edge acting as a stop of each paddle 426 contacts with an outer surface of the outer ring 424, as shown in FIG. 23. As the paddles 426 ascend on the downstream side of the paddle wheel 420, the weight of the paddles 426 fold the paddles 426 to the retracted position.

The folding configuration of the paddles 426 located on the downstream side of the paddle wheel 420 significantly reduces the drag on the paddle wheel 420 when rotating due to the folding paddles 428 retracting when being lifted upwardly by the paddle wheel 420. The folding paddles 428 can be made of metal (e.g. fabricated, welded, forged), or can be made of plastic (e.g. molded fiberglass, carbon graphite, Kevlar).

Figure 26:
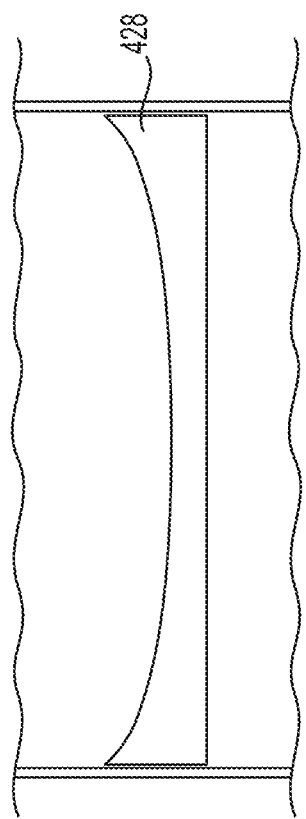
FIG. 26 is an edge elevational view of the paddle shown in FIG. 25 showing is curved or cupped configuration to enhance gripping the flow of water.

The paddles 428 each have a scallop-shaped front working surface 428f and a flat rear surface 428g, as shown in FIG. 26. The scallop-shaping of the front surface is to increase the grip on the water flowing through the flow passageway FW to increase efficiency of the paddles 428.

The paddle wheel 420 is mounted on an axle 452 supported by mounts 458 located on the posts 418a of the frame 418. An electrical generator 454 and an electrical equipment box 462 can be mounted on a post 418a of the frame 418. Specifically, an outwardly extending outrigger 418f is connected to a post 418a supporting mounting plate 418fb for supporting the electrical generator 454 and electrical equipment box 462.

The paddle wheel 420 is mounted on the posts 418a of the frame 418 so that the outermost edges of the folding paddles 428 come into close proximity to the lower plate 412a, as shown in FIG. 21, to maximize the power generated by the paddle wheel 420.

Figure 17:
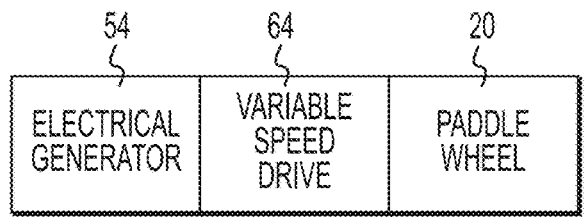
FIG. 17 is a diagrammatic view of the combined electrical generator, variable speed drive, and paddle wheel.

The floating electrical power generator 410 can include all the features, components, and/or arrangement like the floating electrical power generator 110, as shown in FIGS. 17 and 18.

Figure 27:
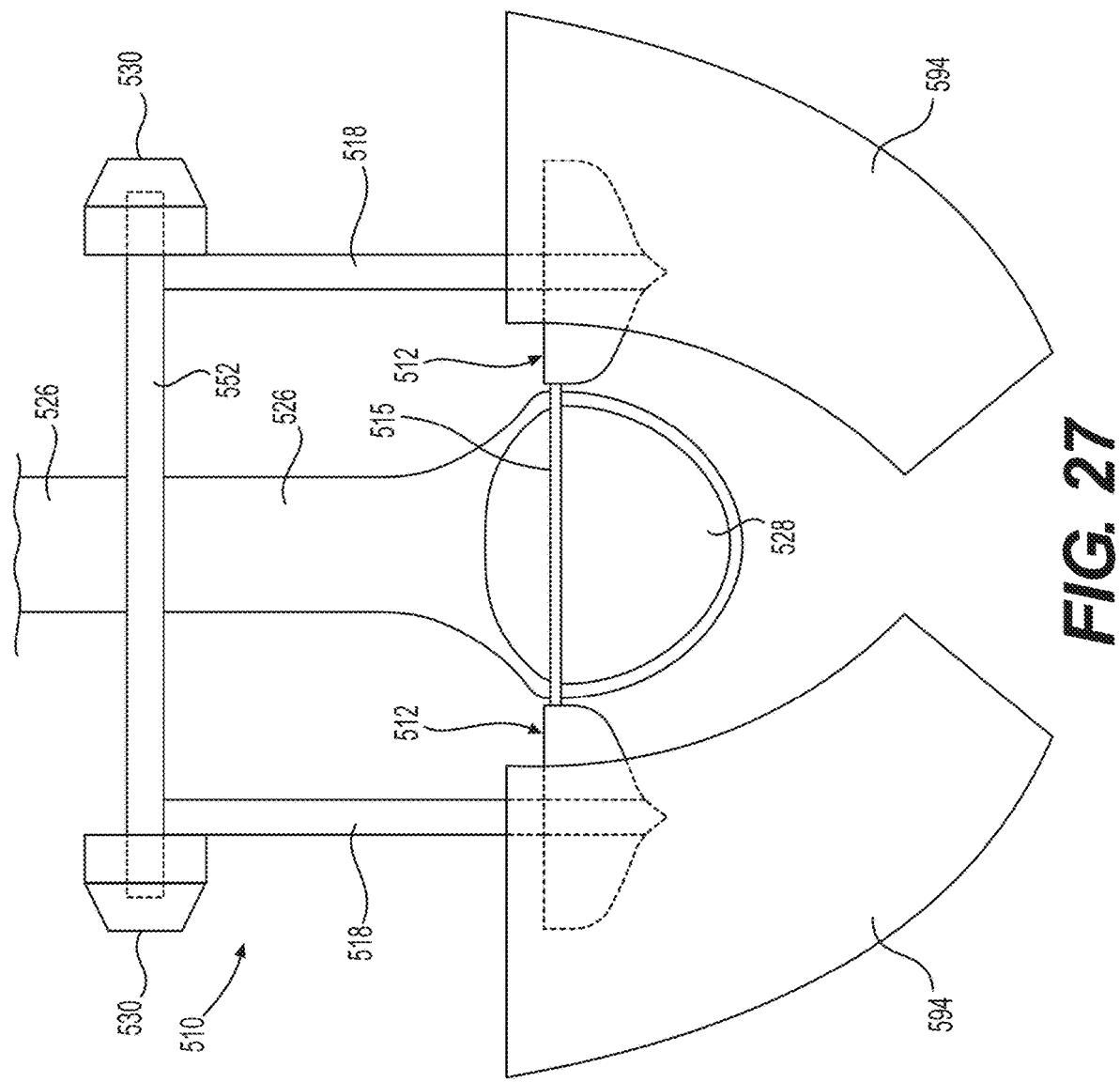
FIG. 27 is a front elevational view of a modified floating power generator the same or similar to the floating power generator shown in FIG. 20 having inwardly tapering pontoons connected to the floating power generator to funnel the water flow to the paddle wheel.
Figure 28:
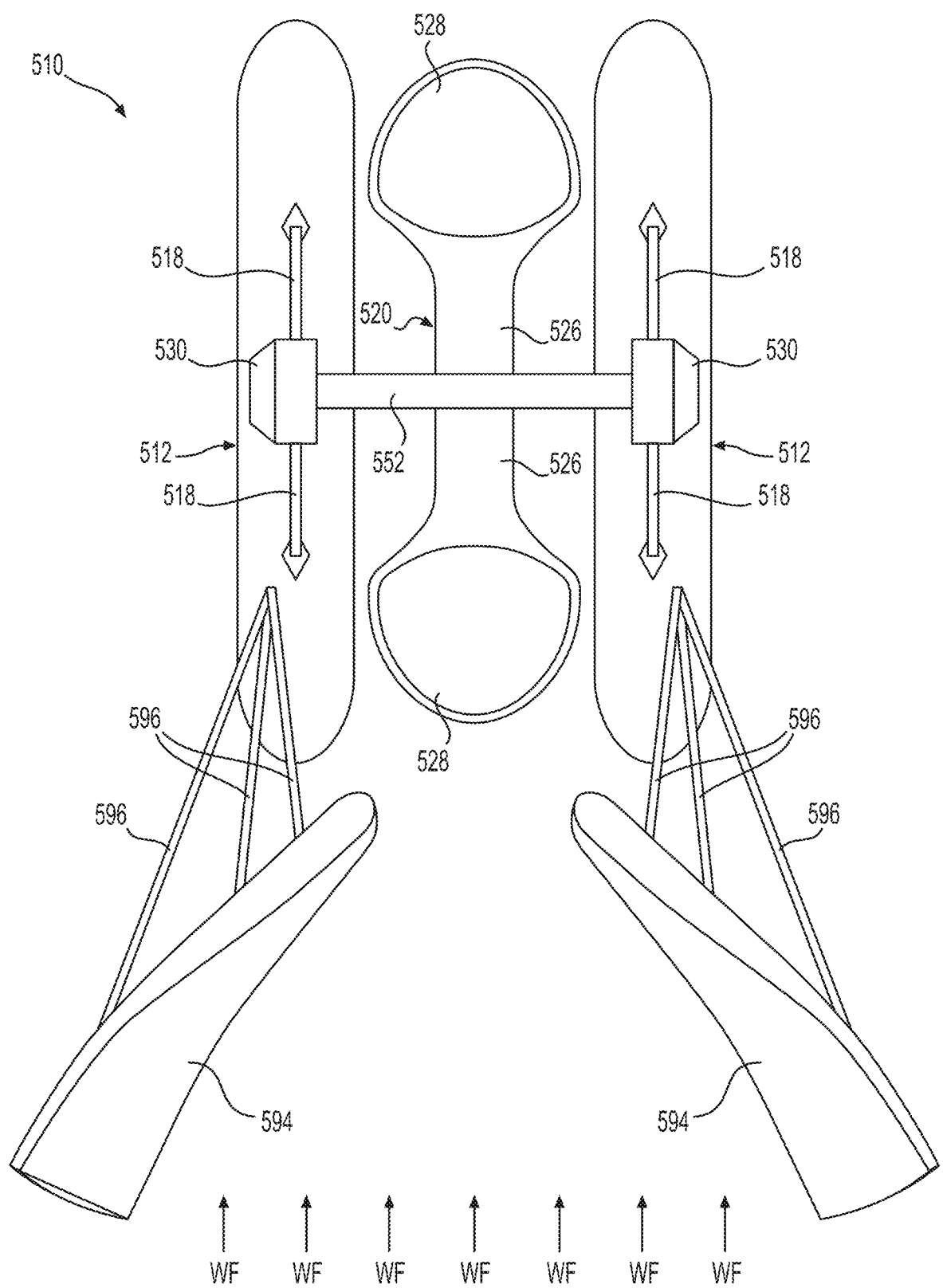
FIG. 28 is a top planar view of the floating power generator shown in FIG. 27.

A floating electrical power generator 510 is shown in FIGS. 27 and 28. The floating electrical power generator 510 is the same as or similar to the floating electrical power generator 310 shown in FIG. 20, however, a pair of inwardly tapering pontoons 594 are connected via struts 596 to the pontoons 512 to funnel water towards the paddle wheel 520. The water flow to the paddle wheel 520 speeds up to increase the power generated by the paddle wheel 520.

Water Flow in an Open Channel

The water flow in an open passageway (i.e. the upper surface of the flow passageway is open to the atmosphere) is discussed in detail below.

The floating electrical power generators shown in FIGS. 2, 14, 15, and 20 are examples of floating electrical power generators configured with and operating in an open passageway (e.g. an open passageway defined between a pair of spaced apart floating hulls, pontoons, or floats defining a flow passageway).

The floating electrical power generator shown in FIG. 21 comprises a pair of spaced apart pontoons and a lower wall defining an open flow passageway upstream of the paddle wheel, a closed flow passageway at the paddle wheel, and an open flow passageway downstream of the paddle wheel providing the combination of an open-closed-open flow passageway.

The discussion below is based on a land based water wheel having an "open" type flow channel defined by an open top, closed sides, and a closed bottom. This type of flow channel typically has a fixed shallow depth with a small clearance between the outer edges of the paddles and the bottom of the open flow channel (see FIG. 1).

Figure 1B:
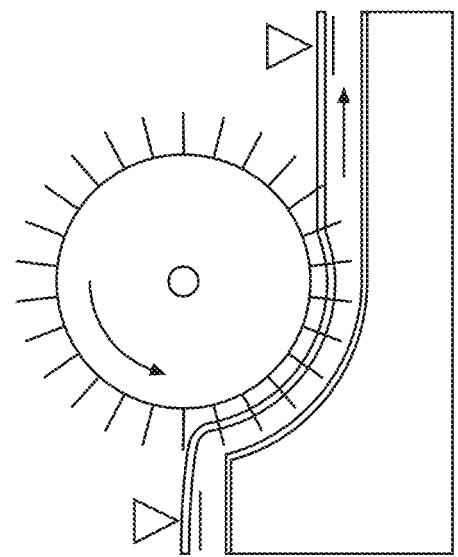
FIG. 1B is a diagrammatic view of a breastshot type water wheel.
Figure 1A:
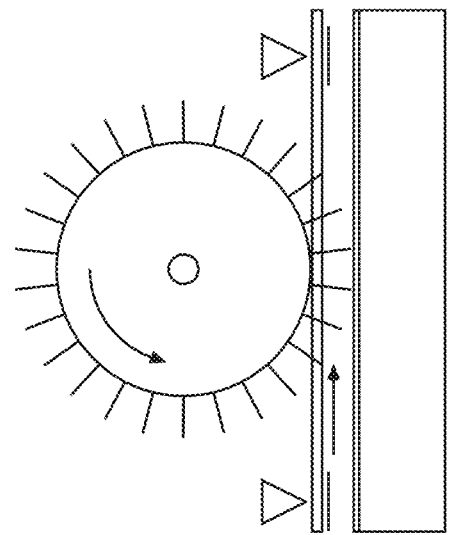
FIG. 1A is a diagrammatic view of an undershot type water wheel.
Figure 2:
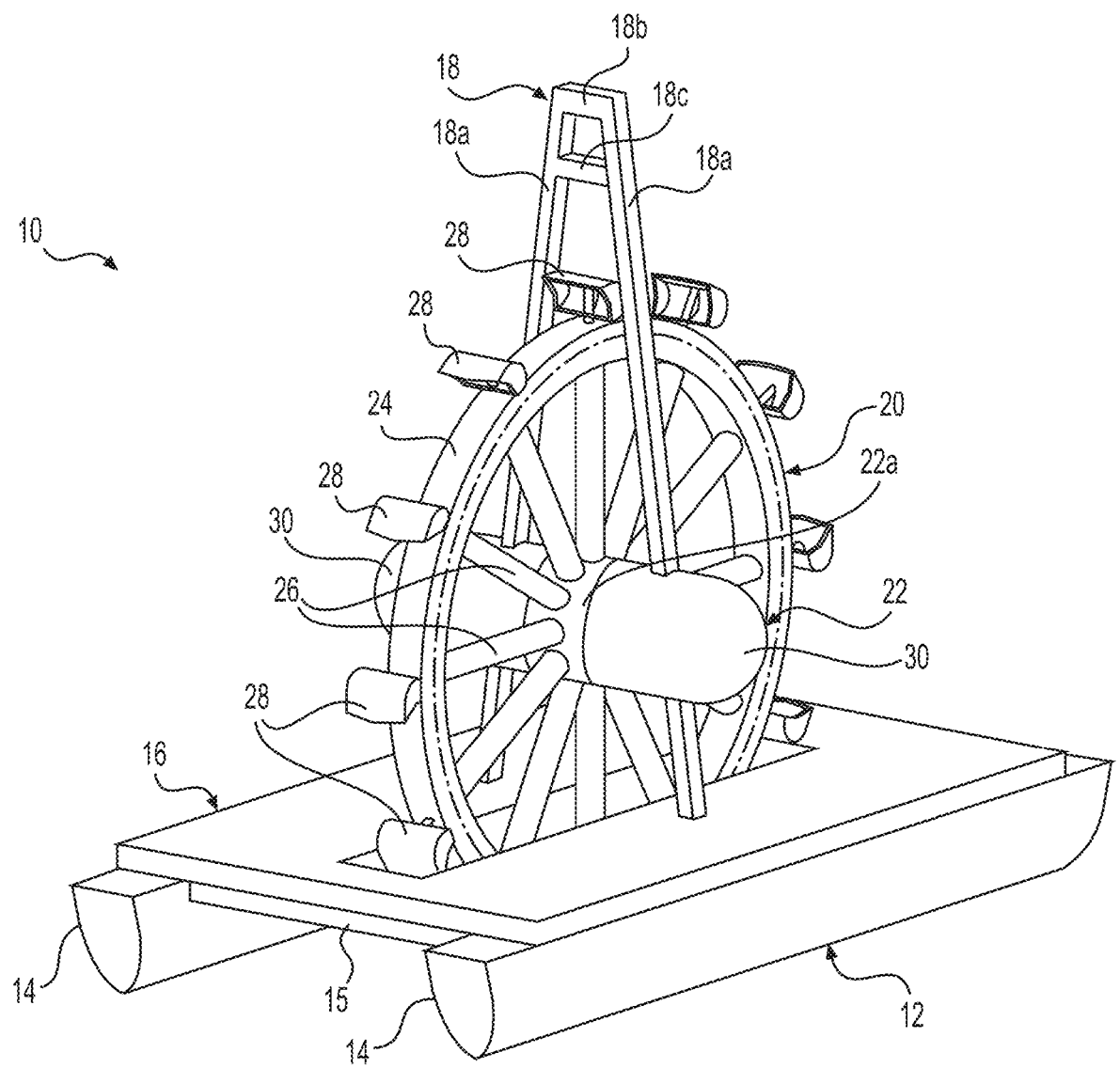
FIG. 2 is a perspective view of a floating power generator.
Figure 3:
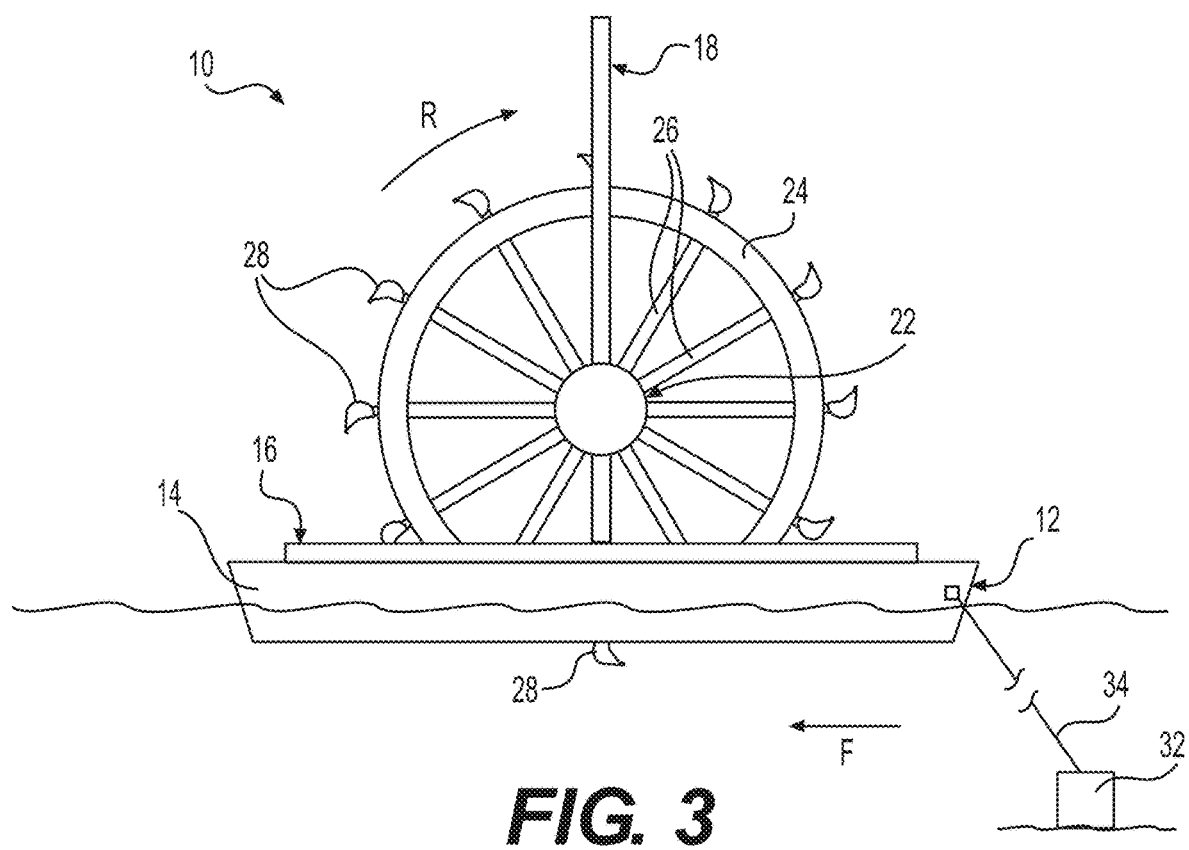
FIG. 3 is a side elevational view of the floating power generator shown in FIG. 1.
Figure 4:
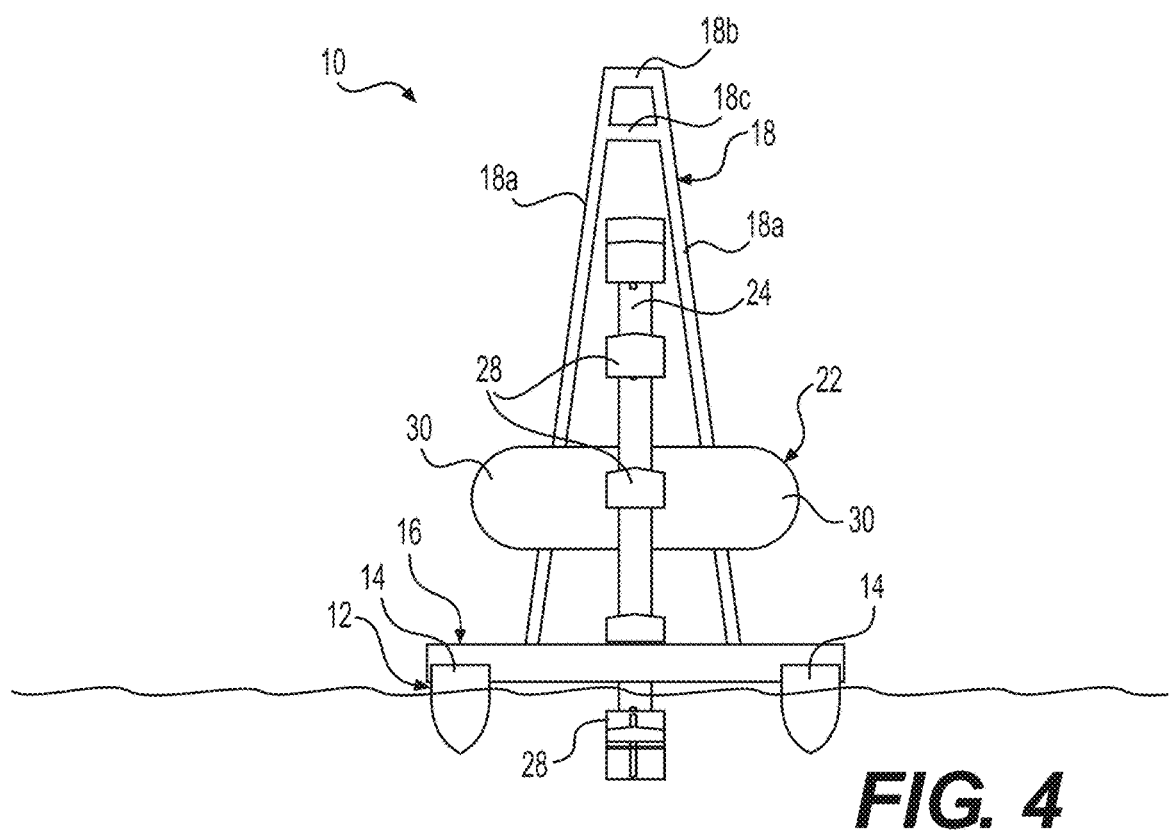
FIG. 4 is an end elevational view of the floating power generator shown in FIG. 1.

In contrast, the floating electrical power generators shown in FIGS. 2, 14, 15, and 20 have an open flow passageway defined by an open top, closed sides, and open bottom unlike the closed bottom of the land based flow channels shown in FIG. 1.

Further, the three-dimensional (3D) flow type floating power generator shown in FIG. 21 has a first flow passageway $FP_1$ having an open top, closed sides, and closed bottom; a second flow passageway $FP_2$ having a partial open and partial closed top, closed sides, and closed bottom; and a third flow passageway $FP_3$ having a partial closed and partial open top, closed sides, and a closed bottom.

Governing Equations

In fluid mechanics, the flow of the water in an open channel having the presence of a free surface, such as the flow in river, is described by Bernoulli's principle. The principle states that an increase in water velocity occurs simultaneously with a decrease in pressure, or decrease in potential energy. It is derived from the law of conservation of energy stating that total energy of an isolated system remains constant. Assuming water as an incompressible fluid (i.e. p=const.), Bernoulli's principle expresses conservation of mechanical energy, since there is no change of internal fluid energy.

The equation shown in FIG. 29 represents the governing equation of fluid flow in fluid mechanics, also known as the famous Bernoulli equation for stationary flow of an ideal incompressible fluid. It is valid for irrotational water flow along the streamline, and applies for both open and closed water flows.

According to Bernoulli's equation, the relation that expresses the dynamics of an ideal fluid in motion at two distant cross sections of the water flow in an open channel is shown in FIG. 30.

The equation shown in FIG. 30 implies that the change of the water flow velocity, from $v_1$ at the inlet section to $v_2$ at the outlet section, corresponds to the difference in geodetic height of the water flow free surface at the inlet and the outlet section $h_1-h_2$. In other words, unless another form of artificial energy is introduced to the water flow in an open channel at the inlet section, water flow cannot be accelerated at the outlet without the presence of falling height.

Figure 32:
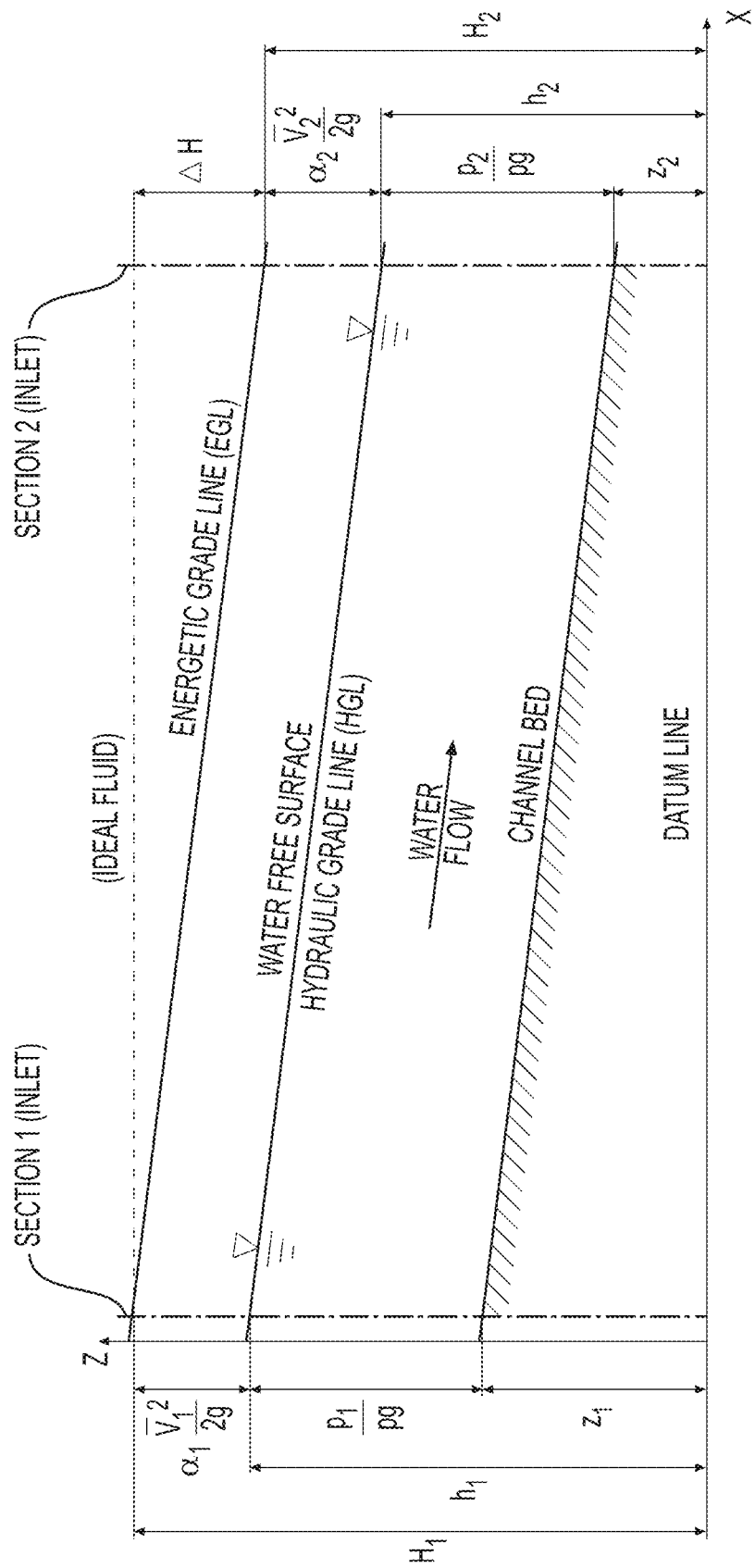
FIG. 32 is a diagrammatic view of channel flow.

Due to the effects of water viscosity, the hydrodynamic resistance to water flow occurs, and the Bernoulli equation shown in FIG. 29 takes a somewhat modified form, as shown in FIG. 31 and illustrated in FIG. 32.

Following the equation shown in FIG. 31, the expression for energetic balance of viscous water flow at two distinct cross-sections in an open channel (FIG. 36) is shown in FIG. 33.

Hydropower

Hydropower represents flow rate of mechanical energy contained within water flow. Its potential has been used for centuries by various systems and devices for the purpose of generation of different forms of power. Generally, hydropower depends on available total energetic height H of the water flow, also called the head, and volumetric flow rate of the water Q, as shown in FIG. 34. Head is usually expressed as a sum of its static and dynamic component. Static head component refers to available water flow gravitational potential, implicating more hydropower at higher geodetic water flow sites. Dynamic head component refers to available water flow kinetic potential, implicating more hydropower at higher water flow velocities. Volumetric flow rate of water depends on hydrological conditions at an exact site location. Hydropower available within water flow at certain cross section normal to water flow is given by the equation shown in FIG. 5.

Operational Range of Particular Hydropower Systems

Figure 35:
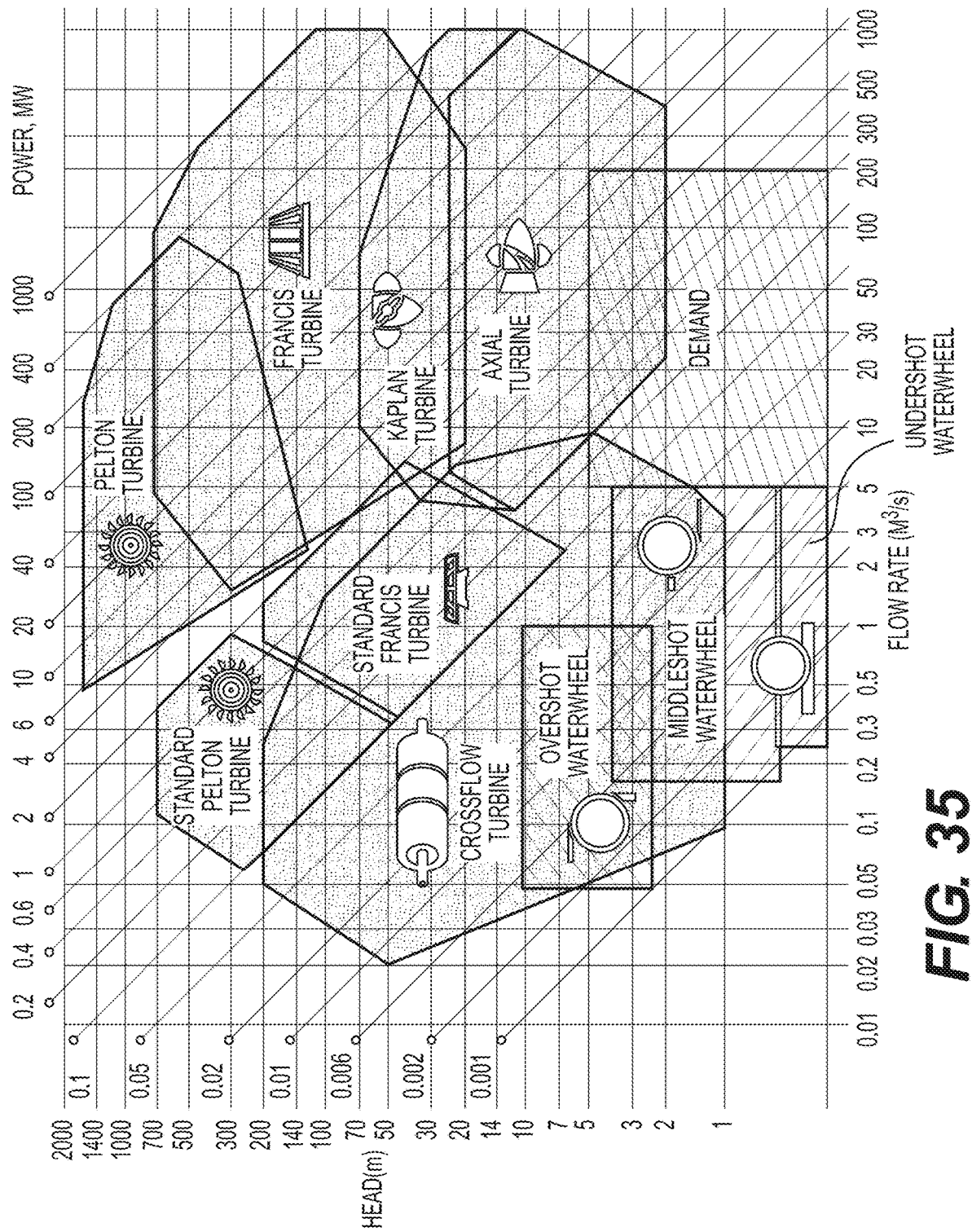
FIG. 35 shows a graph of the performance zones of various types of water wheels.

FIG. 35 shows an estimate of operational range applicable to particular hydropower systems and devices, in terms of available head H and rate of the water flow Q. Operational range of a traditional undershot paddle wheel is marked with rectangle at the very bottom of the head axis.

According to FIG. 35, traditional undershot paddle wheels are applicable at low head sites (low ground) in the head range of $0 \leq H \leq 0.5$ m and flow rate range of $0.05 \leq Q \leq 5$ m$^3$/s. Following the cross lines of constant hydropower, it can be noticed that the operational range of undershot paddle wheels covers the bottom region of hydropower, from its lowest values of less than 1 kW up to 20 kW maximum. While minor deviations of this range are possible for a particular wheel design case, FIG. 35 represents fairly good and reliable estimate of undershot paddle wheel operational range.

If power output and economics of the very low head hydropower potential are to be improved in the future, the DEMAND region indicated in FIG. 35 must be targeted with new technologies.

Undershot Water Wheel Physics

Analysis of traditional undershot paddle wheel physics and assessment of basic quantities such as force load, torque load, hydraulic power, and efficiency follows simple and comprehensive approach.

General Assumptions

Figure 36:
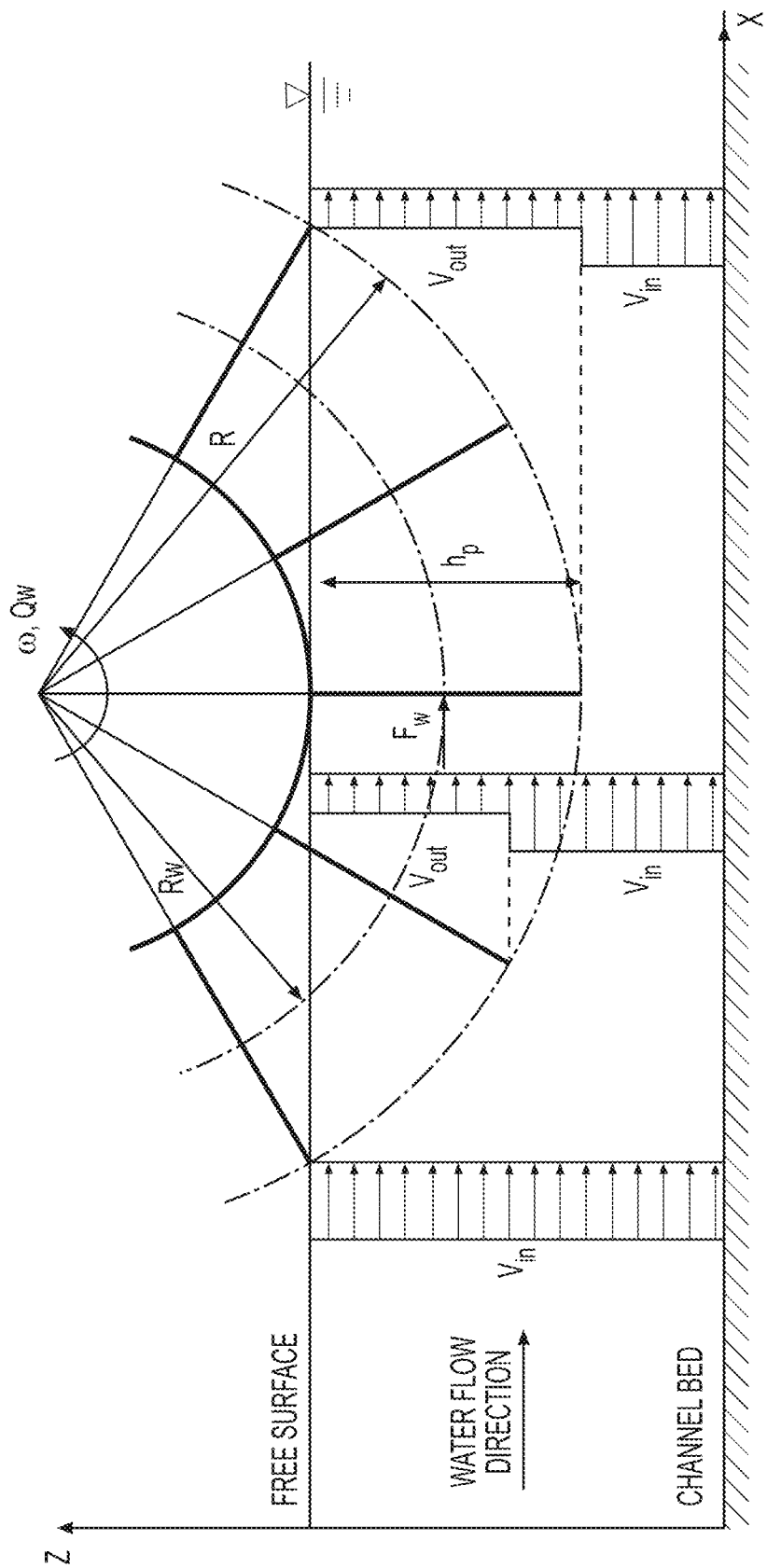
FIG. 36 is a diagrammatic view of the paddle wheel.

The water flow is assumed steady, non-viscous, and irrotational such that streamlines may be considered parallel, as shown in FIG. 36. For the purpose of simplicity, lets assume that the paddle wheel radius R is very large so that water flow direction is normal to the paddle wheel paddle area $A_p$ at each instant of time, and that the water flow entering the wheel paddles $v_{in}$, as well as water flow leaving the wheel paddles $v_{out}$ have constant values. For such a flow, values of force and torque load acting on the paddle wheel may be considered constant as well, so that momentum of the water flow delivered to the paddle wheel paddles turns the wheel rotating at constant rate of turn $\omega$=const.

Force and Torque Load

The outlet velocity of the water is given by the equation shown in FIG. 37. The mass flow rate of the water pressing against the wheel paddles is shown in FIG. 38.

Considering Newton's second law of motion, the force exerted by the water against the wheel paddles is shown in FIG. 39. The torque load at the paddle wheel axis exerted by water force acting on the paddles is shown in FIG. 40. Substituting the equation shown in FIG. 39 into the equation shown in FIG. 40, the above equation for paddle wheel torque load can be expressed, as shown in FIG. 41.

Input Power

The traditional undershot paddle wheel device draws power from the dynamic head component of the water flow acting on the wheel paddles, making use of its kinetic energy only. Since water flow passing the wheel paddles exits the system into the water flow of same geodetic height (i.e. back into the river), static head contained in water flow remains unused. For such system, available head is shown in FIG. 42.

Substituting the equation shown in FIG. 42 into the equation shown in FIG. 34, you get the expression for input power to the paddle wheel system shown in FIG. 43. If you substitute the volumetric water flow rate Q with the expression shown in FIG. 44, the equation for input power takes on the familiar analytical form in fluid mechanics shown in FIG. 45.

Hydraulic Power

The hydraulic power utilized by the paddle wheel system is given by the equation shown in FIG. 46.

Substituting the equation shown in FIG. 39 into the equation shown in FIG. 46, the hydraulic power of the paddle wheel can be written as shown in FIG. 47.

Hydraulic Efficiency

To find the maximum hydraulic efficiency of the traditional undershot paddle wheel and assess the amount of hydropower the paddle wheel can use to generate electricity, let us first express water velocity $v_{out}$ at the outlet section of the paddle wheel system as a function of the inlet velocity $v_{in}$, as shown in FIG. 48.

Substituting the expression shown in FIG. 48 into the equations shown in FIG. 39, FIG. 41, and FIG. 47, you obtain the equations for paddle wheel force load, torque load, and hydraulic power at the paddle wheel axis shown in FIGS. 49-51.

Hydraulic efficiency of the paddle wheel is defined as the ratio between hydraulic and input power shown in FIG. 52.

Substituting the equations shown in FIGS. 45 and 51 into the equation shown in FIG. 52, you obtain the equation for paddle wheel efficiency shown in FIG. 53.

From the equation shown in FIG. 53, it is clear that the hydraulic efficiency $7h$ depends on the ratio between the outlet and inlet water velocity x.

The derivation of the equation shown in FIG. 53 gives the equation shown in FIG. 54 having the extremes shown in FIG. 55.

Since the solutions of x=1 implies $v_{out}=v_{in}$ (i.e. no change in velocities at system inlet and outlet), and therefore no momentum delivered to paddle wheel at all, it is obvious that the maximum hydraulic efficiency of the paddle wheel occurs for x=1/3, at the outlet velocity corresponding to the equation shown in FIG. 56.

Substituting x=1/3 into the equation shown in FIG. 53, you obtain the maximum theoretical hydraulic efficiency of the traditional undershot paddle wheel shown the equation of FIG. 57.

The corresponding paddle wheel force load (FIG. 49), the torque load (FIG. 50, and the hydraulic power (FIG. 51) of the paddle wheel can be expressed in the equations shown in FIGS. 58-60.

Mechanical Power and Mechanical Efficiency

The mechanical power at the paddle wheel axis represents the paddle wheel power which can be further used for various purposes (e.g. mills, pumps, electric generators, etc.), and it accounts for all mechanical losses within the system (i.e. friction in paddle wheel bearings). It can be expressed in the equation shown in FIG. 61.

Equation of Motion

The equation of motion of the paddle wheel is the equation shown in FIG. 62.

For a paddle wheel rotating at constant angular velocity $\omega$=constant, angular acceleration is $\omega$=0 rad/s², and the equation shown in FIG. 62 can be written in the equation shown in FIG. 63.

Practical Considerations

In an attempt to perceive paddle wheel operation in reality, you have to consider general assumptions made throughout the analysis.

Effect of Finite Paddle Wheel Radius

The periodical immersion and surfacing of the paddles through water for a paddle wheel of the finite radius R, implicate periodical variation of paddle area normal to the direction of the water flow. Furthermore, simultaneously active paddles interfere strongly with each other, blocking and deforming incoming water velocity distribution to one another. The force load acting against the paddles reduces while momentum of the water delivered to paddle wheel periodically oscillates in time. Thus, the mean values of paddle wheel force and torque have to be considered, consequently reducing the paddle wheel hydraulic power and efficiency given by the equations shown in FIGS. 46 and 52, respectively.

Effects of Water Viscosity

The effects of viscous fluid flow characteristics implicate presence of extremely complicated unsteady flow patterns with boundary layer and local disturbances at both the inlet and outlet section of the system. If you further consider the influence of particular paddle wheel design parameters, such as paddle shapes, their number, paddle wheel radius, rate of turn, and Reynolds number of the flow regime, the overall influence of viscous water flow effects is practically impossible to generalize.

It is obvious however, that water viscosity affects force load acting against the paddles, and that additional energy losses occur in the system (i.e. due to water splashing that occurs more vigorously at higher water flow velocities and higher rates of turn of the paddle wheel), both reducing the estimates.

Design Efficiency

In search of the optimal solution for a particular paddle wheel design, scientists and engineers from all around the world have been investing significant efforts into experimental and lately numerical investigations proving developed theories and providing empirical relations that can be used as rules of thumbs.

Reckoning their findings, a good engineering estimation of mechanical efficiency for traditional under shot paddle wheel can be taken as:

$$\eta_m = 0.2$$

representing two thirds of the maximum hydraulic efficiency estimated by the equation shown in FIG. 57. This value of paddle wheel efficiency is very close to Smeaton's figure of $\eta = 0.22$. For a carefully designed paddle wheel with respect to its optimal operational parameters (i.e. rate of turn), paddle wheel mechanical efficiency of $\eta_m = 0.2$ empirically accounts all of the above mentioned effects difficult to predict analytically at an early design stage. However, in compliance with mentioned above, value of $\eta_m = 0.2$ has to be considered as an estimate at design startup, and can be found in the range of $0.18 < \eta_m < 0.22$ for the final design solution.

Application to Floating Power Generator

According to the concept of the Floating Power Generator, mechanical power at paddle wheel axis needs to be transformed into electrical power by electric generator. Following approach presented in previous chapter, several terms and modifications need to be addressed in the scope of this chapter.

Electrical Power and Total Efficiency

The electrical efficiency of the Floating Power Generator accounts for all electrical losses within system (i.e. due to electric generator). Thus, the electrical power generated by the paddle wheel can be expressed by the equation shown in FIG. 65.

Assuming ideal frictionless paddle wheel bearings ($\eta_f = 1$), the ideal electrical efficiency ($\eta_{el} = 1$), and maximum theoretical hydraulic efficiency of the paddle wheel ($\eta_{h,max} = 8/27$), you obtain the expression for maximum theoretical electrical power generated by the Floating Power Generator shown in FIG. 66.

Annual Production of Electrical Energy

The annual production of electrical energy can be expressed as shown in FIG. 67.

Assuming full time operation of the Floating Power Generator during the year (24 hours/365 days per year) and generation of maximum theoretical electric power, by substituting the equation shown in FIG. 66 into FIG. 67, you obtain the expression for maximum theoretical annual production of electrical energy as shown in FIG. 68.

Modified Equation of Motion

With respect to the Floating Power Generator, the equations shown in FIGS. 62 and 63 have to be slightly modified. Introducing torque load due to electrical components in the system, the equation of motion can be shown in FIG. 69.

For a wheel rotating at constant angular velocity $\omega$=constant, and the equation shown in FIG. 69 can be written as the equation shown in FIG. 70.

Analytical Calculations

For the purpose of a Floating Power Generator assessment in terms of its potential to generate electrical power, analytical calculations of principal quantities were performed based on the above equations. The calculations account for theoretical maximum of generated electrical power in the equation shown in FIG. 71.

All calculated quantities are presented through tables and diagrams, with respect to water flow velocity $v_{in}$ and wheel paddle area $A_p$ as input parameters. Range of $0.3 < v_{in} < 10.0$ m/s and $0.01 < A_p < 100$ m² were investigated, covering undershot paddle wheel range of operation far beyond reasonable limits.

Figure 73:
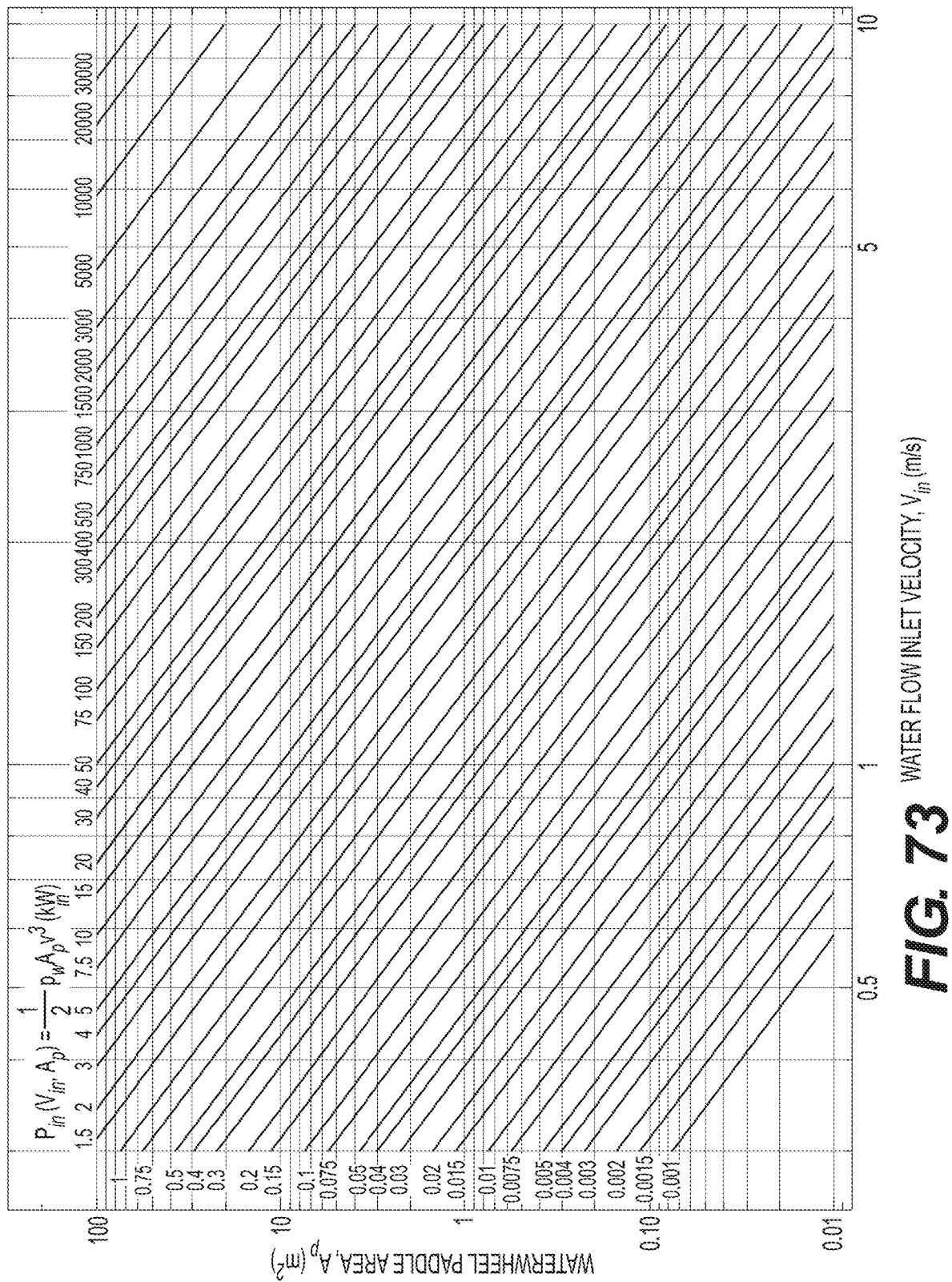
FIG. 73 is a graph of water wheel paddle area verses water flow inlet velocity.
Figure 75:
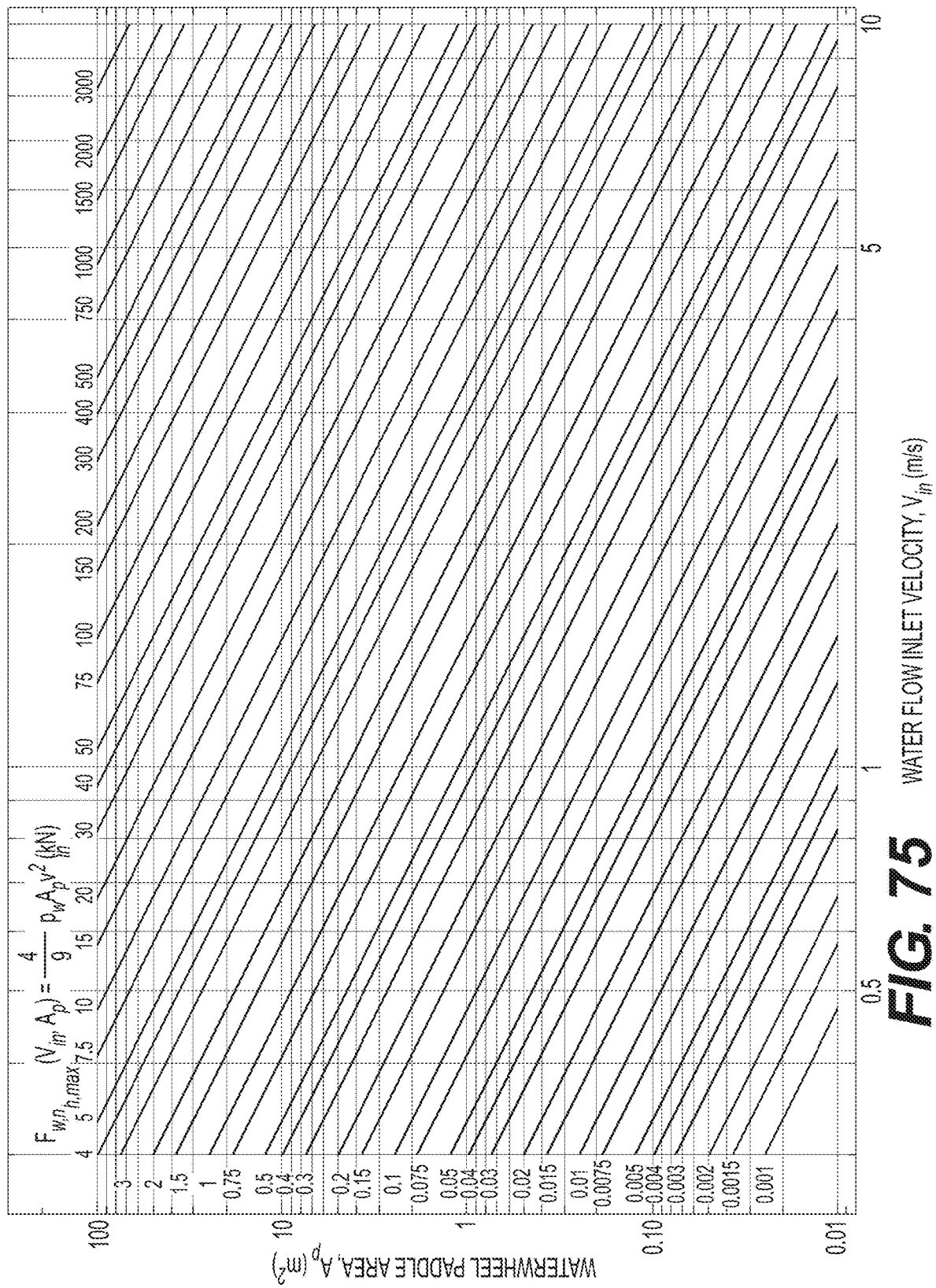
FIG. 75 is a graph of water wheel paddle area verses water flow inlet velocity.
Figure 77:
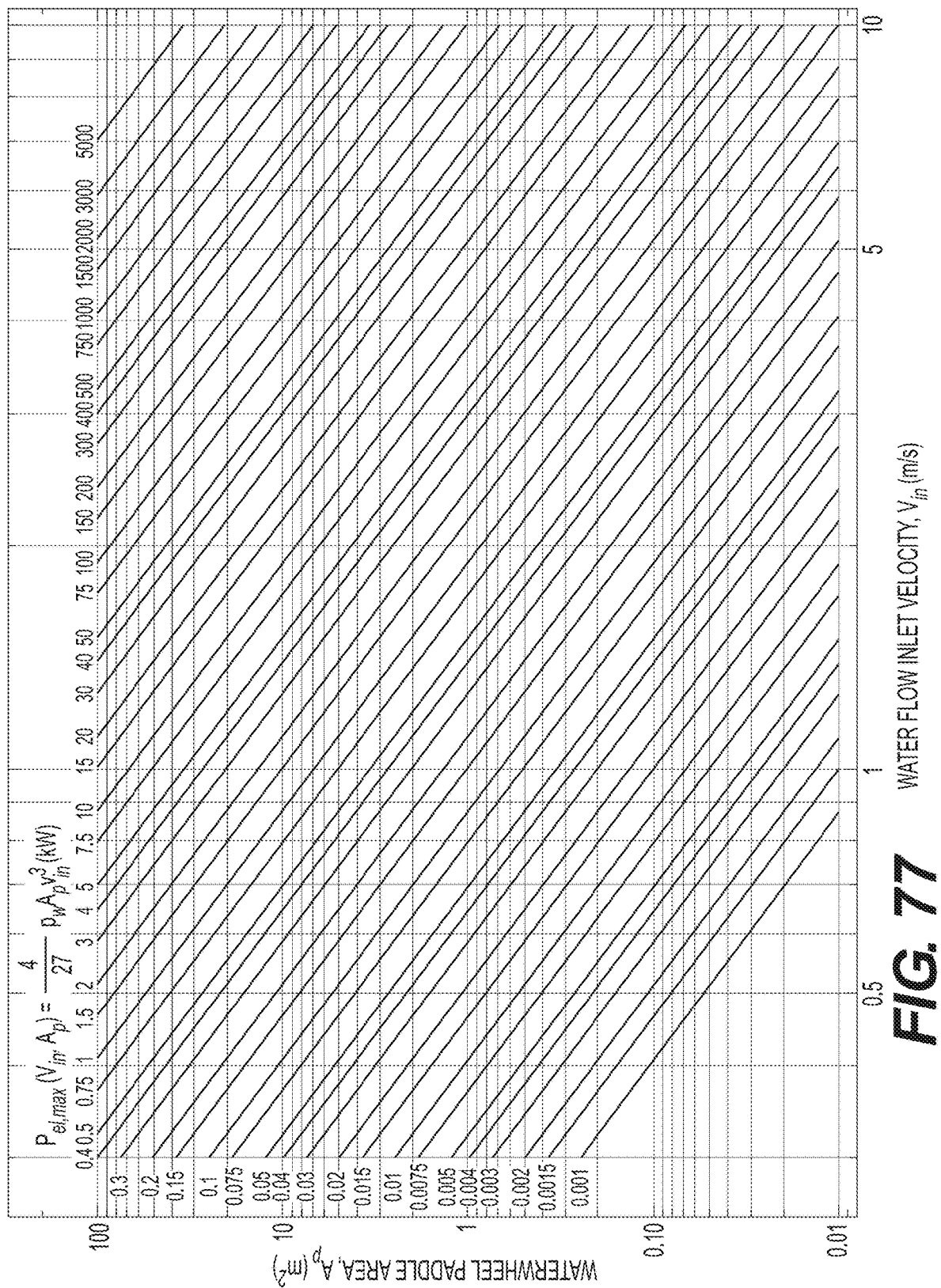
FIG. 77 is a graph of water wheel paddle area verses water flow inlet velocity.
Figure 79:
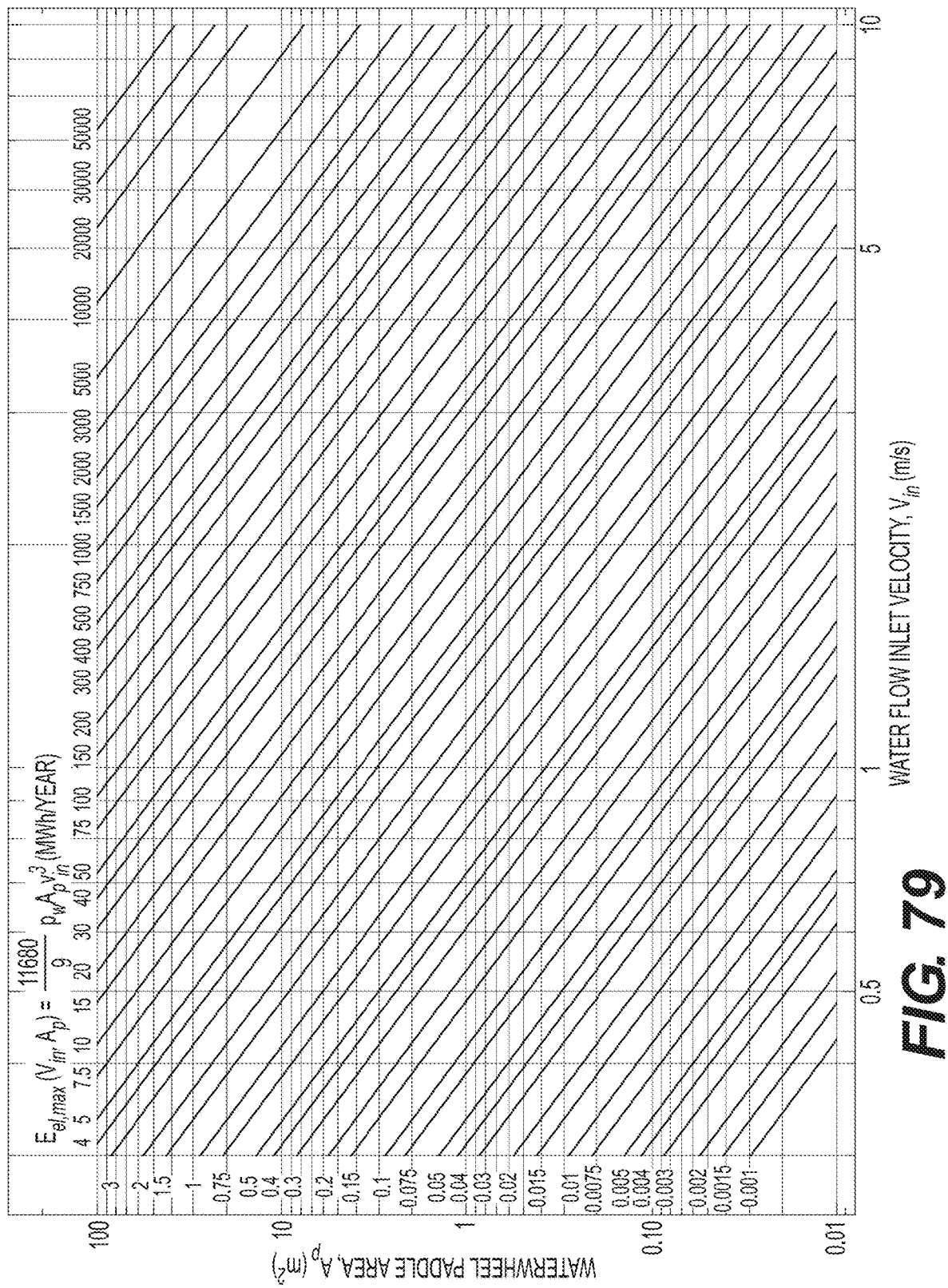
FIG. 79 is a graph of water wheel paddle area verses water flow inlet velocity.

The following quantities were calculated:

1. Input power $P_{in}$ according to the equation shown in FIG. 45, and presented in the table shown in FIG. 72 and the graph shown in FIG. 73.
2. Force load according to the equation shown in FIG. 58, and presented in the table shown in FIG. 74 and the graph shown in FIG. 75.
3. Electrical power $P_{el,max}$ according to the equation shown in FIG. 66, and presented in the table shown in FIG. 76 and the graph shown in FIG. 77.
4. Annual production of electrical energy Eel, max according to equation shown in FIG. 68, and presented in the table shown in FIG. 78 and the graph shown in FIG. 79.

Hat Type Floating Power Generator

Figure 80:
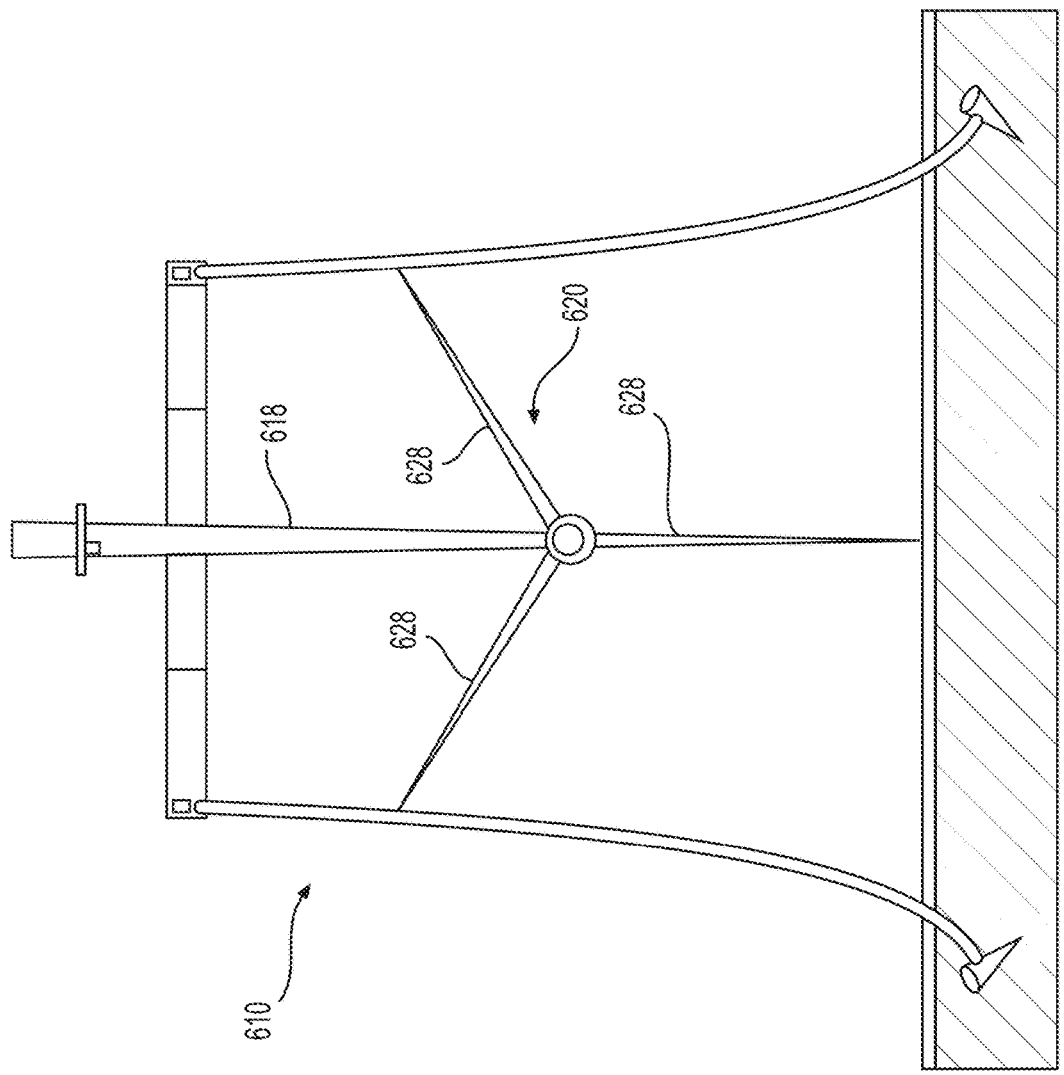
FIG. 80 is a side elevational view of a horizontal axial turbine (HAT) type floating power generator.

A floating power generator 610 having a horizontal axial turbine (HAT) 620 is shown in FIG. 80. The horizontal axial turbine 620 comprises blades 628 support on a floating mast 618. For example, the floating mast 618 including floats or pontoons (not shown) supporting same on the surface of the water.

HAT uses kinetic energy of open stream water flow. It can be compared with a wind power turbine. Both applications comprise two or three bladed turbines rotating in open fluid flow, and require large dimensions of turbines to reach economically satisfying electrical power values. The main differences are in velocity and density of the working media. While wind velocity reaches approximately 5 times higher values than water velocity, water density is 830 times larger than density of the air. Therefore, HAT operating within water stream requires considerably smaller rotor disc area for the same amount of generated power.

Referencing relatively low value of maximum theoretical hydraulic efficiency of $\eta_{h,\ max} = 0.296$ for a waterwheel, application of the horizontal axial turbine yields significant improvement in hydraulic efficiency, reaching double maximum value of $\eta_{h,\ max} = 0.593$. In order to obtain the size of HAT diameter, following expressions shown in FIGS. 81 and 82.

The floating power generator can have multiple HATs on a single supporting structure, reducing investment and maintenance costs. Further enhancement of the turbine output can be achieved by application of rotor shrouds, where the controllable blade pitch ensures optimal operational conditions with respect to the velocity of water flow.

However, at least four new challenges pop up by replacing a waterwheel with a HAT, including:
1) Immerged HAT requires wider and deeper rivers;
2) As large rivers are usually important waterways, floating barges with underwater construction require a number of approvals from appropriate authorities;
3) Anchoring system is quite demanding due the massive construction and fact that the river or channel bottom is usually very muddy; and
4) To satisfy safety and ecological issues, floating barges should have some grid shield directly around or in front of the HAT, causing additional hydropower losses and cost increase.

Floating Power Generator Calculator

A floating power generator calculator for the paddle wheel type floating power generator is shown in FIG. 84.

A floating power generator calculator for the horizontal axle turbine (HAT) type power generator is shown in FIG. 85.

Vertical Turbine

Figure 86:
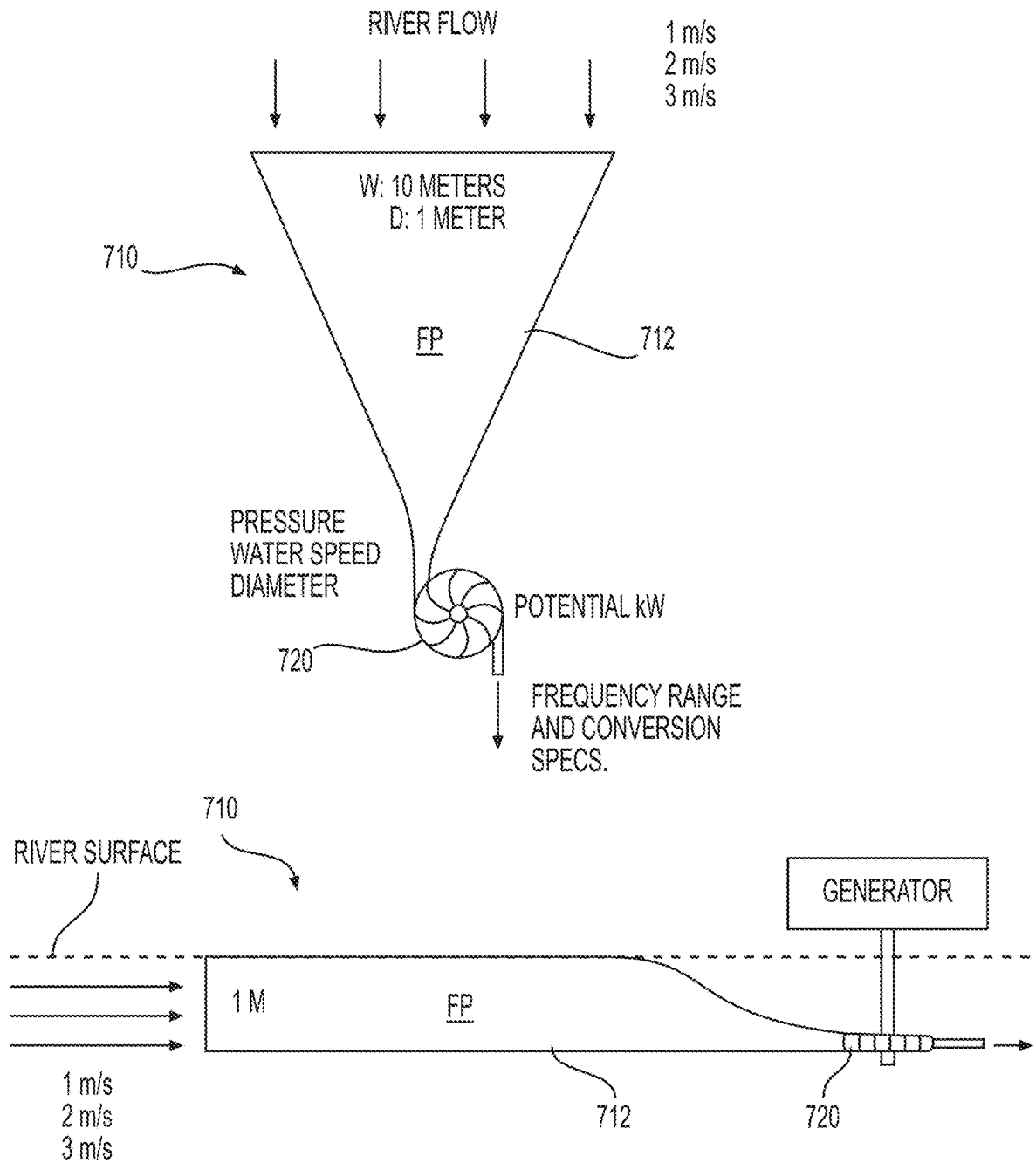
FIG. 86 is diagrammatic views of a vertical axial turbine (VAT) type floating power generator.

A horizontal turbine type floating power generator 710 comprising a floating platform 712 having a funnel-shaped flow passageway FP connected to a vertical turbine 720, is shown in FIG. 86. The funnel-shape flow passageway tapers inwardly in both the height and width in the flow direction continuously increasing the flow speed reaching the vertical turbine.

Fixed Blade Turbine

As an example the turbine can have fixed blades, angled, in order to exit the water without much friction, while still providing the power necessary.

The angled blades can be much more numerous than here, perhaps numbering in hundreds and by angling them in the direction of the wheel movement, it can minimize the water friction, and weight, which tends to slow the wheel. This way it can gain more speed and power.

The invention claimed is:

1. A floating power generator, comprising:
a floating platform having a three-dimensional (3D) flow passageway defined by an open upper side having water flow open to atmosphere at water level; side walls; and a bottom wall extending between the side walls along at least a portion of a length of the floating platform;
a paddle wheel mounted on the floating platform, the paddle wheel comprising paddles rotating downwardly into the three-dimensional (3D) flow passageway so that water flow through the three-dimensional (3D) flow passageway applies a force on the paddles to rotate the paddle wheel; and
an electrical generator installed on the floating platform and driven by the paddle wheel to generate electrical power,
wherein the three-dimensional (3D) flow passageway comprises a first flow passageway section having a first depth relative to the water level transitioning into a second flow passageway having an increasing depth relative to the water level, the second flow passageway transitioning into a third flow passageway having a second depth relative to the water level greater than said first depth.

2. A floating power generator, comprising:
a floating platform having a three-dimensional (3D) flow passageway defined by an open upper side with water flow open to atmosphere at a fixed water level and extending along at least a portion of a length of the floating platform, the three-dimensional (3D) flow passageway having a first flow passageway section tapering inwardly in a width dimension along a flow direction through the three-dimensional (3D) flow passageway and having a fixed first depth relative to the water level, the first flow passageway transitioning into a second flow passageway having an increasing depth relative to water level along the flow direction through the three-dimensional (3D) flow passageway, the second flow passageway transitioning to a third flow passageway having a second depth relative to water level greater than the first depth and a fixed width dimension in the flow direction through the three-dimensional (3D) flow passageway;
a paddle wheel having an axle mounted on the floating platform so that paddles operate in at least a portion of the second flow passageway and at least a portion of the third flow passageway; and
an electrical generator installed on the floating platform and driven by the paddle wheel for generating electrical power.

3. A floating power generator, comprising:
a floating platform having a three-dimensional (3D) flow passageway defined by an open upper side with water flow open to atmosphere at a fixed water level extending along a flow direction through the three-dimensional (3D) flow passageway, the three-dimensional (3D) flow passageway having a first flow passageway section tapering inwardly in a width dimension and having a fixed first depth relative to the water level, the first flow passageway transitioning into a second flow passageway having a fixed width dimension and an increasing depth relative to the water level, the second flow passageway transitioning into a third flow passageway having a fixed width and a second depth relative to the water level greater than the first depth in the first flow passageway;
a paddle wheel mounted on the floating platform so that paddles operate within at least a portion the second flow passageway and at least a portion of the third passageway; and
an electrical generator driven by the paddle wheel for generating electrical power,
wherein the three-dimensional (3D) flow passageway comprises an open passageway located upstream of the paddle wheel, an open passageway enclosing a bottom and at least a portion of sides of the paddle wheel at the location of the paddle wheel, and an open passageway located downstream of the paddle wheel.

4. The floating power generator according to claim 1, wherein the water level entering the three-dimensional (3D) flow passageway is same as a water level exiting the three-dimensional (3D) flow passageway.

5. The floating power generator according to claim 4, wherein the water level entering the three-dimensional (3D) flow passageway and the water level exiting the three-dimensional (3D) flow passageway is same as water level of the floating power generator.

6. The floating power generator according to claim 1, wherein the floating platform and paddle wheel are configured so that a cross-sectional flow area of the three-dimensional (3D) flow passageway decreases in width along the flow direction of the three-dimensional (3D) passageway to a location of the paddles of the paddle wheel operating in the three-dimensional flow passageway to increase speed of water flow operating on the paddles of the paddle wheel to increase power production.

7. The floating power generator according to claim 1, wherein the second flow passageway has a fixed width.

8. The floating power generator according to claim 7, wherein the third flow passageway has a fixed width.

9. The generator according to claim 1, wherein the first flow passageway is configured with the open top, closed side walls, and a closed bottom wall defining the first flow passageway.

10. The generator according to claim 1, wherein the second flow passageway is configured with an open top, closed side walls, and closed bottom wall at the location of the paddle wheel.

11. The generator according to claim 1, wherein the floating platform comprises a pair of pontoons, wherein inner sides of the pair of pontoons located along a first flow passageway section taper inwardly along the first flow passageway and the bottom portion is located at a fixed first depth defining the first flow passageway.

12. The generator according to claim 1, wherein the paddle wheel comprises folding paddles.

13. The generator according to claim 12, wherein each folding paddle comprises a hinge having a pin.

14. The generator according to claim 1, wherein the inlet to the flow passageway can have different configurations.

15. The generator according to claim 1, wherein the bottom portion or wall at an inlet to the flow passageway is aligned with the water flow.

16. The generator according to claim 1, wherein the bottom portion or wall at the inlet to the flow passageway angles upwardly decreasing the cross-sectional flow area downstream of the inlet.

17. The generator according to claim 1, wherein the floating platform and paddle wheel are configured so that outer ends of the paddles of the rotating paddle wheel are in close proximity to the bottom portion or wall of the floating platform.

18. The generator according to claim 1, wherein the bottom portion or wall is a bottom plate structure defining a bottom of the flow passageway.

19. The generator according to claim 1, wherein the paddle wheel comprises a continuous closed outer ring having folding paddles hinged thereon, the paddle wheel configured to prevent wall leaking around ends of the paddle wheel and into an interior of the paddle wheel.

20. The generator according to claim 19, wherein an effective cross-section flow area is defined between an outer surface of the closed outer ring of the paddle wheel and bottom portion or wall of the flow passageway.

21. A floating power generator, comprising:
a floating platform;
a three-dimensional (3D) flow passageway supported by or part of the floating platform, the three-dimensional (3D) flow passageway defined by an open upper side having water flow open to atmosphere at a fixed water level; closed sides; and a closed bottom extending along a length of the floating platform, the three-dimensional (3D) flow passageway being configured with a first flow passageway section decreasing in width and having a first depth relative to the water level transitioning into a second flow passageway having an increasing depth relative to the water level, the second flow passageway transitioning into a third flow passageway having a second depth relative to the water level greater than said first depth;
a paddle wheel having an axle mounted on or above the floating platform so that paddles rotate downwardly into the flow passageway; and
an electrical generator driven by the paddle wheel to generate power,
wherein a depth of an outlet of the three-dimensional (3D) flow passageway is greater than a depth of an inlet of the 3D flow passageway.

22. The generator according to claim 21, wherein the paddle wheel comprises multiple paddles hingedly connected to a wheel.

* * * * *